(12) United States Patent  
Dewhurst

(10) Patent No.: US 8,239,032 B2  
(45) Date of Patent: Aug. 7, 2012

(54) AUDIOTACTILE VISION SUBSTITUTION SYSTEM

(76) Inventor: David Charles Dewhurst, Hook (GB)

( * ) Notice: Subject to any disclaimer, the term of this patent is extended or adjusted under 35 U.S.C. 154(b) by 1284 days.

(21) Appl. No.: 11/847,191

(22) Filed: Aug. 29, 2007

(65) Prior Publication Data

US 2008/0058894 A1    Mar. 6, 2008

(30) Foreign Application Priority Data

Aug. 29, 2006 (GB) .................................. 0617013.8  
Jan. 31, 2007 (GB) .................................. 0701893.0

(51) Int. Cl.  
*A61N 1/08* (2006.01)  
*G06K 9/46* (2006.01)

(52) U.S. Cl. ......................... 607/54; 382/114

(58) Field of Classification Search .................. 382/114, 382/202, 203; 607/54; 704/260; 434/112–116  
See application file for complete search history.

(56) References Cited

U.S. PATENT DOCUMENTS

| | | | |
|---|---|---|---|
| 1,647 | A | 6/1840 | Morse |
| 1,352,940 | A | 9/1920 | Brown |
| 3,007,259 | A | 11/1961 | Abma et al. |
| 3,800,082 | A | 3/1974 | Fish |
| 4,658,427 | A | 4/1987 | Aubin |
| 5,097,326 | A | 3/1992 | Meijer |
| 5,589,854 | A | 12/1996 | Tsai |
| 5,742,278 | A | 4/1998 | Chen et al. |
| 6,191,774 | B1 | 2/2001 | Schena et al. |
| 6,429,849 | B1 | 8/2002 | An et al. |
| 6,963,656 | B1 | 11/2005 | Persaud et al. |
| 2005/0106536 | A1 | 5/2005 | Liebermann |

FOREIGN PATENT DOCUMENTS

WO    WO 2007/066717    *    6/2007

OTHER PUBLICATIONS

Dewhurst, D.C. (present applicant) (1999). Internet website ourworld.compuserve.com/homepages/DavidDewhurst/Vuphonics. html and linked pages of Feb. 22, 1999. (Content of web pages provided.) pp. 1-58.*

Fournier D'Albe, E. E. (1914). "On a Type-Reading Optophone" in Proceedings of the Royal Society of London. Series A, Containing Papers of a Mathematical and Physical Character, vol. 90, No. 619 (Jul. 1, 1914), pp. 373-375. (Describes early version of first optophone.).

Fournier D'Albe, E. E. (1924). "The Moon-Element", D.Appleton and Company, New York, 1924. (Chapter 8 describes completed first optophone.).

(Continued)

*Primary Examiner* — Tammie K Heller

(57) ABSTRACT

One embodiment a vision substitution system for communicating audio and tactile representations of features within visual representations includes selecting (1) activity-related parameters; obtaining (2) images or other visual representations according to the activity-related parameters; acquiring (3) features including shapes and corners related to the visual representations according to the activity-related parameters; and outputting (4) effects related to the features on audio and/or tactile displays according to the activity-related parameters. The corners of shapes and other lineal features are emphasized via special audio and tactile effects while apparently-moving effects trace out perimeters and/or shapes. Coded impulse effects communicate categorical visual information. Special speech and braille codes can communicate encoded categorical properties and the arrangements of properties.

20 Claims, 15 Drawing Sheets

OTHER PUBLICATIONS

Vanderheiden, G.C. (1989). "Nonvisual Alternative Display Techniques for Output from Graphics-Based Computers" in Journal of Visual Impairment and Blindness, 83(8),383-390. (Includes a description of "driven" puck/mouse).

Dewhurst, D.C. (present applicant) (1997). Internet website ourworld.compuserve.com/homepages/DavidDewhurst/homepage.htm and linked pages of Mar. 11, 1997. (Content of web pages provided.).

Dewhurst, D.C. (present applicant) (1998). Saatchi & Saatchi "Innovation in Communication Award" entry.

Dewhurst, D.C. (present applicant) (1998). Saatchi & Saatchi "Innovation in Communication Award" follow-up details.

Dewhurst, D.C. (present applicant) (1999). Internet website ourworld.compuserve.com/homepages/DavidDewhurst/Vuphonics.html and linked pages of Feb. 22 1999. (Content of web pages provided.).

Hardwick, A.J. (2004). "Simulating Moon Text on a Force-Feedback Display for Blind Computer Users" in Proceedings of the 2nd Cambridge Workshop on Universal Access and Assistinve Technology, 167-175.

* cited by examiner

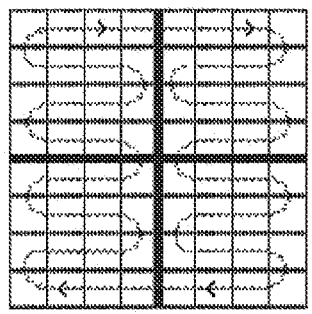
FIG.5A
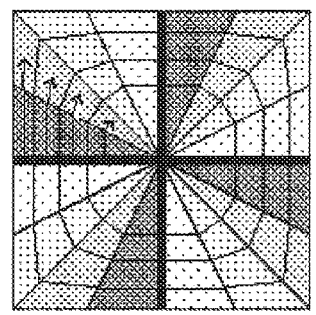
FIG.5B
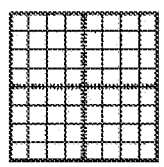
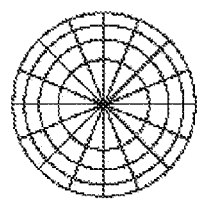
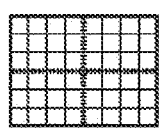
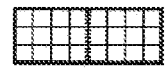
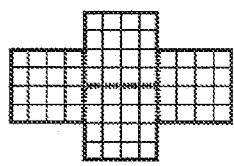
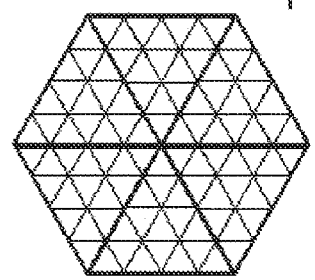
FIG.6
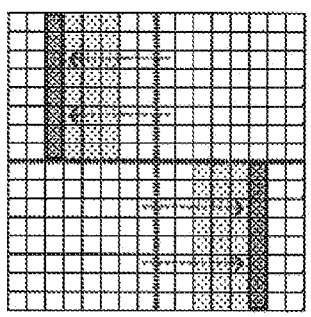
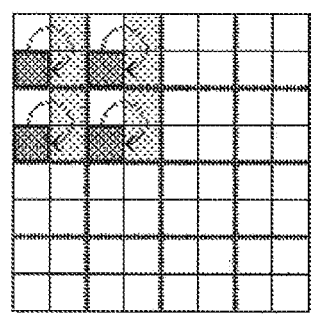
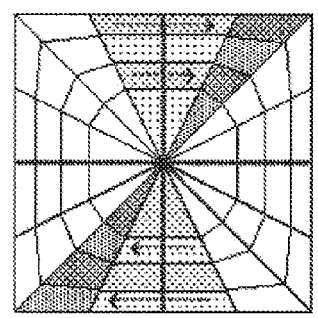
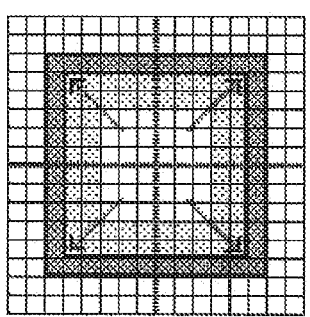
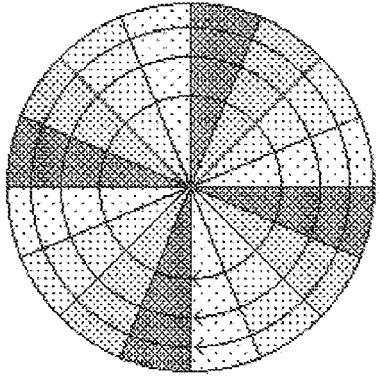
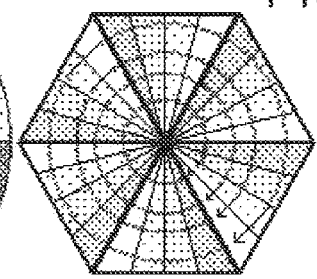
FIG.7

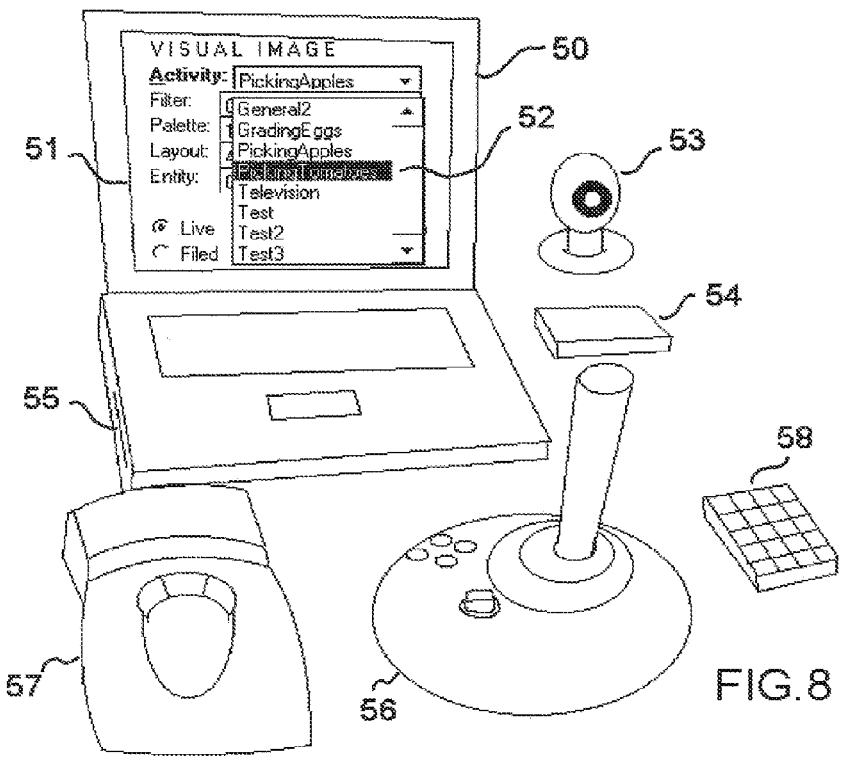
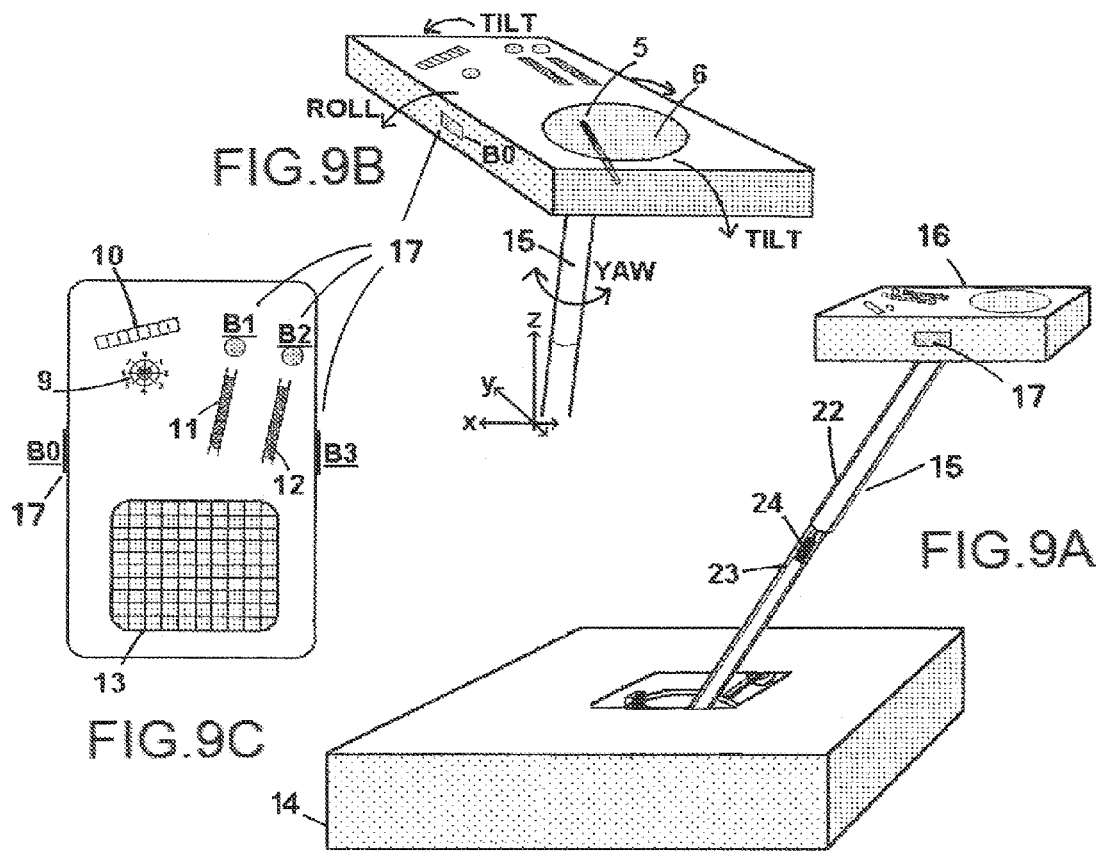

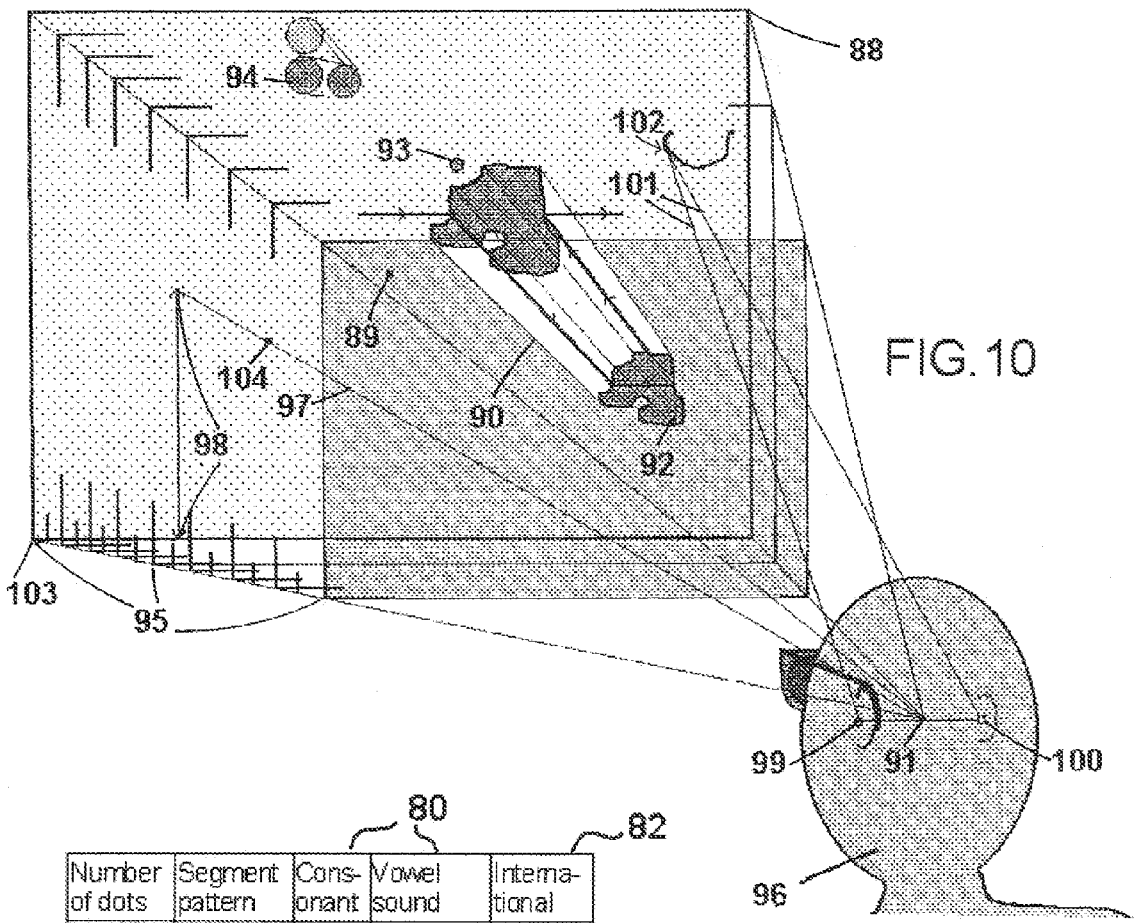
FIG. 10
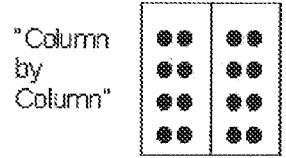
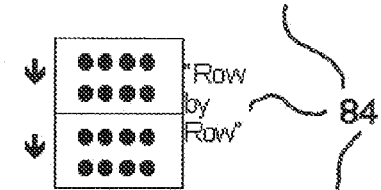
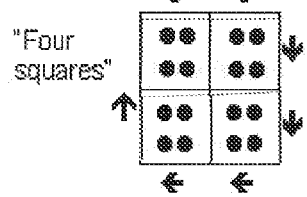
FIG. 11A          FIG. 11B

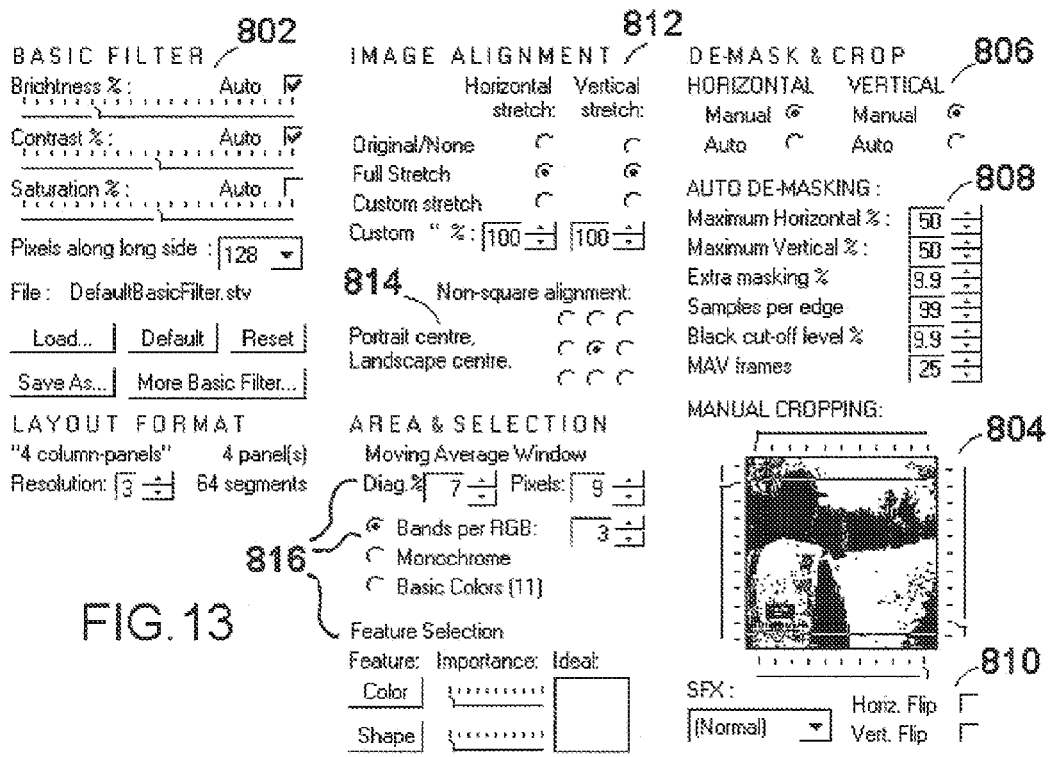

|  | Color Name | Short Name | "Split" Name | Vowel Sound | Phonemes |
|---|---|---|---|---|---|
| Basic Color Cats. | 1 Red | Reh | S-eh | bed | SS-EH |
| | 2 Orange | Joh | J-oh | bob | JH-AA |
| | 3 Yellow | Yow | Y-ow | boat | YY-OW |
| | 4 Green | Gee | N-ee | bee | NN-IY |
| | 5 Blue | Boo | B-oo | boot | BB-UW |
| | 6 Purple | Puh | Z-uh | bull | ZZ-UH |
| | 7 Pink | Pih | P-ih | bid | PP-IH |
| | 8 Brown | Bow | R-ow | bout | RR-AW |
| | 9 Black | Bah | K-ah | bad | KK-AE |
| | 10 White | Wuy | W-uy | buy | WW-AY |
| | 11 Mid Grey | Mey | M-ey | bay | MM-EY |
| Simple extras | 12 Dark Grey | Dey | D-ore | bore | DD-OR |
| | 13 Light Grey | Ley | L-air | bear | LL-XR |
| | 14 Turquoise | Toy | T-oy | boy | TT-OY |
| | 15 Dk.Brown | Dow | V-ar | bar | VV-AR |
| Compact extras | 16 Lt.Brown | Low | F-owl | bout | FF-AW.L |
| | 17 Dk.Green | Dee | DH | dheed | DH-IY.D |
| | 18 Lt.Green | Lee | TH | theel | TH-IY.L |
| | 19 Dark Blue | Doo | G | goowd | GG-UW.D |
| | 20 Light Blue | Loo | CH | chewel | CH-UW.L |
| | 21 Dk.Purple | Dur | ZH | zhood | ZH-UH.D |
| | 22 Lt.Purple | Lur | SH | shull | SH-UH.L |
| Internat. Extras | 23 GrnYell/23 | Gow | NG | nyode | NG-OW.D |
| | 24 Cream/24 | Low | WH | whowl | WH-OW.L |
| | 25 (Special) | Hear | H-eer | beer | HH-YR |

FIG. 15

Vowel sound 2ⁿᵈ ⬇  ⬇ Consonant sound 1ˢᵗ ⬇

| | ⬇ | S (w) | R (L) | K (g) | N (m) | D (b,p,t) |
|---|---|---|---|---|---|---|
| Light | I | Lt.Purple | Lt.Brown | White | Cream/24 | (Special) |
| ⬇ | E | Pink | Yellow | Light Grey | Lt.Green | Light Blue |
| Mid | A | Red | Orange | Mid Grey | GrnYell/23 | Turquoise |
| ⬇ | O | Purple | Brown | Dark Grey | Green | Blue |
| Dark | U | Dk.Purple | Dk.Brown | Black | Dk.Green | Dark Blue |

International Format – color mappings shown twice ⬆⬇

Consonant sound 1ˢᵗ ⬇    ⬇ Vowel sound 2ⁿᵈ ⬇

| | ⬇ | I | E | A | O | U |
|---|---|---|---|---|---|---|
| "Reds" | S | Lt.Purple | Pink | Red | Purple | Dk.Purple |
| "Browns" | R | Lt.Brown | Yellow | Orange | Brown | Dk.Brown |
| "Greys" | K | White | Light Grey | Mid Grey | Dark Grey | Black |
| "Greens" | N | Cream/24 | Lt.Green | GrnYell/23 | Green | Dk.Green |
| "Blues" | D | (Special) | Light Blue | Turquoise | Blue | Dark Blue |

Consonant sound 1ˢᵗ ⬇    ⬇ Vowel sound 2ⁿᵈ ⬇

| | | I | E | A | O | U |
|---|---|---|---|---|---|---|
| White | S | White | Wt&Lt.Gr | Wt&Md.Gr | Wt&Dk.Gr | Wt&Black |
| Lt. Grey | R(L) | Lt.Gy&Wt | Light Grey | LtGy&MdGr | LtGy&DkGy | LtGy&Bk |
| Mid Grey | K(G) | Md.Gy&Wt | MdGy&LtGy | Mid Grey | MdGy&DkGy | MdGy&Bk |
| Dk. Grey | N(M) | Dk.Gy&Wt | DkGy&LtGy | DkGy&MdGy | Dark Grey | DkGy&Bk |
| Black | D | Black&Wt | Bk&Lt.Gy | Black&MdGy | Black&DkGy | Black |

76

International Vowel "Coloring"

| | I | E | A | O | U |
|---|---|---|---|---|---|
| Warm | YR beer | XR bear | AR bar | OR bore | ER bird |
| (None) | IH bid | EH bed | AE bad | AA bog | UW boot |
| Cool | IY bee | EY bay | AY buy | OY boy | OW boat |
| | | Alternatives:- | AW bout | AX bud | UH bull |

|  | (0) UH bUll | (1) AA bOg | (2) AE bAd | (3) EH bEd | (4) IH bid | (5) ER bURR | (6) OR bORE | (7) AR bAR | (8) YR bEER | (9) IY bEE | (10) EY bAY | (11) AY bUY | (12) OY bOY | (13) AW bOUt | (14) OW bOAt | (15) UW bOOt |
|---|---|---|---|---|---|---|---|---|---|---|---|---|---|---|---|---|
| (0) DH | (Unused) | Red Orange | Red Yellow | Red Green | Red Blue | Red Purple | Red Pink | Red Brown | Brown Purple | Brown Pink | Purple Pink | Orange Green | Orange Blue | Orange Purple | Orange Pink | Orange Brown |
| (1) LL | Grey Red | Grey Orange | Grey Yellow | Grey Green | Grey Blue | Grey Purple | Grey Pink | Grey Brown | Grey Black | Grey White | Polychrome | Yellow Green | Yellow Blue | Yellow Purple | Yellow Pink | Yellow Brown |
| (2) MM | White Red | White Orange | White Yellow | White Green | White Blue | White Purple | White Pink | White Brown | White Black | Light Grey White | Light Grey Grey | Light Grey Black | Green Blue | Green Purple | Green Pink | Green Brown |
| (3) NN | Black Red | Black Orange | Black Yellow | Black Green | Black Blue | Black Purple | Black Pink | Black Brown | Dark Grey Black | Dark Grey White | Dark Grey Grey | Dk.Gry Light Grey | Orange Yellow | Blue Purple | Blue Pink | Blue Brown |
| (4) RR | Dark Green Red | Dark Green Orange | Dark Green Yellow | Dark Green Green | Dark Green Blue | Dark Green Purple | Dark Green Pink | Dark Green Brown | Dark Green Black | Dark Green White | Dark Green Grey | Cyan Green | Cyan Blue | Cyan Purple | Cyan Pink | Dark Green Cyan |
| (5) VV | Dark Blue Red | Dark Blue Orange | Dk Blue Yellow | Dark Blue Green | Dark Blue Blue | Dark Blue Purple | Dark Blue Pink | Dark Blue Brown | Dark Blue Black | Dark Blue White | Dark Blue Grey | Dk Blue Dark Green | Cyan Brown | Cyan Black | Cyan White | Dk Blue Cyan |
| (6) ZH | Light Green Red | Light Green Orange | Light Green Yellow | Light Green Green | Light Green Blue | Light Green Purple | Light Green Pink | Light Green Brown | Light Green Black | Light Green White | Light Green Grey | Lt. Grn. Dark Green | Lt. Grn. Dark Blue | Cyan Red | Cyan Orange | Light Green Cyan |
| (7) ZZ | Light Blue Red | Light Blue Orange | Light Blue Yellow | Light Blue Green | Light Blue Blue | Light Blue Purple | Light Blue Pink | Light Blue Brown | Light Blue Black | Light Blue White | Light Blue Grey | Lt. Blue Dark Green | Lt. Blue Dark Blue | Lt. Blue Light Green | Cyan Yellow | Light Blue Cyan |
| (8) FF | Dark Brown Red | Dark Brown Orange | Dark Brown Yellow | Dark Brown Green | Dark Brown Blue | Dark Brown Purple | Dark Brown Pink | Dark Brown Brown | Dark Brown Black | Dark Brown White | Dark Brown Grey | Dk. Brn. Dark Green | Dk. Brn. Dark Blue | Dk. Brn. Light Green | Dk. Brn. Light Blue | Dark Brown Cyan |
| (9) HH | Light Brown Red | Light Brown Orange | Light Brown Yellow | Light Brown Green | Light Brown Blue | Light Brown Purple | Light Brown Pink | Light Brown Brown | Light Brown Black | Light Brown White | Light Brown Grey | Lt. Brn. Dark Green | Lt. Brn. Dark Blue | Lt. Brn. Light Green | Lt. Brn. Light Blue | Light Brown Cyan |
| (10) SH | Dark Grey Red | Dark Grey Orange | Dk Grey Yellow | Dark Grey Green | Dark Grey Blue | Dark Grey Purple | Dark Grey Pink | Dark Grey Brown | Dk. Grey Dark Brown | Dk.Grey Light Brown | Cyan Grey | Dk.Grey Dark Green | Dk.Grey Dark Blue | Dk.Grey Light Green | Dk.Grey Light Blue | Dark Grey Cyan |
| (11) SS | Light Grey Red | Light Grey Orange | Light Grey Yellow | Light Grey Green | Light Grey Blue | Light Grey Purple | Light Grey Pink | Light Grey Brown | Lt. Grey Dk Brown | Lt. Grey Light Brown | Dk. Brown Light Brown | Lt. Grey Dark Green | Lt. Grey Dark Blue | Lt. Grey Light Green | Lt. Grey Light Blue | Light Grey Cyan |
| (12) TH | Dark Purple Red | Dark Purple Orange | Dark Purple Yellow | Dark Purple Green | Dark Purple Blue | Dark Purple Purple | Dark Purple Pink | Dark Purple Brown | Dark Purple Black | Dark Purple White | Dark Purple Grey | Dk Purp Dark Green | Dk Purp Dark Blue | Dk Purp Light Green | Dk Purp Light Blue | Dark Purple Cyan |
| (13) WH | Light Purple Red | Light Purple Orange | Light Purple Yellow | Light Purple Green | Light Purple Blue | Light Purple Purple | Light Purple Pink | Light Purple Brown | Light Purple Black | Light Purple White | Light Purple Grey | Lt. Purp Dark Green | Lt. Purp Dark Blue | Lt. Purp Light Green | Lt. Purp Light Blue | Light Purple Cyan |
| (14) Ww | Mono Red | Mono Orange | Mono Yellow | Mono Green | Mono Blue | Mono Purple | Mono Pink | Mono Brown | Mono Black | Mono White | Mono Grey | Mono Dark Green | Mono Dark Blue | Mono Light Green | Mono Light Blue | Mono Cyan |
| (15) YY | Dk Purp Dk Brown | Dk Purp Light Brown | Dk Purp Dk Grey | Dk Purp Lt Grey | Light Purpl e Dk. Brn. | Lt. Purp Light Brown | Lt. Purp Dark Grey | Lt. Purp Light Grey | Lt. Purp Dark Purple | Mono Dark Brown | Mono Light Brown | Mono Dark Grey | Mono Light Grey | Mono Dark Purple | Mono Light Purple | (Escape) |

FIG.17

```
+----+----+----+---------+---------------+------+------------+------------------------------------+
|Col-> 1 | 2  | 3  |    4    |       5       |  6   |     7      |                                    |
|umn +----+----+----+---------+---------------+------+------------+------------------------------------+
|----|Con-|Vow-|Example-| Categorical   |Layout| Main color | Texture                            |
|Num-|son-|el  |Cs&Vs in| texture (flat |(Dark&|            |                                    |
|ber |ant |    |capitals| & dry only)   |Light)|    (V)     |               (C)                  |
+----+----+----+---------+---------------+------+------------+------------------------------------+
| 0  | WH | EE | WHEAt   | Paper         | LLLL | White      | Even level or no clear texture     |
| 1  | SS | IH | SIt     | Towelling     | LLLD | Light Red  | Sloping diamond-shaped lattice     |
| 2  | FF | EH | FEd     | Silk          | LLDL | Light Green| Lines sloping from upper right     |
| 3  | SH | AH | SHAck   | Linen         | LLDD | Light Blue | Lines sloping from upper left      |
+----+----+----+---------+---------------+------+------------+------------------------------------+
| 4  | HH | EY | HAY     | Orange peel   | DLLL | Orange     | Large grain, large blobs etc.      |
| 5  | TH | AY | THIGH   | Suede         | LDLL | Yellow     | Small even grain, dots etc.        |
| 6  | RR | AW | ROUnd   | Cork          | LDDD | Brown      | Concentric loop(s)                 |
| 7  | NN | OY | NOIse   | Woolly        | DLDD | Purple     | Wiry effect in many directions     |
+----+----+----+---------+---------------+------+------------+------------------------------------+
| 8  | DH | OW | THOUGH  | Brushed alloy | DLDL | Grey       | Ordered items                      |
| 9  | YY | AX | YOUng   | Glassy        | LDLD | Polychrome | Text, characters & symbols         |
| 10 | LL | ER | LEARn   | Wood          | LDDL | Beige      | Radial pattern(s)                  |
| 11 | MM | YR | MERE    | Felt          | DLLD | Cyan       | Wavy effect in one direction       |
+----+----+----+---------+---------------+------+------------+------------------------------------+
| 12 | ZH | AR | JARdin  | Canvas        | DDDL | Dark Blue  | Horizontal lines / strata          |
| 13 | VV | OR | VORtex  | Corduroy     | DDLD | Dark Green | Vertical lines / stripes           |
| 14 | ZZ | OO | ZOO     | Hessian       | DDLL | Dark Red   | Tessellated, checkered effect      |
| 15 | WW | UH | WOOd    | Rubber        | DDDD | Black      | Gradient, shading etc.             |
+----+----+----+---------+---------------+------+------------+------------------------------------+
```

```
+----+-------------------+---------------------------+-------------+-----------------------+
|Col.>          8                    |           9          |     10            |
+----+-------------------+---------------------------+-------------+-----------------------+
|Num-| DInCoTex1 |(Numerical categories |  DInCoTex2  | Distance bands        |
|ber | (C or V)   are for objects only) |     (V)     |                       |
+----+-------------------+---------------------------+-------------+-----------------------+
| 0  | White             | Danger!{                  | White       | (Distance unknown)    |
| 1  | Red               | Hot       {If             | Red         | 3cm (0cm - 5cm)       |
| 2  | Green             | Medium    {both           | Green       | 10cm (5.1cm-15cm)     |
| 3  | Blue              | Cool      {col-           | Blue        | 20cm (15.1cm-30cm)    |
+----+-------------------+           {ours           +-------------+-----------------------+
| 4  | Orange            | 1/2       {are            | Orange      | 50cm (30.1cm-70cm)    |
| 5  | Yellow            | 1/4       {the            | Yellow      | 1m (70.1cm - 1.5m)    |
| 6  | Brown             | 3/4       {same.          | Brown       | 2m (1.51m - 3m)       |
| 7  | Purple            | 1/3       {               | Purple      | 5m (3.1m - 7m)        |
+----+-------------------+---------------------------+-------------+-----------------------+
| 8  | Grey              | (Undefined)               | Grey        | 10m (7.1m - 15m)      |
| 9  | Text-like         +---------------------------+ Polychrome  | 30m (15.1m - 50m)     |
| 10 | Radial or loops   / Few     :    0-4          | Close : <70cm| 100m (50.1m-200m)    |
| 11 | Wavy or wiry      / Some    :    5-16         | Near:0.7-1.5m| 300m (200.1m-500m)   |
+----+-------------------+---------------------------+-------------+-----------------------+
| 12 | More horizontal   / Several:17-64             | Medium:1.5-7m| 1km (501m - 5km)     |
| 13 | Mainly vertical   / Many   : 65-256           | Far   :7m-50m| 10km (5.1km-50km)    |
| 14 | Tessellated       / Lots   :   >256           | Remote: >50m | 100km (50km-999km)   |
| 15 | Black             |                           | Black       | Infinity (1000km+)    |
+----+-------------------+---------------------------+-------------+-----------------------+
```

FIG.18

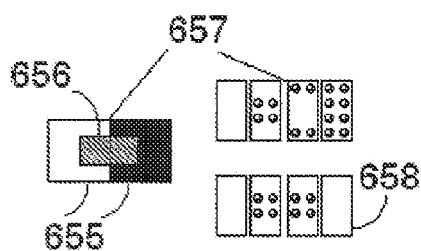
FIG. 19
| No. | Color | Full | Short |
|---|---|---|---|
| 1 | Red | .-.-- | .-. |
| 2 | Orange | -.... | -.. |
| 3 | Yellow | ...-. | ... |
| 4 | Green | .--.- | .-- |
| 5 | Blue | ---.- | ---. |
| 6 | Purple | -.-.. | -.- |
| 7 | Pink | ...-.- | ..-. |
| 8 | Brown | .----. | ---- |
| 9 | Black | ----- | --- |
| 10 | White | ..... | .. |
| 11 | Mid Grey | -..-. | -.. |
FIG. 20
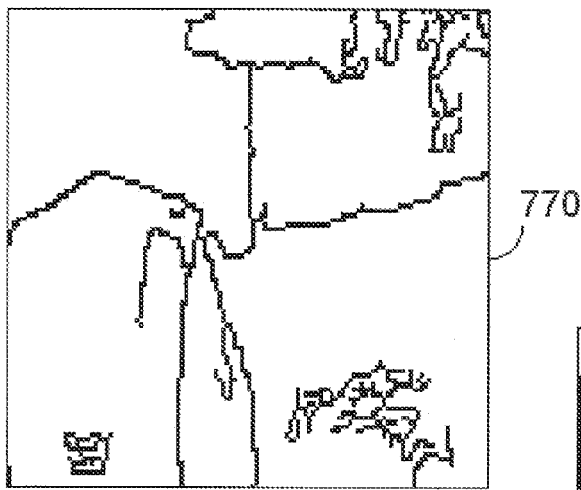
FIG. 21
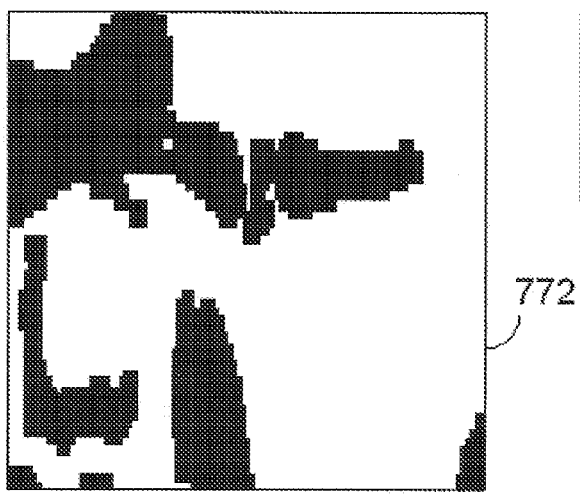
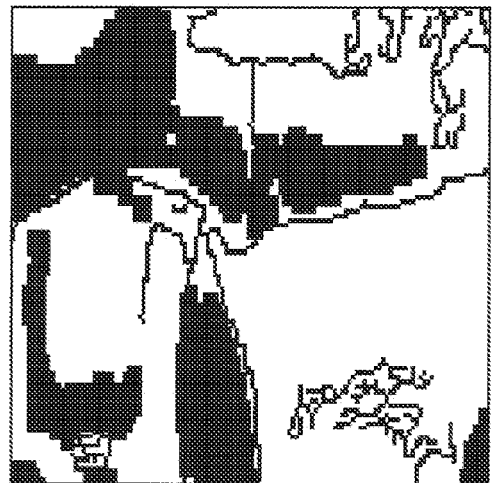

AUDIOTACTILE VISION SUBSTITUTION SYSTEM

CROSS-REFERENCE TO RELATED APPLICATIONS

This application claims the benefit of UK Patent Application number GB0617013.8, of the same title, and filed Aug. 29, 2006 by the present inventor.

FEDERALLY SPONSORED RESEARCH

Not Applicable

SEQUENCE LISTING OR PROGRAM

Not Applicable

BACKGROUND

1. Field of the Invention

This invention relates to a vision substitution method and device for communicating audio and tactile representations of visual features found within visual representations.

2. Prior Art

Devices have previously been invented that substitute for aspects of vision with another sense, particularly hearing and touch. Often such devices convey particular pieces of information, such as the presence of obstacles. Such devices can be useful to blind and partially sighted people, and to those temporarily unable to see, for example aircraft pilots blinded by smoke. Relief images such as tactile maps can display unchanging two-dimensional images. However the instantaneous production of vision substitution images is difficult to achieve, as hearing and touch cannot fully replace the vast amount of information provided by sight. Fourier d'Albe's 1913 Reading Optophone presented the shapes of letters by scanning lines of type with five vertically-arranged spots of light, with each spot controlling the volume of a different musical note, producing characteristic sounds for each letter. The Optacon™ uses a vibrating matrix to display letters and other printed material. U.S. Pat. No. 5,097,326 describes a sound-based device for presenting live images, and U.S. Pat. No. 6,963,656 describes using musical sequences to convey features of images. The software iFeelPixel™ (described on Internet website www.ifeelpixel.com) presents audiotactile effects on force-feedback devices in response to particular graphic elements. U.S. Pat. No. 1,647 describes Morse code. There are many patents for braille displays.

Haptic joysticks and mice are disclosed in several earlier patents. U.S. Pat. No. 5,589,854 discloses a force-feedback joystick. U.S. Pat. No. 5,742,278 discloses a force effect software application programming interface and a force-feedback joystick similar to Microsoft's™ Sidewinder Force Feedback Pro™. U.S. Pat. No. 6,191,774 discloses a force-feedback mouse similar to Logitech's™ Wingman Force Feedback Mouse™. U.S. Pat. No. 6,429,849 discloses a force-feedback joystick similar to Microsoft's Force Feedback 2™.

The terms "vision substitution" or "sensory substitution" are commonly used to refer to systems that present features of images via other senses, but the terms are controversial as such systems generally only communicate a small subset of features of images. "Perceptual supplementation" has been suggested as a more appropriate term.

Since 1997 the present inventor has disclosed information on Internet websites and award entries. Internet website ourworld.compuserve.com/homepages/DavidDewhurst/home-page.htm and linked pages of Mar. 11, 1997 disclosed presenting monochrome light levels and their arrangement as tone- and speech-sounds, and their braille equivalents; simulating the function of the eye's macula and fovea, and their movement; and encoded entities. Saatchi & Saatchi "Innovation in Communication Award" entry of May 1, 1998 and follow-up details of May 8, 1998 disclosed using moving audio and tactile effects (known as "tracers") to convey specific shapes; a haptic joystick-like device used to present shapes and used by the user to select areas of images; designer-selected features for prepared material; presenting change, and using it to control image selection; categorically-conveyed colors, textures and distances; and presenting entities as "audiographics" comprising several "tracer" components. Internet website ourworld.compuserve.com/homepages/DavidDewhurst/Vuphonics.html and linked pages of Feb. 22, 1999 disclosed audiotactile objects & structures; using intensity variation to communicate textures; and multiple movable "viewzones" of various shapes and configurations within images. (Unpublished UK Patent application Ser. No. GB9809511.1 filed May 1, 1998 covers these features.) Summary versions of the above have been accessible via the Internet websites www.vuphonics.com, www.stve.org and www.hfvc.org.

The earlier inventions did not emulate the way in which sighted people's seeing changes when they are engaged in different activities, and how their visual attention can be attuned to particular features when they are looking for certain items. For example, if blind users are seeking a large red item, they will want to be alerted to those visual features that correspond to such an item. Other parameters need to be changed when a particular activity is occurring. For example, if a widescreen-format television program is being presented, the source image will need to be masked and processed in a different way to that used for general video images.

Another problem with the earlier inventions was that the output tactile displays (e.g. braille and Optacon displays) were expensive, and it is sometimes difficult to "read" braille or other finger-read categorical tactile displays when they are embedded in a moving mouse or joystick, necessitating a separate display that is read with a separate hand. Many blind people are unable to read braille.

Earlier inventions have attempted to present shapes, but when this is done via moving effects there is a tendency for certain differing shapes to be perceived as similar "blobs".

SUMMARY

In accordance with example embodiments, a vision substitution system for producing audio and tactile representations of visual representations comprises identifying lineal features within said visual representations, identifying corners within said lineal features, outputting apparently-moving audio and/or tactile effects that follow the paths of said lineal features, and outputting distinct audio and/or tactile effects representing said corners at the points in time when the audiotactile effects presenting said paths reach locations corresponding to the locations of said corners.

BRIEF DESCRIPTION OF THE DRAWINGS

Example embodiments of the invention will be described with reference to the accompanying drawings in which closely related figures have the same number but different alphabetic suffixes.

FIGS. 5A and 5B illustrate how "tracers" can convey "viewzones".

FIG. 6 illustrates examples of how "viewzones" can be configured from "panels" of "segments".

FIG. 7 illustrates examples of multiple-tracer scanning formats.

FIG. 8 shows a low-cost embodiment, which uses only standard hardware components.

FIGS. 9A to 9C show the multi-purpose Enhanced Joystick device.

FIG. 10 illustrates how the 3-dimensional "sound-screen" is modeled.

FIGS. 11A and 11B show how Layouts can be encoded.

FIGS. 13 and 14 show further example GUIs.

FIG. 15 shows how colors can be encoded in an English-language-based mapping.

FIG. 16 shows how colors can be encoded in a non-language-specific mapping.

FIG. 17 shows a compact encoding that allows pairs of 22 colors to be communicated.

FIG. 18 shows "DinCoTex" encoding.

FIG. 19 illustrates how "blobs" of color that bridge panel boundaries can be conveyed via braille.

FIG. 20 shows how colors can be mapped to coded impulses.

FIG. 21 shows how optical processing can help to identify entities and edges in a scene.

DETAILED DESCRIPTION

Figure 1:
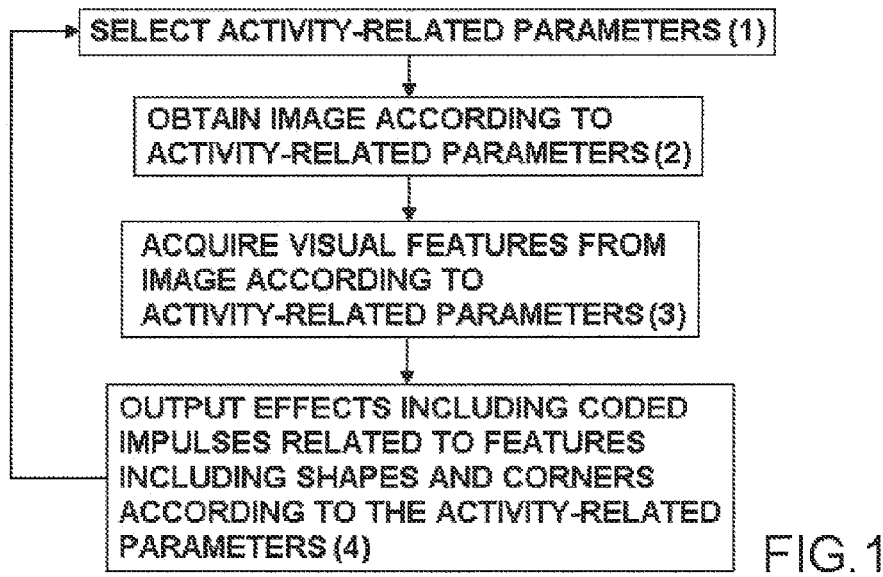
FIG. 1 shows a simplified summary flowchart.

The embodiments address the highlighted prior art issues by:

a) Allowing the user to rapidly switch between sets of parameters by selecting particular activity identifiers, or switch to a "general" set of parameters. The activity identifier selected can also determine options other than the filtering, for example the output configuration to use.

b) Using coded impulse communication when the amount of categorical information to be presented is modest. Such communications can be received haptically on many possible parts of the body. Such tactile effects do not interfere with the user's hearing.

c) Emphasizing the corners within shapes. This feature greatly improves perception of shapes via audio and tactile means.

The embodiments model aspects of visual perception by modeling the way things are perceived rather than conveying raw optical measurements. This is achieved by using categorical sounds and tactile effects to represent those features of vision that are normally perceived categorically, and by carefully selecting the information that is presented to the user. It simulates the instant recognition of properties and objects that occurs in visual perception, by using the near-instantaneous recognition of phoneme sounds that occurs when people hear speech, and rapid recognition of tactile effects.

The characteristics of the image (e.g. color) that are conveyed by the sounds and tactile effects may not be perceived by the user in the same way as a sighted person perceives them. However the information may be useful in itself—for example knowing the color of something can be useful to a blind person, even if they have never perceived and cannot imagine the property of color. The audio and tactile effects give factual information about a scene, as well as providing users with information from which they can form a "mental image" of the scene.

The embodiments use one or more modeled moving speech-like sound consisting of specific coded phonetic sounds that can be rapidly interpreted by the user in a categorical and linguistic way. Morse code-like effects are also used to present coded visual features.

In the audio modality the location within the image of visual information being presented is conveyed by a) the frequency of the sounds, b) the binaural positioning, and c) the order and nature of the sounds conveyed. The frequency represents the vertical angular height within the image (with the left-right binaural positioning representing the horizontal angular position within the image). This would appear to be an "intuitive" approach, as similar conventions have been independently devised for use in other inventions. The change in frequency occurring as the angular height changes can be linear, but the preferred approach is for the frequency to change logarithmically as the angular height changes, in a similar manner to the way that the frequencies of notes in a musical scale change, with higher frequencies being used for the higher parts of the image and lower frequencies for the lower parts of the image. Specific shapes can be traced out by "audiotactile tracers" continuously changing the pitch and binaural positioning of the sounds to sequentially represent adjacent parts of the shapes. In the tactile modality, the position and movement of the main pointer-column conveys proprioceptive and kinesthetic representations of location and movement, and the tactile palm-pad can convey specific shapes FIG. 9 (the location can also be "told" by braille cells). Vibrations of the same frequencies as are used for the audio effects can be applied to the pointer-column and palm-pad elements. By smoothly changing the pitch and binaural positioning of the sounds, and the locations of the tactile effects, they can be made to appear to move, whether following a systematic path or the path of a specific shape. Such apparently-moving effects are referred to as "tracers", and can be "area-tracers", which systematically present the properties of the corresponding parts of an image; or "shape-tracers", whose paths convey the shapes of particular items in an image. Corners of shape-tracers are emphasized by additional effects. In the tactile modality, tracer location and movement can be presented via force-feedback devices such as joysticks, or on special apparatus. Moving effects are generally easier to mentally position than stationary ones.

This approach differs from some other haptic methods which allow the user to explore a shape by moving around it on their own volition. Instead, the embodiments generally "conduct" a user around a shape, and emphasize its corners, under the control of the embodiment, which might be less tiring and require less attention of the user than when requiring them to actively explore a shape. The embodiments could be used in combination with other systems that use different approaches to comprehending shapes.

As the system outputs both audio and tactile effects, users can spread the information load to suit their abilities and circumstances: they can choose which modality to use; or both modalities can be used simultaneously, allowing more information to be presented during a certain period of time. The embodiments generally allow the user to select the most appropriate modality for each component of vision, and this can vary according to the selected activity.

The embodiments can be used by partially-sighted, blind, deafblind and color-blind people. They may be used as general vision supplements, as mobility aids, or to find out particular pieces of visual information such as colors, or shapes and corners. They can be used to present shapes and corners to sighted people in various applications, for example as part of a training aid; game; toy; or puzzle. Embodiments could be used by blind people to comprehend the shape and corners present in live or recorded images. The embodiments can convey a prepared program of material, and the sounds and tactile effects produced can be used for artistic purposes, and can be recorded or broadcast.

Several preferred embodiments will be described. Preferred embodiments can be constructed using bespoke hardware and software, or can be created using existing components with bespoke software.

The capital letters "C" and "V" will be used to refer to consonant and vowel phonemes respectively, and the letters will be joined to refer to the phonemic format of speech-like sounds. For example the sounds of the name "Lucy" would be described as being of CVCV-format.

A two-capital-letter format is used to describe particular phonetic sounds, and is based on the format used for the documentation describing the allophones produced by the General Instruments Microelectronics™ SPO256™ speech synthesizer. It is thought that this format is easier for non-specialists to understand than the more common International Phonetic Alphabet. For example the sounds of the name "Lucy" would be shown as "LLUW-SSIY".

The terms "communicated", "transmitted", or "conveyed" will be used to refer to the process of translating some or all of an image into sounds and tactile effects that represent the features of the image.

The embodiments use several methods to substitute for aspects of vision, and there is some interaction between the methods. Hence there will be some overlap between topics, and this description contains some repetition and cross-references. Several examples of how to present visual image properties and perceptual effects as apparently-moving audio and tactile effects will been described. A consensus may emerge as to the most effective combination of options, which can then be set as the default configuration for the system. Other similar methods can be devised, and the scope of the invention is not limited to the examples described herein.

This description will include the following sections, which are numbered so that they can be cross-referenced:—
1. SUMMARY OF METHOD AND APPARATUS, AND THEIR OPERATION
2. DESCRIPTION OF PHYSICAL COMPONENTS
2.1 EXAMPLE PROCESSING PLATFORMS
2.2 VIDEO CAMERAS AND DISTANCE MEASURING APPARATUS
2.3 FORCE-FEEDBACK DEVICES
2.4 ENHANCED JOYSTICK DEVICE
3 DESCRIPTION OF SOFTWARE
3.1 OPERATING SYSTEMS AND PROGRAMMING LANGUAGES
3.2 MAIN PROCESSING STEPS
3.3 GRAPHICAL USER INTERFACES (GUIs)
3.4 SPEECH, BRAILLE AND CODED IMPULSE ENCODING
4 KEY FEATURES
4.1 ACTIVITY-RELATED PROCESSING
4.2 CODED IMPULSES
4.3 OPTICAL PROCESSING—ACQUIRING FEATURES, LINES AND CORNERS
4.4 COMMUNICATING LINEAL FEATURES AND CORNERS
4.5 PREDETERMINED FEATURES
5 OTHER FEATURES
5.1 COMMUNICATING TEXTURE
5.2 TIMING EFFECT OUTPUT
5.3 "VIEWZONES", ZOOMING AND MOVING
5.4 SPEECH SYNTHESIS
5.5 COMMUNICATING CHANGE AND MOVEMENT
5.6 PRESENTING ENTITIES
5.7 PRESENTING OBJECTS AND STRUCTURES
5.8 MISCELLANEOUS OTHER FEATURES
6 GLOSSARY 1. Summary of Method and Apparatus, and Their Operation With reference to FIG. 1 which shows a simplified summary flowchart, the method steps and apparatus comprise:—

Step 1: Select Activity-related parameters. The user will normally select a set of Activity-related parameters, via an Activity identifier. The Activity identifier will determine the parameters that will be used to control the subsequent processing. In a preferred embodiment that uses a graphical user interface (GUI), a drop-down list of activity identifiers FIG. 27 might be used for selecting an activity identifier. A default activity identifier (e.g. "General") should be provided for cases when the user is unsure, or for when no particular focused activity is taking place. The selected Activity can be changed by the user at any time.

The parameters that control processing for any activity will normally be initially set up, either by the user, or by being initially provided with the system, or both. The user should normally be able to adjust parameters according to their preferences as they become more experienced with using the embodiment. See section 4.1 below for more details.

Step 2: Obtain visual representation (e.g. image) according to the activity-related parameters. The visual representation will normally be an image of some kind, though it could be the description of a shape and its corners, for example as provided by a set of coordinates, without taking the form of an image. Other visual representations might be used, for example data that can be presented visually, maps, 3D shapes etc. Any type of visual representation is generally suitable. If the visual representation is in the form of an image, it might be provided by a live video image (for example from a camera, broadcast, Internet transmission etc.); a filed image, for example an image in one of the many formats used on computers (e.g. bitmap or JPEG format); a frame of a movie read from a movie file (e.g. in .AVI or MPEG format) or a DVD; etc.

Step 3: Acquire visual features related to the visual representations according to the activity-related parameters. Such features can be simple areas and arrangements of color; shapes, corners, and other basic visual components; and entities such as text, objects etc. The visual features can be acquired by doing optical processing of the visual representations; or by extracting predetermined features that have been previously decided, for example by a sighted designer selecting key features in images for presentation. (In this specification, the term "predetermined" is not used to mean "particular", but is used in its everyday meaning of "determined beforehand" i.e. not determined "on-the-fly".)

Step 4: Output effects, including sequences of coded impulses, on provided audio and/or tactile displays, the effects relating to the visual features, including shapes and corners, according to the activity-related parameters. The provided output apparatus can be audio and/or tactile display apparatus suitable for presenting effects related to the visual features. In the audio modality, standard audio equipment can be used, for example a computer sound-card and stereophonic headphones or loudspeakers. These can present encoded categorical sounds such as speech; and shape effects by continuously changing the frequency and binaural positioning of the sounds.

In the tactile modality, a braille display can present categorically-described features, such as colors and entity descriptions, and an "Optacon"™ or similar device can present shapes. A force-feedback type joystick can also be used as flexible tactile display, being suitable for presenting shapes and corners, and categorical features encoded as Morse code-like impulse effects, as well as allowing the user to indicate and select parts of the images and communicate with the embodiment. Standard or bespoke force-feedback devices can be used.

The encoded impulses output on a force feedback device may be perceived in an audiotactile manner, as the device will generally exhibit a tapping noise as it presents the tactile impulses.

Shapes, and significant corners within the shapes, can be presented by continuously moving the position of the effects and presenting indicators ("indicium effects") at points where corners occur.

The nature of the output effects can be determined by the selected activity-related options/parameters.

Example Feature Encoding and Shape and Corner Presentation

Categorically-described visual properties are normally presented to the user via groups of CV (Consonant-Vowel) syllables; via Morse code-like impulses; and via braille.

Figure 2:
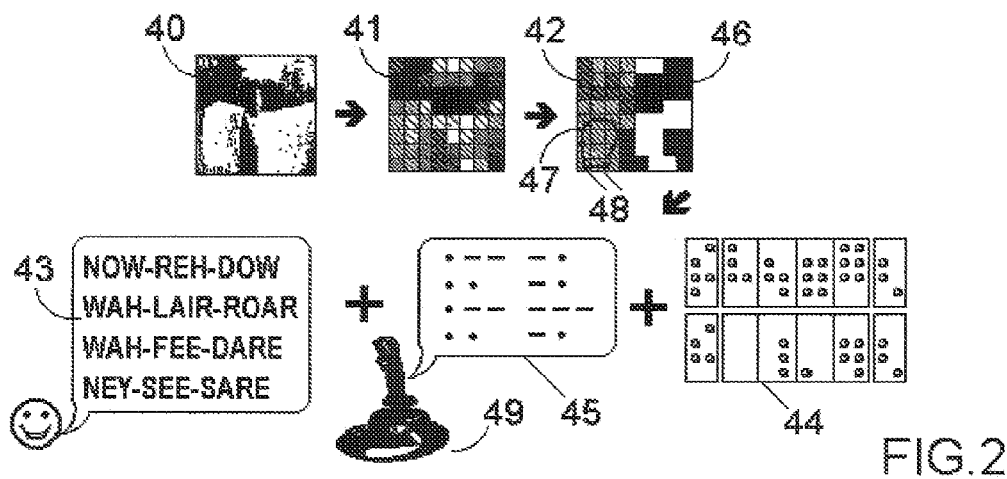
FIG. 2 illustrates conceptually how image features can be presented via other senses.

With reference to FIG. 2 (which diagrammatically illustrates an example of the encoding approach and shape and corner presentation), after the user has selected an Activity, the image 40 is reduced to 8 by 8 pixels 41. The pixels in each square of 4 by 4 pixels (known as a "Panel") are each set to one of the two shades that the system calculates best represent the panel 42. Then the image is presented via audio 43 and two tactile methods 44 & 45. For each panel, one CV syllable conveys the two selected shades; and two CV syllables convey the arrangement of those two shades, to the level of detail shown in the pixelated image 42. (The method of conveying the arrangement of the two shades is known as the "Layout" method.)

For the top right "panel" 46 in the pixelated image 42, the CV syllable "WWAE" conveys the two color shades "white and black", and the two CV syllables "LLXR-RROR" present the "layout" of the two color shades as 4 by 4 pixels. The whole image is conveyed by the four spoken "words" shown 43, and by the corresponding 12 braille cells 44, both of which fully describe the 8 by 8 pixels shown in 42. The coded Morse code-like impulses 45 exhibited on the force-feedback joystick 49 present the color shades. The user can control whether the system outputs audio and/or tactile effects to convey the color shade pairs and/or the pixel "layouts".

In the rest of this description an area of an image whose colors are usually described by a single pair of colors that the system calculates best represent it is referred to as a "Panel". The pixels within a panel are arranged into equal-sized areas referred to as "Segments", and the arrangement of the colors (selected from the pair of colors) that best represents the actual average-pixel-colors of the segments is referred to as a "Layout".

The shape 47 FIG. 2 has been identified by the system as significant, based on the selected Activity's parameters, and its main corners 48 have been located. It can be presented to the user by moving the audio effects and the joystick 49 in the path of the shape 47 and outputting corner-representing effects at the appropriate times, whilst the categorical effects relating to the area concerned are being presented (via speech, braille or impulses). The categorical effects can be for the whole of the panel as shown, or they can describe the properties of the shape (e.g. its color).

The decision as to whether the Layout of an area, or the shapes (or other features and entities) within an area are presented is determined by the content, and by the Activity-related filter options, particularly the Selection filter. This process is described in section 4.3. The "Playtime" 748 FIG. 12 specifies the time allowed for presenting all effects before the next image is processed, and this may have an impact on how much visual information can be presented.

Tactile Effects and User Interaction

The system's audio effects have tactile equivalents, which can be presented by using standard force-feedback devices to convey location and shape; and braille or coded impulse methods to convey categorical properties.

If 16 consonants and 16 vowel sounds are used, 256 (i.e. 16×16) combinations of CV syllables are available. This is the number of different dot-patterns that can be displayed on a programmable 8-dot braille cell. 44 FIG. 2 shows one way in which the information conveyed by the spoken sounds could also be displayed on 12 braille cells.

A low cost alternative method of conveying categorical information can be implemented by inducing Morse code-like impulses 45 on a standard force-feedback device 49. These can be grouped into pairs of four (or less) impulses, each one of two types (separated by pauses), and each group of four impulses allowing 16 possible combinations of impulses, corresponding to a coded consonant (C) or vowel (V), with the two pairs (8 impulses) conveying the equivalent of a coded syllable or braille cell. Impulse-based tactile coding is relatively slow compared to speech or braille, but may be useful for blind and deafblind users who cannot read braille. It will not add to the hardware costs of a system that in any case uses a force-feedback device. Shorter impulse code sequences 45 can be used for commonly-occurring values, in a similar manner to the way standard Morse codes are allocated.

A force-feedback joystick 49 makes an effective pointing device with which the user can indicate areas of the image, as it can also be programmed to tend to position itself to one of a number of set positions, so that a "notchy" effect is felt as the joystick is moved, giving a tactile indication of location.

Sections of an image can be selected by the user via the pointer/joystick, so that only those parts are presented by the audiotactile effects, but at a higher resolution (such areas are known as a "viewzones"). The user can instruct the system to "zoom in" to present a smaller area, but in more detail, as well as to "zoom out" to present a low-resolution representation of the whole image. The viewzone can be positioned as required.

A force-feedback joystick can also be moved by the system, pushing and pulling the user's hand and arm, both to convey any shapes and corners that are to be presented (by tracing them out), and to indicate the area within an image that is currently being described via the audiotactile effects. (The user can override the joystick forces at any time, for example if they wish to change the section of the image that is being presented.)

Two force-feedback devices can be used: the main joystick can be used as a pointer by the user; and by the system to indicate the location and size of the area being presented. The other device, for example a force-feedback mouse, can be used by the system to present any shapes, the "tracer" being expanded in size to better convey the details of such shapes.

Conveying Image "Textures"

The textures of an area or entity can be conveyed via small fluctuations in the volume of the speech-sounds. These volume effects combine the effects of changes in brightness, color etc., to give a single volume-conveyed "texture" effect. This simulates the effect found in vision whereby the overall properties of an area tend to be perceived categorically, while the minor variations across it are perceived as varying textures. The user does not need to follow the precise detail conveyed by the volume effects, but gets a general impression of the textures of an area or entity from the volume fluctuations. Similar effects can be induced on the force-feedback devices.

Combined Layouts and Textures

The "Layout method" can be combined with the texture-conveying fluctuations in intensity of audio (or tactile) effects: the speech sounds can follow the Layout method, but the volume of the speech can be varied to convey the brightness, color and distance detail of the segments in a more intuitive manner than is achieved via the Layout method alone.

Figure 12:
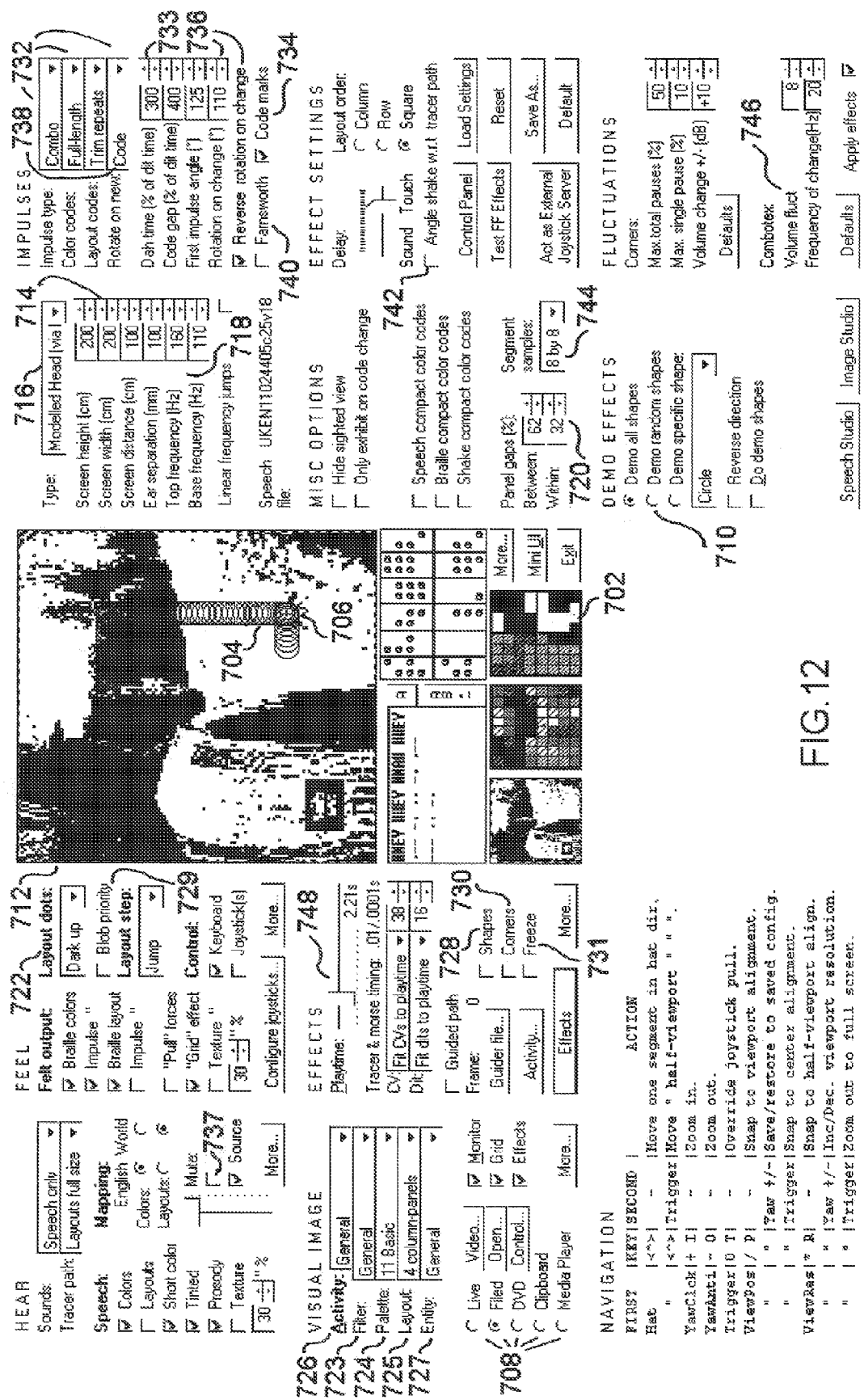
FIG. 12 shows an example main graphical user interface (GUI) for an embodiment.

For tactile and audio tracers the tracer can follow a path that corresponds to the center of the panels being conveyed at any moment 702 & 704 FIG. 12, or corresponds to a smoothed curve passing through the centers of the panels, moving at an even rate. In both cases the volume variations can reflect the varying texture levels of the segments in the panels. If the first approach is used then the tracer should be stationary for most of the time period allocated to any panel, then move briskly (but not instantaneously) 704 to the next panel position 706. (Instantaneous movement to panel positions can give a distracting jarring effect.)

The pitch and binaural positioning of the audio tracer can correspond to the height and left-right position of the segment(s) conveyed by the tracer(s) at any moment. FIGS. 5A and 5B show two examples of how "viewzones" can be arranged in this way. FIG. 5A shows a viewzone with segments arranged as four panels, and within each panel sub-panels are arranged as four rows of four segments. A single tracer follows the path shown, conveying the texture levels of the rows of segments. FIG. 5B shows a configuration wherein four tracers simultaneously output the texture levels of the irregularly-shaped segments that they are conveying, with the basic coded speech sounds being those for the panel being conveyed. For both examples, the categorical effects describe the Layout (or other feature); or, as an option, can present a value for the property(s) that apply to the whole panel being presented (e.g. two colors), with only the volume fluctuations conveying the detail. In the latter case the property-describing effects (sound and tactile) conveyed by one or more moving tracers at any moment can represent a consolidation of the properties of the parts of the image that are within the area represented by tracer(s) during a certain period of time—these are known as "Averaging" effects. When Averaging effects are output, successive CV words can be spoken to convey the changing average value of the properties for the areas being conveyed. (With the "Layout" method, the arrangements of properties in parts of the image are conveyed as categorical effects.)

FIG. 6 shows a selection of possible configurations which could be used for Layout segment arrangements within panels, and FIG. 7 shows ways in which simultaneous multiple audio tracers can present the texture of the area of panels within a viewzone. These will not be described in detail as similar approaches are used in other audio-based vision-substitution systems. The key difference is that the fluctuations in volume are applied to the meaningful speech-like sounds which are describing the categorical properties of the area being presented.

The example shown in FIG. 2 and described in the rest of this summary show some of the ways of systematically presenting a section of an image (the example encoding shown may not match encodings used elsewhere). Many similar configurations can be devised, and the scope of the invention is not limited to the examples described herein.

2. Description of Physical Components 2.1 Example Processing Platforms

Figure 3:
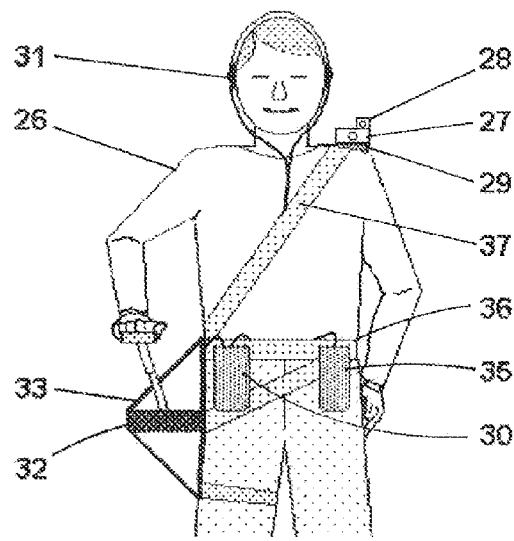
FIG. 3 shows an example of how a portable embodiment might be carried by a user.

FIG. 3 shows the physical appearance of a compact, portable and battery-powered preferred embodiment, and how it might be carried and used by a blind person, when it is used as a mobility aid. The user 26 carries the video camera 27 which holds the distance-measuring module 28. This may be a separate unit attached to the video camera. The video camera 27 is attached to the shoulder-"platform" 29 by magnets or by self-fastening tape strips (not shown), so that it can be quickly and easily removed by the user to allow them to point it in a particular direction or to use it for close-up viewing. Alternatively the video camera may be mounted on headgear (not shown). The video camera 27 is connected to the belt-mounted system unit 30, which translates the video signal and the distance information into the stereophonic sound and tactile format which is presented to the user via the pair of stereophonic headphones 31 and special Enhanced Joystick 32, with which the user can control the function of the system unit 30. (FIGS. 9A, B and C show more details of the Enhanced Joystick when in "desktop" mode.) The base of the Enhanced Joystick is firmly attached to the body-worn framework 33. The Enhanced Joystick 32, as well as the "system unit" 30 (which may be a bespoke device or a portable computer or similar device), the video camera 27 and the distance-measuring module 28 can be powered by the rechargeable battery pack 35. The shoulder-platform 29 is secured to the belt 36 by a shoulder-belt 37. Both the belt 36 and the shoulder-belt 37 may conceal the cables that link the components and may be distinctively colored to alert other people to the fact that the user cannot see.

The system unit 30 contains the electronic circuitry and software that performs many of the functions of the embodiment. An embodiment of the system unit could be created by building a bespoke device that uses standard separate components (including microprocessors) to perform the functions described in this specification. Such an approach is not described in detail here, but the features of the system unit are described in sufficient detail to enable an embodiment of it to be constructed by someone who is skilled in the arts of electronic design and construction, including the art of microprocessor interfacing.

An embodiment could be created by installing standard image-gathering, sound-generating and speech-synthesizing software (and any necessary hardware) on a non-portable computer or portable computer or "wearable" computer, developing appropriate software and installing it on the computer. Standard blindness aids could also be provided, such as a braille display.

FIG. 8 shows the physical appearance of a low-cost preferred embodiment, which uses only standard hardware components. The laptop computer 50 uses Microsoft's™ "Windows"™ operating system, on which the bespoke application software for the embodiment is seen running 51. In FIG. 8 a standard "magnifier" accessibility tool is running and highlighting the Activity selection drop-down list 52. The visual representations are provided by the webcam 53; the video tuner 54; the inbuilt laptop DVD player 55; from files held on the laptop computer 50; or from demonstration shapes and corners; etc. provided by the bespoke software 710 FIG. 12. The force-feedback joystick 56, for example Microsoft's "Sidewinder Force Feedback 2"™, is used by the user to indicate areas of the image and control the software, and by the system to present the Morse code-like impulses that can be felt and heard. The force-feedback mouse 57, for example Logitech's™ "Wingman Force Feedback Mouse"™, is being used by the system to present shapes. If one-handed use is preferred then the tactile effects and user control functions can be combined on one of the force-feedback devices. Additional control is provided by the numeric keypad 58. The laptop's internal loudspeakers output the audio effects. Alternatively separate loudspeakers or headphones can be used (not shown). All of the peripheral devices shown in FIG. 8 can be connected to the laptop 50 via its USB ports (connecting cables not shown).

2.2 Video Cameras and Distance Measuring Apparatus

The video camera 27 FIG. 3 used to obtain live images can be any conventional small video camera that supplies a suitable video signal. However if distance information is to be conveyed then such information must be supplied to the system unit. Two example approaches are now described:

a) The module 28 measures the distance of the object nearest to the video camera 27 and near the center of the camera's field of view. The module 28 can be any standard distance-measuring device using, for example, timed ultrasonic reflection or infra-red light beams to determine the distance. Such devices can be mounted on the video camera 27 or may be found as part of the autofocus mechanism of many existing video cameras. The distance so measured will be assigned to all segments of the image. Only a single distance will be conveyed for any image (usually the closest distance detected). However this may provide useful warning information to the user.

b) Alternatively a video camera specially constructed for the embodiment can be used, which will provide several images that are of the same scene. These images are focused at different distances, for example by using a system of semi-silvered mirrors to allow several image sensors to receive the same view focused at different distances; or by rapidly moving a single image sensors or lens to obtain several images of the same view that are focused at different distances. The camera should be have its aperture fixed at the widest setting, with the cross-polarizing filters, neutral-density filters or variable gauzes used to control the light input level. The granularity of corresponding sections of the image can be measured and compared, and for each section the two of the images which exhibit the highest granularity will be deemed to bridge the point of focus. By interpolating between the focusing distances of these two images, a value for the distance of the subject matter will be produced.

If distance measuring is performed, the system should assign a distance value to each viewzone segment. Often distance information will not be accurate to a particular segment level—in such cases the system can assign the same distance value to several adjacent segments.

A system flag can specify if distance measure information is available, and what method is being used. When no distance information is available the system will assign the distance of infinity to all areas of the image. In other cases the method of processing will depend on the type of video camera and distance-measuring system that are being used. If a single-distance-measuring system is used, then the system will assign the distance to all areas of the image.

Other distance-measuring approaches can be devised and used.

A useful additional facility would be provided by an infra-red sensitive video image-sensor element (not shown) which would allow temperature values to be assigned to parts of the image. This would allow general temperature information to be conveyed and could warn the user if a dangerously high temperature is nearby.

Any standard feature of available video cameras may be used, for example low-light operation; image-steadying devices; and close-up and zoom lenses. (N.B. the use of zoom lenses may result in the angle covered by the binaural sound image not matching the angle covered by the scene being represented, unless the change in angle is allowed for during the processing to give the correct binaural positioning.)

2.3 Force-Feedback Devices

A standard force-feedback joystick or mouse can be used as a tactile display and to control the system i.e. the user can indicate areas of the image with it but it can also move independently, controlled by the system, moving the user's hand and arm both to indicate a position in space, and to convey shapes (and corners). It can provide many, but not all, of the facilities of the bespoke "Enhanced Joystick" device (described in section 2.4). Most low-cost consumer force-feedback devices use Microsoft's™ "DirectX"™ "DirectInput"™ protocol to interface with a computer. The DirectInput "Spring", "Custom Force", "Constant Force" and "Periodic Force" force effects have been found to be useful for implementing some of the effects described herein. It is important to assess the performance of the available joysticks, as they vary widely. Several standard joysticks are not powerful enough to firmly move the user's hand and arm, and many do not implement the full range of DirectInput forces. Particularly the "Spring" condition must be able to accurately move and hold the users hand in particular locations. The devices found to be effective for use in connection with the example embodiments include Microsoft's™ "Sidewinder Force Feedback Pro"™ and "Sidewinder Force Feedback 2"™; and Logitech's™ "Wingman Force Feedback Mouse"™ (not shown). All of these devices have been found to work effectively on the Windows 98™ and Windows XP™ operating systems, but at the time of writing are less well supported under Windows Vista™.

Logitech's "Wingman Force Feedback Mouse" has joystick emulation facilities, and is sufficiently powerful to pull the user's fingers to convey shapes (and corners), if it is loosely held. The "Wingman Force Feedback Mouse" only has three control buttons, but a suitable communication protocol can be devised using multi-key sequences, as described below.

If the user does not need to have their hand and arm pulled to particular locations, but simply needs to use a pointer to indicate a location to the system (for example to move the viewzone), then a standard (non-force-feedback) joystick can be used, with a system of mechanical sprung fixed locations implemented (for example by using spring-loaded rotating ball assemblies that engage with matching holes when correctly located—not shown). Hence the "notchy" effect produced by the force-feedback "Spring" force effect can be mechanically simulated.

Using a very-low-cost standard joystick, with the "return to center" springs removed (not shown), allows the user to indicate location without force feedback being felt. Such a joystick could have a friction device added (not shown) so that it tends to hold its position when released by the user. It can be used in conjunction with a force-feedback joystick, with one hand moving the un-powered joystick, and the powered joystick following and "jumping" between "grid" positions, giving an effective tactile indication of location.

Two (or more) force-feedback devices can be used as shown in FIG. 8. Microsoft's DirectInput allows such devices to be "enumerated", so that signals can be sent to particular devices. For example, the main joystick 56 could be used primarily as the pointer, indicating the location and size of an entity (which may be very small); the other device, for example a force-feedback mouse 57 (or second joystick) could be used to convey the shape of the entity, the tracer being expanded in size to better convey the detail of the shape.

User Control of Force-Feedback Devices

Complex button-combination sequences need to be devised to control the embodiments with just three buttons. Up to 75 different signals can be given by pressing each button a maximum of one time but altering the order in which the three buttons are pressed down and released up i.e. so that the signal begins when one button is pressed, ends when all buttons are up, and each button can only be pressed once (some of the 75 combinations are quite complex and difficult to use). Such signals can be used if Logitech's™ "Wingman Force Feedback Mouse"™ is the main force-feedback device used by the system.

Programming "Spring" Force Effects

Many joysticks have several "Spring" force effects available that can be activated simultaneously. By triggering several Spring effects for the same location, a more powerful overall spring effect will generally be experienced by the user. When moving such a multi-Spring effect between locations, interleaving the time period over which the several Spring effects are moved will temporarily produce a net Spring effect between the two locations, resulting in a smoother movement action.

2.4 Special Enhanced Joystick Device (Much of the description of the use of the Enhanced Joystick device in this section is also applicable to standard force-feedback devices, where appropriate.)

FIGS. 9A to 9C show the multi-purpose Enhanced Joystick device including FIG. 9B the hand-set and its actions, and FIG. 9C the upper face of the hand-set. However much of its functionality (described in this section) can also be provided on a standard force-feedback joystick, as described above.

Precise mechanical and electrical specifications will not be given in this section, but the multi-purpose Enhanced Joystick FIG. 9A will be described in sufficient detail to allow it to be constructed by someone skilled in mechanical and electrical engineering, and in computer interfacing techniques.

The device is shown implemented in desktop form in FIG. 9A. The base of the Enhanced Joystick can be firmly attached to a body-worn framework 33 FIG. 3 so that the user can operate the device while walking etc. without having to grip the base with one hand.

With reference to FIGS. 9A to 9C the Enhanced Joystick comprises a base 14, a joystick-like pointer-column 15 and multi-functional hand-set 16 which contains four control buttons 17, a "hat-switch" 9 plus several tactile display facilities. The hand-set 16 is shown with flat faces, but can be shaped to comfortably fit the user's hand.

The multi-functional hand-set 16 is mounted at the top of the extending pointer-column 15. The base of the column is attached to the base 14 of the Enhanced Joystick via a universal joint (not shown).

The left-right position of the column is used to indicate the corresponding horizontal position within the image, and the forwards-backwards position of the column is used to indicate the corresponding vertical position within the image. The column 15 comprises two telescoping sections 22 & 23, the upper section 22 shrouding the lower section 23, and the overall length of the column is controlled and altered by the system-controlled solenoid 24, whose positioning is set via a system-controlled digital-to-analogue converter (not shown). The solenoid is located near the top of the lower section (alternatively a motor-and-cable arrangement—not shown— could raise the upper section). The column is lengthened (and so the hand-set 16 raised) to indicate closer entities within an image.

The hand-set 16 is attached to the top of the pointer-column 15 via a restricted-movement universal joint (not shown), the connection being sprung so that it will tend to center the hand-set (not shown). Potentiometers or on/off switches are fitted to the universal joint and within the pointer-column 15 so that the user can communicate with the system by pivoting and twisting the hand-set 16 in certain directions to give "roll" (left-right), "tilt" (forwards-backwards) and "yaw" (twisting) instructions to the system (see FIG. 9B). The hand-set's universal joint, springing, and potentiometer arrangement could be produced by adapting an inverted simple computer joystick (not shown).

Much of the base, column and hand-set assembly can be produced by adapting a low-cost standard force-feedback computer joystick. They usually provide a "Spring" condition effect that can be used to position the joystick with controlled force, and often allow for wave frequencies up to 400 Hz (this may allow certain audio effects to be communicated to deafblind users). A force-feedback joystick typically has "yaw" (twisting) detection available and has control buttons, an 8-way "hat-switch", plus an analogue controller on its base.

Whether a bespoke construction method is used or a force-feedback joystick is adapted, the system should gently attempt to pull the pointer-column 15 to the nearest viewzone position applicable to the current "zoom level" (see section 5.3). If the user is moving the column around to browse an image they will then experience a "notchy" effect as the column "jumps" from the current viewzone position to the next viewzone position.

With reference to FIG. 9 the hand-set 16 comprises eight system-controlled 8-dot braille cells 10, two texture-drums 11 & 12, and palm-pad 13. Four switches 17 and an 8-way "hat-switch" 9 are incorporated in hand-set.

Control Switches

The four push-button switches 17 and 8-way hat-switch 9 are used to signal to and control the system unit, and can duplicate some of the functions of the GUI command buttons (FIG. 12), and keyboard actions. For example they can cause zooming in and out; temporarily stop the force-feedback pull; increase or decrease the resolution; align the viewzone; etc.

The 8-way finger-operated hat-switch 9 pressed can be pressed on its own, for example to adjust the position of a viewzone, or in conjunction with other buttons or keys to make selections.

Categorical Textures

The texture-drums 11 & 12 FIG. 9C are located close to where the user's middle and ring fingers naturally rest, and can be "read" by the user drawing their fingers backwards. Each drum is mounted on an axle and is rotated by a system-controlled stepper motor (not shown), so that any of its 16 sample surfaces can be turned to face upwards. The 16 surfaces are covered with samples of different textures and materials, for example felt, cork, rubber etc., and allow color, distance and texture etc. to be conveyed in a more intuitive manner than is achieved by using the braille cells. The two drums together convey 256 combinations of texture pairs, which can present the same encoded information as is presented on a single braille cell, for example a pair of color shades: each of the 16 categorical textures on Drum 1 11 could map to one of the categorical consonants and each of the 16 categorical textures on Drum 2 12 could map to one of the categorical vowels.

This facility allows the categorical properties to be conveyed to deafblind and non-braille-users.

An alternative to presenting actual textures to the user is to present categorical texture-conveying vibrations on the Enhanced Joystick. Force-feedback devices usually allow several standard wave types to be presented, such as square-, sine- and sawtooth-shaped waves of differing frequency and intensity.

However such vibrations must be perceivable in a categorical manner. Such vibrations can replace some or all of the categorical textures.

The Refreshable Braille Display

The eight 8-dot braille cells 10 are positioned so that they can be easily accessed by the user's index finger. The cell dot settings are controlled by the system, and either convey visual information in a special format, or can provide limited braille terminal facilities. Some users may have difficulty reading all eight cells via a single movement of their finger, but in such cases they should assign useful data to only those cells that they can easily read. The braille cells can be implemented by using standard piezo-electric dimorph braille cells that are available for incorporating into braille terminals.

The braille display 10 is normally read via a single sideways movement of the user's index finger without the user having to lift their hand, and can display up to eight 8-dot braille characters at any time. The braille display 10 can perform several "display cycles" during a single "Playtime" i.e. change what is displayed several times. Non-braille-experts may be able to use much of the braille functionality as some of it directly corresponds to certain image features rather than requiring rapid translation.

The braille display may alternatively be located in the Enhanced Joystick's base (not shown), requiring both hands to be used to control and interpret tactile output, or a separate standard braille terminal could be used. Braille terminals often have a line length of 40 or 80 braille cells, which is sufficient to allow several viewzones to be conveyed simultaneously for desktop use.

Many other useful data can be conveyed using the braille cells, for example text within images, and the exact configuration used may depend on the application to which the embodiment is being put.

The braille output from the system could be embossed on paper by using a standard braille printer, to produce sequences that can be "read" on another occasion.

The Tactile Palm-pad

The tactile palm-pad 13 traces out lines and other tactile effects on the palm of the user's hand, and can be used to convey shapes found in a viewzone. The tactile palm-pad 13 can be constructed using mechanical components: for example the palm pointer 5 can be attached to the hand-set 16 via a universal joint (not shown) and it can be moved by the system in a controlled manner by using two system-controlled servo motors (not shown). A system-controlled solenoid (not shown) raises the spring-loaded rotating ball assembly (not shown) against a flexible palm-pad 6 when a shape is to be conveyed, and the system-controlled servo motors (not shown) move the column to trace out the required shape that the user will feel through the palm-pad 6. The palm-pad should have a spherically-curved surface that matches the path of the end of the pointer so that the palm pointer-column 5 does not need to change length as the shape is being traced.

Alternative mechanical approaches to achieving a palm shape-tracer are to aim one or more jets of liquid at the underside of the flexible palm-pad surface 6, the liquid being recovered and re-used by the jet apparatus (not shown); or to remove the palm-pad surface 6 and replace the rotating ball assembly with a soft pointer that traces the shape directly on the user's palm (not shown).

However the most practical approach is probably to use a vibro-tactile pad 13 FIG. 9C, whose surface can more closely match the shape of the user's palm. An array of approximately 100 vibro-tactile elements, arranged ten by ten square 13, with a separation of about 6 mm between elements (i.e. array dimensions approximately 6 cm by 6 cm) can present the required shape to the user. The elements can be constructed using shaped memory alloy such as NiTiNOL™; piezo-electric material; or similar. The advantage of using this approach is that several tracers or other effects can be simultaneously conveyed on the palm-pad.

If vibro-tactile elements are used for the palm-pad then they can be made to oscillate at the frequencies used by the audio equivalent of the tracer being conveyed. The frequency range used will help to convey the vertical location and size of the tracer.

The shapes that are conveyed via audio shape-tracers can also be conveyed on the tactile palm-pad. However they are sized so that the shape makes maximum use of the palm-pad. (The size of the shape can also be judged by the movement of the pointer-column 15 which, as well as conveying the location of the tracer, can move at the same time as the shape is conveyed on the palm-pad (see section 2.3).

The palm-pad can be also be programmed to perform "signing" i.e. trace out letters and signs on the palm of the user's hand, a method of communication often used by deafblind people.

(The functionality of the palm-pad could to a large extent be replaced by using an "Optacon"™-like tactile array located on the hand-set 16, that the user reads with one of their fingers (not shown).)

3 Description of Software

Figure 4:
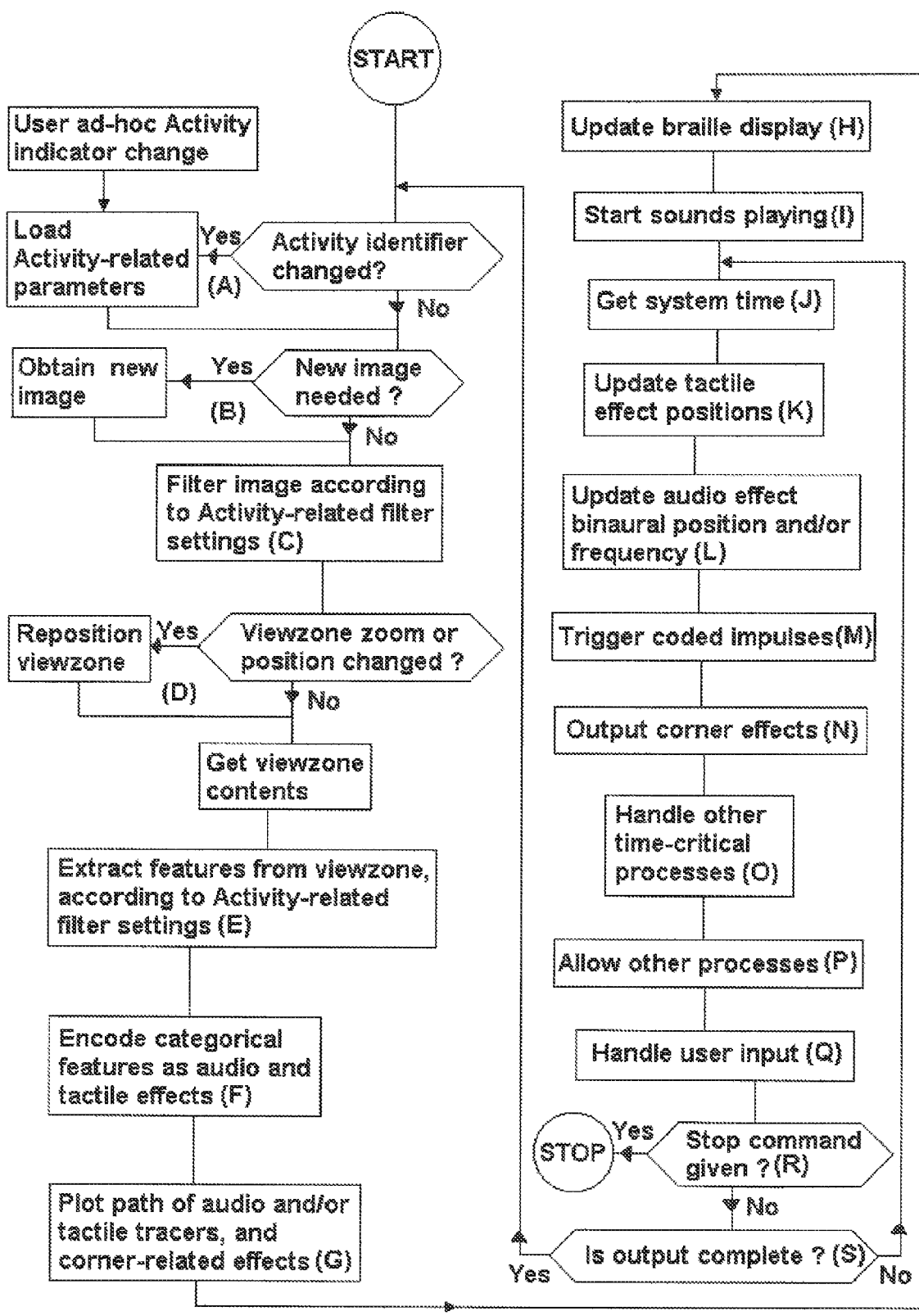
FIG. 4 shows a detailed flowchart for the main processing.

This description outlines the processes that are followed when the system is operating, and can be regarded as an outline functional specification of the software i.e. the software specification takes the form of a description of its function (and a system flowchart FIG. 4). A more detailed description will be given where the software development may not be straightforward. Sometimes the system software function will be described when the facility that it is controlling is described i.e. the software functionality description is spread throughout this description. The precise software design will depend on the processing hardware used and the preferred programming methods of the constructor. The constructor should first read the whole of this specification, then produce a detailed software design. Software development is a large subject and well documented elsewhere, but the data and processing required will be described in sufficient detail to enable software to be developed by people who are skilled in the art of software development, including its application to areas such as image processing, sound processing, speech synthesis, communication protocols and man-machine interfacing.

3.1 Operating Systems and Programming Language

The application software can be developed to run on a standard "Graphical User Interface" ("GUI") operating system (OS), for example Microsoft's™ "Windows"™ OS; Apple's™ "Mac"™ OS; or the "Linux"™ OS. Many low cost force-feedback devices will only operate with the "Windows" OS. However the force-feedback functionality can be provided for non-Windows OSs by linking via a serial, USB, or other communication line to a separate computer (for example a very small computer) that is running Windows and has force-feedback devices installed, and sending the necessary force feedback effect details to it, and the corresponding force effects can then be presented on the force-feedback device(s) by separate software running on the Windows-based computer.

A high-level programming language such as "Visual Basic"™ or "C++" will allow linkage to the operating system's multimedia facilities. Standard programming techniques can be used. For example "look-up" tables can be used instead of arithmetic calculations being performed if the calculations will yield a limited number of possible results for the possible inputs. Most of the processes are described in sequential processing format, but a multitasking approach can be used where appropriate.

The application software should be designed to be accessible to blind and deafblind people. Methods for doing this are widely documented elsewhere. However the software should also be fully-usable by sighted people who are unfamiliar with computer accessibility for blind people, so that they can assist blind users, investigate technical problems etc.

As with most standard commercial software intended for general use, the user should be able to alter the parameters that control the software. These should be optionally linked to particular Activities so that the options and parameters appropriate for a particular Activity can be rapidly selected, as described in section 4.1. Default settings should be provided for most of the options and parameters, and these can be changed by the user.

In one embodiment, the system could be a component of an operating system running on a computer, and become active when a certain key combination is pressed, whereupon the images present in the screen (or selected with a "mouse" or key-combination) are conveyed via some of the processes described in this document.

Where appropriate existing software standards should be used, for example for the format in which sound waves are stored and manipulated.

3.2 Main Processing Steps

The flowchart FIG. 4 illustrates the main steps followed by the software after the user requests it to exhibit effects based on visual representations. Steps B to G obtain the image, extract features and prepare the effects for presenting to the user. Steps J to S are part of the main effects outputting loop, which handles presenting effects to the user. Certain processes can be performed simultaneously if the system is sufficiently powerful and/or has parallel-processing capabilities. For example, the image-gathering process could occur while the previous image is being output (although this was not found to be necessary in software timing tests). With reference to FIG. 4, the main steps are:—

Step A: Set Activity-related options and parameters. If the user has changed the Activity identifier, or it is the first time through the processing, then the processing options and parameters are updated to reflect the selection. See section 4.1 below for details of Activity-related processing.

Step B: Obtain a visual representation if one is required. If changing images are being presented, or it is the first time through the processing, then an image or other visual representation is obtained. Step 2 in the method summary above describes some image sources. 708 FIG. 12 shows the GUI controls for image source for one preferred embodiment. 710 are the GUI controls for when an abstract demonstration shape is to be used.

A straightforward approach to providing images to the software is to use an external media player that can save images to a file format and receive instructions from another application, for example via the Visual Basic "Sendkeys" statement. The media player programs PowerDVD™ and Media Player Classic™ both fulfill these requirements. The resultant saved image can then be accessed by the system.

If the embodiment is running on a Windows or similar operating system then it useful to provide a facility for presenting the system's "clipboard", when it contains graphic material (i.e. not text). The Visual Basic "GetData" method allows the Windows clipboard to be accessed.

Step C: Filter image according to Activity-related filter settings. See section 4.1 below for details of Activity-related processing. Once the image is obtained, each pixel is initially stored as an 8-bit value for each RGB (Red, Green, and Blue) primary color. Several processes can be performed on the image as part of the basic filtering, and these can be saved and used as option sets for certain Activities.

The following filtering options should be provided:

Brightness, Contrast and Saturation Control

Look-up tables allow modifications to be made to the characteristics of the input video signal. It may be helpful if a certain amount of contrast is always present in the conveyed image, even if the input image is of very low contrast. To achieve this, an overall contrast value for the processed image can be calculated, by adding up the differences of sampled pixel light intensities from the overall average intensity of the image (pixel sampling is used to reduce the amount of processing required). If the average of the contrast level for the current image differs from an "ideal" value by more than a certain amount, the look-up tables should be altered to cause an increase or decrease in the contrast of the processed image, by increasing or decreasing the number of different values that will be translated into a particular output value.

If the average brightness of several consecutive images is too high or too low, then the values in the look-up tables should be shifted up or down to bring the average back to the "ideal" level, which can be set as a parameter by the user. (Automatic adjustment of brightness is generally less useful than automatic adjustment of contrast as input video signals are usually pre-adjusted to give reasonable brightness levels.) Both automatic brightness control and automatic contrast control should be user-controlled options. 802 FIG. 13 shows a section of the Activity GUI screen where this is controlled. Both can be "damped" by sampling a number of images before altering the look-up table.

Saturation control can also be provided in a similar manner, using standard optical processing techniques.

Cropping

The system should provide image cropping facilities 804 FIG. 13.

For motion-picture images, it is useful to have a "de-masking" facility 806 that removes the black masking that is often present in, for example, television broadcasts when a widescreen program is presented on a 3:4 aspect-ratio screen. This can be achieved by sampling down from the top and up from the bottom edges of the image at several points, and noting the first non-black locations from the edges, signifying the start of the picture. An upper limit on the amount of de-masking should be used (as a user-controllable option) 808, so that images that happen to be mainly black are not excessively de-masked.

Other standard optical processing facilities can also be provided, for example "flipping" the image 810 FIG. 13 or special effects such as negative images.

Whatever the video source, the image area that will be taken to the next stage of processing will be a square image area. 712 FIG. 12 exhibits this area.

If the image does not exactly fit such an area, options should be provided to specify how the system should handle such images. For example the image can be stretched or squeezed in either direction 812 FIG. 13, and if the resultant image still does not fit the area then it can be positioned in a variety of locations 814, in which case the remainder of the square is blacked out and marked as not containing actual image content.

Image stretching can generally be performed by using inbuilt operating system facilities, or by interpolating intermediate pixels. The pixel data can be consolidated by the system to produce the segment data for the different "Zoom Levels" (see section 5.3), or the other Zoom Levels can be calculated "on the fly" when required. For non-square aspect ratio images, one of the dimensions will comprise less segments.

Step D: If viewzone zoom or position has been changed by joystick or keyboard (or detected change) then get viewzone contents accordingly. Select the appropriate section of the image for further processing. See section 5.3 below for details of viewzone zooming and positioning.

Step E: Extract features from viewzone, according to Activity-related settings. See section 4.3 below for details of feature extraction.

Step F: Encode categorical features as audio and tactile effects. See section 3.4 below for details of encoding categorical features.

Step G: Plot the path of the audio and/or tactile tracers, and include corner-related effects.

To construct an audio or tactile tracer, the controlling software should supply the following to the routine that produces the tracer:

a) The monophonic speech-like sounds to use (or the tone-sounds that can convey change).

b) The path that the tracer is to follow.

c) The "speeds" at which the tracer should travel (or the times each section should take).

The software routine should take these inputs and produce the binaural sounds that convey the apparently-moving audio tracer composed of the speech-like sounds, by calculating the waveform that would appear at a listener's ears; and plot the path for the tactile tracers. The routine should alter the pitch of the speech-like sounds to match the angular height of the tracer at any point, using a method that does not alter the relative timing of the sounds. See FIG. 10: the sound effects modeled to represent parts of the image should be binaurally "positioned" so that they appear to be located in positions relative to the user's head that correspond to the positions of the parts of image being conveyed. The tracer path that is supplied to the routine can optionally be 3-dimensional, so that distance effects can be generated.

Gradual changes in the binaural positioning and pitch of the sound can be achieved, and sounds representing different "angles of view" can be synthesized as required. With reference to FIG. 10 the approach can be:

a) Break down the tracer path into a series of joined "legs", each leg being a circular arc, and for each leg define the beginning and end of the arc, and the angle (of an arc) through which it turns (this is straightforward for regular "stepping" between Layouts; or the arcs can be produced by the feature extraction described in section 4.3 below). The relative speed of travel or relative time spent on each leg should also be defined. "Special case" legs include straight lines, where the angle of the arc is 0 degrees, and "stationary" legs, where the beginning and end of the leg are at the same location (for "stationary" legs, the time spent on the leg rather than the speed of travel must be given).

b) An array of leg details is presented to the tracer-plotting routine, along with the total time that the tracer should take, and the split of what proportion of the timings have been presented as relative times, and what proportion of the timings have been presented as relative speeds. The routine then allocates the specified fractions of the total tracer time to each leg (for legs for which the timings are presented as relative speeds, the times must be calculated from the relative speed and distance traveled by each leg, the total tracer time, and the split of relative times and relative speeds). The routine processes the array of legs to decide the location of the tracer at each point in time. This can be stored in an output array, along with the audio pitch at each point. The latter value will be used if sampled speech sounds are used: if the pitch of the samples is altered (for example by decimating individual sound samples), the sound waveform must first be stretched or squeezed so that the sound waveform is of the correct length after the pitch has been altered. The stretching or squeezing should vary throughout the sample according to the pitch change occurring on the corresponding section of speech waveform. When altering the length of the sound, it is generally necessary to remove or repeat whole sections that begin and end at the same level within the waveform, so that sudden discontinuities do not occur in the waveform. If the waveform is being stretched by several times its original length, then it may be necessary to smooth the levels of repeated sections so that there is not a sudden "step" change in the peak levels of the waves, which can produce a slightly "metallic" effect.

After the speech sounds have been appropriately stretched and re-pitched, the resultant waveform can be translated into a stereo waveform for playing to the user, by simulating the sounds heard by a person facing a "sound screen" on which the audio source moves in the defined path FIG. 10: the stereophonic sounds are produced by modeling the binaural sounds that would be received at the ears of a person 96 if sound sources were to be played from directions relative to the person's head that correspond to the directions of the parts of image being conveyed, by using established knowledge of the properties of sound propagation. For example, variations in the intensity and phase of the sound waves received at the left and right ears 99 & 100 of the user 96 can be modeled. The latest 3-dimensional sound modeling theory and available algorithms can be used. However it has found to be effective to i) model of the reduction in intensity of the sounds due to the inverse square law; ii) model the phase differences by calculating the path length differences to each ear 99 & 100.

For every sample point along the tracer waveform, the system calculates where the tracer 102 has moved to (the actual position of the tracer 102 should be calculated, not the location represented by the sounds currently reaching the user's ears). Time delays for each ear are calculated, and the volume/amplitude of the 16-bit sample is modified to achieve the required volume adjustments due to "change" (see section 5.5) or "Combotex" effects (see section 5.1) etc. for the location in the image that is being conveyed, before it is further modified, based on the calculated distance to each ear 101, according to the inverse square law.

Vertical angular positioning is conveyed by the frequency of the sounds, with higher frequencies being used for the higher parts of the image and lower frequencies for the lower parts of the image. The frequency is often described as conveying the height 98 within the modeled screen 88. However it actually conveys the height within the flat surface 89 of the modeled screen that represents the distance of infinity 103. For closer subjects, a straight line 97 from the point 91 midway between the modeled user's ears should be projected through the point in the object being conveyed 104 until it reaches the flat rectangular surface representing infinity 103, and the height 98 within that surface is conveyed by the frequency. When the sounds are modeling a flat vertical screen then there is no confusion, but when distance effects are produced by modeling a 3-dimensional screen then the projected height in the rectangular plane representing the distance of infinity 103 rather than the actual height of the modeled sound source should determine the frequency of the sounds.

It could be argued that conveying distances as categorical effects is not ideal, as distance is a continuously changing quantity. An impression of distance can be conveyed by using "3D sound" to model the distances of items in an image, by applying subtle changes in the frequency, volume and phase difference of the conveyed stereophonic sounds, as illustrated in FIG. 10.

The change in distance can be conveyed by altering the modeled "screen" 88 so that parts of the image appear to emerge forward of the screen, with objects that are to be conveyed as being nearer the user being modeled as being nearer the user 96. It is suggested that the default modeled distance 103 should represent "infinity" or "no distance information", and that closer distances be modeled as items emerging towards the user. The measured distance should be converted, using a logarithmic-scale look-up table, to the actual distances to be modeled. There should be limits on how close the modeled distances can get to the subject.

A user-controllable option should be provided to model a fixed number of distance bands which are conveyed as vertical "plates" 95 set at different distances, so that distinct step-changes occur as distance changes. However if this is done then entities that are angled toward the user will tend to be conveyed with arbitrary "steps" in their distance from the user.

Closer objects are modeled as being positioned along a 3-dimensional "cone" 90 that has its point of focus 91 at the centre of a line drawn between the two ears 99/100 of the modeled user 96. The conical alignment is used so that closer modeled objects 92 do not mask more distance ones 93 or leave undefined space 94 in the image as would happen if the closer objects were modeled as coming forward directly perpendicular to the screen. One consequence of the modeled closer objects converging to a point in this way is that they get "smaller" as they approach the user, although the angle that they subtend from the user's point of view will not change. The lateral movement of the modeled moving sound sources can be "slowed down" when representing closer objects or areas, so that they take the same amount of time to traverse any angle of view whatever distance they are representing i.e. they maintain the same angular velocity.

Each of the resultant pairs of sound levels is stored. It is convenient if an industry-standard file format for storing and manipulating stereo sounds is used so that it can be straightforwardly played by the operating system's sound playing facilities.

If several tracers are to be output simultaneously, and parallel-processing facilities are not available, then one approach is to separately calculate and store the binaural stereophonic sound wave values required for each tracer, then sum the waveforms of each tracer for each point in time, to produce a set of values for a single stereophonic sound wave (containing sounds for all the tracers being conveyed).

c) The resultant sound waveform and tracer path can be presented to the user in Steps I and L (described below).

The routine can have "scaling" facilities, so that the input leg's beginning and end points can be defined by a standard set of coordinates, and additional input arguments can be the position scaling in the X and Y directions. The routine should then adjust the input locations according to the given scaling. Such an approach is useful, for example, for re-sizing the audiotactile effects to match the viewzone dimensions within the whole image.

The routine should allow separate audio and tactile tracers to be produced, so that each follows its own path and conveys its own information. For example, the audio tracer can convey the Layout of the whole scene, while the tactile tracer can highlight the detail of a found entity.

The routine can be called several times to perform audio and tactile tracer plotting, with appropriate flags used to control the processing.

The routine as described operates on circular arcs, but could alternatively or additionally use ellipses or Bezier curves to describe the input legs.

The parameters of the tracer sounds can be controlled by the user from the GUI, for example the dimensions of the modeled sound screen 714 FIG. 12, the frequencies to be used etc. The sound replay method can also be specified 716. These items could be linked to Activity, though they will normally be left constant across all activities.

Step H: Update the braille display. The braille patterns calculated in Step F above should be displayed. Programming the dots to be conveyed on the braille cells is straightforward and will be specific to type of braille cell modules used. Simple "look-up" tables can be used to provide the dot arrangements for particular values.

Step I: Start the sounds playing. The tracer sound waveforms can be presented "as is" using the operating system's standard stereo sound playing facilities. If the tracer is plotted in Step G as a full stereo pitched wave, then this one step will cause the output of the sounds. If software such as Microsoft's DirectSound™ is being used, Step L will do the sound positioning and/or pitching.

The Main Timer Loop Starts with the Next Step

The steps below that update effects should only be carried out if the time has reached the point for which the effect was calculated.

Step J: Get system time. As many of the items in this loop will be triggered when a particular time is reached, ideally the system time read should be accurate to at least 1 millisecond. For example the Windows API function "timeGetTime" is sufficiently accurate.

Step K: Update tactile effect positions. The positioning of the force-feedback device, for example via Microsoft's DirectInput "Spring" force condition, should be done "on the fly" during this step, following a set of locations calculated in a similar manner to the tracer locations produced for the sound tracer by the routine in Step G above.

Step L: Update audio effect binaural position (and/or frequency). If the sound set playing in Step I was monophonic and/or at one frequency, then during this step the sound should be positioned and/or repitched for example by using inbuilt operating system 3D sound presentation facilities such as Microsoft's DirectSound, which can re-pitch sounds and position them in 3D "soundspace". If the latter approach is used then only the stretching of the waveform is necessary by the application program in Step G above, and the pitching and 3D positioning can be done "on the fly" in this step. (This step should only be carried out if the time has reached the point for which the position was calculated.)

Step M: Trigger Constant Force-type effect for coded impulses. See section 4.2 below for details of how to generate Morse code-like impulses.

Step N: Output corner effects if required. See section 4.4 below for details of corner-related effects/"indicium effects". If a specific Corner effect/indicium effect is required that is not included as part of the audio tracers (for example a separate jolt, or discrete audio effect not included in the audio tracer), then it should be output in this step, using appropriate multimedia output methods.

Step O: Handle any other time-critical processes. For example, if a periodic force is to be turned on or off to indicate the presence of a shape (as described in section 5.8 i).

Step P: Allow other processes to occur. In order for the software to work effectively with other software that is running on the same computer (for example the drivers for multimedia devices, or external media player software) then the embodiment's software should allow other processes to occur at regular interval during the main loop processing. It is also important to allow the user to use the GUI controls (for example to stop the Main Loop process, or to change the selected Activity). The Visual Basic "DoEvents" function provides this facility (or alternatively the processor can be yielded by using a timer control).

Step Q: Handle user input if buttons or keys pressed. Any force-feedback devices should be polled to see if their buttons have been pressed, and any keyboard keys assigned to controlling the embodiment should also be handled. Then any actions commanded by the buttons and keys should be performed.

Step R: If "stop" command given, then exit main processing. The "stop" instruction will normally be indicated by the user pressing a particular key or joystick button.

Step S: If effect output is complete then return to step A at the start of the routine, otherwise go to step J at the start of the effects output loop.

(End of Main Processing Steps.)

3.3 Graphical User Interfaces (GUIs)

FIG. 12 shows an example format for the main graphical user interface (GUI). Less-commonly changed parameters, for example the frequency range 718, can be revealed only if the user needs to change them.

FIG. 13 shows the GUI for controlling some of the Activity-related filter settings and output options.

FIG. 14 shows the GUI for force-feedback device configuration.

(The example user interfaces shown do not implement all of the features of the present embodiments.)

3.4 Speech, Braille and Coded Impulse Encoding

In this section several methods of encoding visual features in to speech, braille and coded impulses will be described.

Selection of Color Shades and Layouts

The system generally allows a maximum of two color shades (e.g. "blue and yellow") to be used when presenting any particular "panel". This approach allows the arrangement of those two color shades to be effectively displayed via braille, and via a modest number of "layout" codes/mappings. Moving to presenting three or more colors within any panel results in a very rapid increase in the required number of codes: to convey the layout of four segments requires 16 different codes to be available for two colors (2×2×2×2), but 81 for three, and 256 for four, and the resultant codes would be difficult to interpret and awkward to convey in braille. The two-color-shade approach is analogous to painting a picture with one color on a differently-colored background.

FIG. 2 shows an example of an image being reduced to two color shades in each image quarter/"panel".

When one color predominates (known as a "monochrome" panel) or more than two colors predominate (a "polychrome" panel), the system can convey this information, then present the "layout" of lighter and darker pixels within the panel.

Section 4.3 describes how to determine the two color shades to use.

Once the shades have been decided, system can assign each segment in the Layouts to one of the two shades 42 FIG. 2. It has been found that it is best to determine the Layout in the form of the dot arrangement for braille, then transcribe the resultant layouts to speech and coded impulses. This process is described below in the description of braille Layouts.

Color Shade Palettes

See FIG. 15, which shows example mappings. The system can convey monochrome versions of images, when a palette of five brightness levels is used. However color gives users additional information about an image, and so it is useful to be able to include it.

Most cultures tend towards classifying any color shade as one of eleven "Basic Color Categories", namely red, orange, yellow, green, blue, purple, pink, brown, black, white and grey. This set of colors is available as a palette option 60.

However it is found that having more color shades available in a palette can result in the clearer presentation of images. One preferred embodiment also offers 15-color 62, 22-color 64 and 24-color palettes 66. In selecting the shades to comprise each palette, some experimentation is required to find the preferred combinations, which may vary between different cultures.

The 15-color-palette format 62 adds to the 11 "Basic Color Categories" and allows two colors to be easily presented via a single "CV" syllable or via a single 8-dot braille cell, with each color conveyed via 4 dots (the $16^{th}$ combination is reserved for signifying single colors, "Polychrome" (i.e. no clear pair of colors) etc.).

The 22-color-palette format 64 can be presented via two CV syllables or braille cells, and can also be presented via a single CV syllable or braille cell, but only if more complex "Compact" mappings are used: when two shades are conveyed, they can be presented in either order. The number of combinations of two of 22 color shades (presented in either order) is 231 (i.e. 22 times 21 divided by 2). The CVs for these mappings are allocated in a fairly arbitrary manner, though certain patterns can be devised FIG. 17. (FIG. 17 illustrates example mappings, but the detail of FIG. 17 does not need to be read.) As no attempt is being made to match the mappings to particular English words, clearly-distinguishable CV pairs can be chosen. Using the compact approach loses the information that can be conveyed via the order in which the colors are presented, i.e. which color is represented by the raised braille dots (and corresponding Layout speech). A semi-arbitrary color order must be used to determine which color is represented by the raised dots. However having 22 color shades available can also be a considerable advantage, and using the "compact format" approach requires only one CV syllable or braille cell.

3-color shade combinations are practical if "Compact" mappings are used and as long as the color shades are restricted, for example to the 11 "Basic Color Categories": there are 165 3-color combinations of 11 colors, and the range should also provide codes for the 55 2-color combinations of 11 colors, plus codes for the 11 single shades, totaling to 231 codes. This could be presented as a single byte of information with 20 codes spare. It is better to confine any Layouts to conveying the arrangement of light and dark areas (rather than arrangement of the three colors) when three colors are presented (2-color combination or single color Layouts can still be presented using the standard method).

The 24-color palette 66 format uses CV combinations chosen from five consonant and five vowel sounds for each shade, and can be used with any language's phonemes. However it needs two CV syllables or braille cells to convey a color shade pair.

For all of these palettes, certain CV syllable combinations are reserved for signifying when a single color shade predominates ("monochrome"), and for signifying when more than two dominant color shades are present ("polychrome").

A benefit of the mappings shown in FIG. 15 is that several color shade ranges can be used (e.g. "2-from-11-shades", "2-from-5-monochrome-shades", single shades etc.), but the same continuous range of shades and combinations of shades is used. This means that the system can switch shade ranges without the user being particularly aware of it—for example from "2-from-11-shades" to "2-from-5-monochrome-shades"—the latter switch being effective if the image being presented changes from full color to monochrome.

The system can interpret the viewzone in several available shade ranges, then decide which is the most appropriate and/or produces the least error. The CV combination that represents the appropriate shades for the selected shade range can then be presented, without the user being concerned about the shade range being used.

This approach can be extended to the individual panels within the viewzone, with each panel being presented via the most appropriate shade range.

Specifying Color Shade Allocation According to Activity

The Color Shade configuration should be easily controllable by the user. This could be via a control file, which can vary according to the current Activity identifier. For example, if the Activity requires distinguishing between different shades of a particular color, 22 shade categories may be used, with 11 being the "Basic Color Categories" and the other 11 being finely graduated shades of a particular color.

For particular specialist tasks, several differing groups of color shades can be assigned to a single color category. For example if the task involves finding objects that are orange or pink, then those qualifying shades can be assigned to a single color category "OrangeOrPink". Such color shades can then be prioritized for particular Activities. (When the color shades within a "Basic Color Category" e.g. Brown are grouped into finer shades categories, it is generally better to split the category into an odd number of shade categories, so that a mid-range shade is available, for example splitting Brown into the shades Light Brown, Mid Brown and Dark Brown).

Mapping Between Color Shades and Speech Sound

Direct-Description

The simplest speech mapping is not to use mapping, but to simply speak the color names. "Direct-description" sounds are actual words that are spoken in the language of the user to describe certain features of the viewzone being conveyed e.g. the property (color) and layout information; the nature of entities; or convey text identified in the image. They are pitched and binaurally positioned to reflect the location of the image content that they are conveying. Direct-description sounds (and corresponding braille codes or coded impulses) present information relatively slowly.

"English" Mapping

One approach to mapping color to speech is to base the speech on English color names 68 FIG. 15.

An effective compromise between the verbosity of "Direct-description" mode for conveying colors, and the learning required for fully coded phonetics, is to use shortened single-syllable versions of the English color names, for example "Yow" for "yellow", "Dow" for "dark brown", "Toy" for Turquoise etc.

This may be useful for demonstrating the system to uncommitted users, and could be useful for people who do not need to understand audio Layouts, for example people who will use the audio modality to hear colors and other properties, and braille, impulse codes or other methods to understand Layouts.

This "English" coding makes use of the relatively large number of vowel sounds available in English; and the surprisingly varied set of vowel (V) and consonant (C) sounds used in the English names for basic colors. The "Short Name" column 70 FIG. 15 shows single syllable "names", of C-V format, that are similar to the English color names. Two syllables can be used to present color pairs, for example "BBUW-YYOW" for "blue and yellow". These sounds can be further contracted: notice how the vowels for the short-format names of the 11 "Basic Color Categories" are all different. By changing the C or V of certain colors so that every C and V is different (see "Split Name" column 72), single-syllable color pairs can be produced by taking the consonant of the first color and adding the vowel of the second color, for example "BB-OW" for "blue and yellow".

This mappings shown in FIG. 15 are based on the phonemes found in spoken English, which could make comprehension difficult for people whose mother-tongue is not English, especially as they will not be able to use the context to help with understanding, as would occur with normal speech. Many languages use only five different vowel phonemes, centered around the vowels A, E, I, O and U.

"International" Mapping

The "International" format shown in the table in FIG. 16 can use just five consonant and five vowel sounds (alternatives shown in brackets). For example the color pair "blue and yellow" would be presented as "DDAA-RREH" ("doh-reh"). A disadvantage of using this double-syllable format is that the sounds take longer to speak, though the individual syllables can be spoken faster than for the "English" format, as the consonant and vowel sounds are slightly shorter on average, and more distinctive.

As the phonemes do not attempt to match the English color names, other factors can be used when designing the mappings. There is a slight "synaesthetic" effect between color shades and speech: if the vowel sounds are arranged in the order I-E-A-O-U, most people tend to find the "I" sound "lightest", then the following vowels "darkening", through to "U", which gives the "darkest" impression. This effect is used when allocating vowel sounds to shades, as shown in FIG. 16. There seems to be a similar, but milder, effect with consonants, with, for example, "R" better matching "warmer" colors, and "N" matching "cooler" colors. Apart from this factor, consonants have been chosen which are found in most languages, and which are clearly distinguishable when spoken.

One advantage of the "International" format is that users can get an impression of the lightness or darkness of an area from the vowel sounds alone.

For people who can easily distinguish English phonemes out of context, the "International" format vowels can be "tinted" 74 FIG. 16, wherein the standard five vowel phonemes are replaced by similar "R"- or "Y"-sounding vowels when "warm" or "cool" colors respectively are being presented. For example "blue and yellow" could alternatively be presented as "doy-rare" (instead of "doh-reh"), allowing a user to know that the first color (blue) is "cool" and the second color (yellow) is "warm", without fully interpreting the coded sounds.

For monochrome shades, the two levels can be conveyed via a single syllable even in "International" format. The mappings shown in the table 76 FIG. 16 can be used, with the consonant sound conveying the first level and the vowel sound conveying the second level. These vowels can also be "tinted" if the color temperature is known.

All of these speech sounds can be adjusted slightly to match the phonemes used by the languages of the intended users, and the mappings adjusted to match their culture.

Mapping Other Properties (Alternative Mappings)

The above description of mapping only covers presenting colors (normally two colors). In some embodiments it is possible to obtain other properties, such as texture or distance. Measuring distances is described in section 2.2 and measuring textures is described in section 4.3. Both of these properties can be assigned categorical values (for example in the range 0 to 15) as shown in the table shown in FIG. 18, which shows how certain properties can be assigned to categories and presented as categorical speech, braille or coded impulses using a similar method to that described for two colors.

Properties which are not "naturally" categorical, for example distance, can be assigned to bands of values, and they are summarized in FIG. 18. When the Layout format is being conveyed, different properties can be applied to each 4-segment by 4-segment panel within a viewzone/panel-group.

To clarify the sounds used, Column 3 contains common English words in which the capitalized letters are normally spoken as the correspondingly numbered C and V phonemes, when the word is spoken with a Southern British Standard pronunciation (the example for C12 and V12 is the French word "jardin").

The Cs and Vs are selected so that they can be continuously sounded, for example when applied to an audiotactile tracer.

Column 4 shows the corresponding categorical textures that are presented on the two texture-drums 11 & 12 FIG. 9C, corresponding to the Cs and Vs used to convey properties as speech-like sounds.

"Layout" (Column 5) gives the patterns of two properties that are presented to convey a panel, with each C or V conveying the layout of a group of four segments (known as a "sub-panel"), with "D"=Dark, "L"=light. If two colors are given, the "Dark" level refers to the first color given and the "Light" level to the second color given. (See section 4.3 for a description of how to determine the Layout settings.) If no panel layouts are being conveyed, for example when Averaging effects are being conveyed, the system should output the most dominant color in the conveyed area first. If only one color property is given then the levels refer to dark and light shades of that color.

Column 6 shows the standard categorical colors. The color given as "Polychrome" is used to convey the color appearance of areas where several distinct colors are present in a non-mixed state.

"Texture" (Column 7) is a property that describes the texture and general features visible in an area, in a categorical manner. It is an alternative to the approach of conveying the texture of an object by Layout sounds (Column 5) or "Combotex" volume fluctuations. The precise detail of the area will not be conveyed, but sometimes conveying the general texture is sufficient. The Texture property can be assigned by a designer inspecting the area in question, using suitable software (see section 4.5). Alternatively there are certain image processing techniques that can be used to identify textures in an area, and these could be used to some extent to classify areas and to highlight distinctive textures. Texture Category 9 (Text, characters and symbols) is used to describe areas in which meaningful symbols such as letters and numbers have been identified.

For the "Distance" property (Column 10), the categories describe a distance near the center of the range of distances which comprise each category.

The user can control which properties are measured and presented, and other effects can be used to highlight when the type of property being presented changes.

"DInCoTex" Format

Most of the property types shown in FIG. 18 should be easy to understand. However the columns 8 and 9 (marked "DInCoTex1" and "DInCoTex2") require further explanation. The term "DInCoTex" is formed from some of the initial letters of the words Distance-INtensity (or INteger)-COlour-TEXture, and refers to the special pseudo-property type that allows two properties to be conveyed by a single byte (e.g. CV syllable or braille cell), but for each 4-bits ("nybble") the value is selected from a list of items that can be of different basic property types. For example, as column 8 shows, the first nybble normally either conveys a color or a texture.

The "DInCoTex" format is designed to allow the most common properties to be conveyed without the need to change property types, and is easy for beginners to learn. The first nybble generally conveys texture or color, and the second nybble conveys a distance or another color. This is the case when the "DInCoTex" format is applied to a 4-segment by 4-segment panel or to a "tracer", but when applied to a recognized object then textures are not available for assigning to identified objects, as the texture of most object types is generally known. Instead the property of "integer range" is used—this gives a very approximate value for the number of instances of the object type that are represented by the object (i.e. the number of items).

The "Text-like" category (Category 9 of DInCoTex1) can be assigned to areas where meaningful symbols such as letters and numbers are identified.

If the same two colors are conveyed by DInCoTex1 and DInCoTex2 then this can have a special meaning, and these are shown in the sub-column inserted in the upper half of Column 8 of FIG. 18. Categories 0 to 3 can convey temperature and warn of dangerous conditions if such information is available. Categories 4 to 7 can be used to assign fractions to objects (e.g. "half an object").

The system should determine the color, texture and distance (if applicable) of the area to be conveyed and output the most "significant" two of these properties via the "DInCoTex" method. The exact method for determining which is the "most significant" will depend on the embodiment and application of the embodiment and can be controlled by the current Activity identifier, but if either the color, texture or distance fall into certain bands then they can be prioritized according to a set of rules: for example, for a mobility aid the rules might be that the distance must be always conveyed if it falls below a certain distance, and the texture should only be conveyed if it is quite distinctive, otherwise the two most predominant colors should be conveyed by default. For pre-processed scenes the designer can decide the property that is conveyed via the "DInCoTex" format.

The "DInCoTex" format needs advanced facilities to be fully implemented for use with "live" images, but can be used with simpler embodiments if prepared material is being presented.

Mapping Between "Layouts" and Speech Sounds

As there are no standard English terms for the arrangements of color-shaded pixels within a panel, the mapping of "layouts" to speech sounds is fairly arbitrary.

However some method can be used (see FIGS. 11A & 11B): for English speakers, a single-syllable CV format can be used to convey the patterns of 8 dots, with four dots conveyed by the consonant and four dots conveyed by the vowel. The vowel sounds can be chosen so that similar vowel sounds are applied to patterns that have the same number of dots raised (0 to 4), and the consonants chosen so that similar-sounding consonants are used for similar patterns 80 FIG. 11A. Two CV syllables are needed for a 4 by 4 panel.

For "International" format, six consonant and five vowel sounds are used 82, and one CV syllable is used to present four dot settings, the vowel sound signifying the number of raised dots (0 to 4). Four CV syllables are needed for a 4 by 4 panel.

So for example if the first four dots were all raised, and the next four dot positions all blank, the speech sounds to convey such an arrangement would be "DD-IY" for "English" format and "DDUW-SSIY" for "International" format.

When presenting the layouts of 4 pixel by 4 pixel panels, the system can output the arrangements in "column-by-column" or "row-by-row" order, or ordered as four squares of 4 pixels 84 FIG. 11B. However it is hoped that the users can soon learn to interpret the meaning of the layout sounds directly, without having to calculate the layouts from the individual phonemes.

The system could provide an option to "snap to a single color shade" when a particular button sequence is pressed, causing the system to only seek the best single color.

Prosodic effects, such as pauses, can be added to the speech-like sounds to convey additional information. They should be used to convey non-essential information. For example which syllables are assigned to colors and which to Layouts can be emphasized by pausing between panels, and between the color and layout components of a panel 720 FIG. 12.

"New" (non-standard-phoneme) sounds can be devised for use with the system, having the advantage that they are distinguishable from standard speech sounds. They can be speech-like, or distinct sounds such as buzzes, bell sounds, clicks, beeps etc. However they must be perceivable in a categorical manner. Such sounds can replace some or all of the phoneme sounds described herein.

Cultural Factors

Certain combinations of sounds will, by accident, form real words. This may produce words that are unacceptable to particular nationalities, cultures or religions. This consideration may exclude certain otherwise usable combinations. However, even if the sounds are carefully selected to avoid such problems, new slang terms that become well known can render such efforts useless. One way round this problem is to use a table of "exceptional alternative combinations" that are programmed to be used if an unacceptable word would otherwise be generated. The use of such a feature should be kept to a minimum as it makes the system harder to learn.

The speech sounds can also be adjusted to match the phonemes found in the users' languages.

If sampled speech sounds are used, it is advantageous (though not always practical) to record the samples in the voice of a speaker whose mother tongue is that of the target audience, as the resultant sounds will be easier for them to understand. Different databases of speech samples can be made available with different voices, accents etc. to suit the preferences of the users.

Braille Mappings

The system should allow the user to specify a) how many different braille display cycles should occur during each Playtime, and b) which cells are conveyed during each display cycle.

Braille Properties

The conventions for encoding categorical properties such as color to braille will not be described in detail as they are arbitrary. Most categorical features that range in value between 0-15 (e.g. some of the color ranges) can combined so that two such values are presented on a single braille cell.

Braille Layouts

No special mapping is required for the braille display of layouts, as the braille dot patterns can correspond directly to the pixel arrangements, as illustrated in FIG. 2.

However an important factor is deciding how to set the dots (up or down). It is generally easiest to consider Layouts in the form of the braille settings first, then apply the resultant Layouts to speech and coded impulses, as shown FIG. 2.

The user should be able to specify whether dots are raised for the "dark" color shade or raised for the "light" color shade 722 FIG. 12. However this leaves the matter of deciding whether particular color shades in a color shade pair are dark or light, and so whether to set the braille dots "dot-up" or "dot-down" (and set the corresponding Layout speech sounds and coded impulses accordingly). One possible ordering of the colors shown in the tables in FIGS. 15 and 16, and running from darkest to lightest, is Black, DarkBrown, DarkBlue, DarkGreen, DarkPurple, DarkGrey, Brown, Blue, Green, Purple, Red, GreenYellow, MidGrey, Turquoise, Orange, LightBrown, LightBlue, LightGrey, LightGreen, LightPurple, Pink, Yellow, Cream, White.

While this ordering is effective for pairs of very different colors, for example black and yellow, for similar-brightness color pairs (for example blue and green) the order is arbitrary.

Setting Braille Layouts to "Least Dots"

If a 15-shade palette (or less) is used, then the colors can be presented in either order, and the ordering can be used to simplify the Layout dot-up/dot-down convention. For example, the up-dots can be assigned to the least- (or most-) common color in a panel. Then the order of the colors when they are presented (i.e. when the color pair is conveyed) specifies which color is the commonest, and so which color the up-dots refer to. It may be best to assign the vowel sound to the commonest color, as the vowel sound may have a more dominant effect than the consonant. Using a "least common=dot-up" convention minimizes the number of dots that the user needs to "read".

The dot orientation should be user-controllable 722 FIG. 12.

Layout "Blob Priority"

Whether the darkness, or commonness of shades, determines the level, there is a potential problem if more than one panel is presented. See FIG. 19, which shows two panels 655. A grey "blob" 656 extends across both panels, but in the left panel it is the darkest color, while in the right column it is the lightest color. Consequently, when the panels are conveyed as braille with the dots up for the darkest shade, the dot settings for the grey area reverse on crossing the panel boundary 657.

As an option 729 FIG. 12, users should be able to request that the system minimizes such effects by prioritizing areas of common color which bridge panel boundaries. This will produce a braille pattern wherein areas of common color have the same dot setting (up or down), for example as shown in 658 FIG. 19. Although the grey blob is now all presented with the same dot settings, the background shades no longer follow the "dark=dot-up" convention, and the user needs to note the order in which the color shades are presented in order to determine the meaning of the dot settings. Consequently there should be a user-option 729 that controls whether panel-bridging "blobs" of one color are prioritized. If so requested, the system can inspect all of the borders between panels, and test available dot-up/dot-down arrangements to determine which produces the least error. If several arrangements produce the same amount of, or no, error, then the arrangements that most closely match the user's preferences for Darkest or Least common being presented as dots up or down, should be used.

Note that both the "least common" and "blob priority" facilities are not available if "Compact" (22-color) coding is used, as the color order is fixed for this format.

Single-Shade Layouts

When a single color shade predominates (or no shade predominates—referred to as "Polychrome"), one approach to deciding the Layout arrangement is to measure the average light level, then present all segments that are darker as Dark, and all segments that are the same or lighter as Light.

Once the dot arrangements for the Layouts have been determined, the speech mapping can be decided by using the layout mappings shown in FIG. 11A.

Coded Impulses

A low cost alternative method of conveying categorical information can be implemented by inducing Morse code-like impulses on a standard force-feedback device (see section 4.2). Impulse-based tactile coding is relatively slow compared to speech or braille, but may be useful for blind and deafblind users who cannot read braille, and for those who wish to leave their sense of hearing free to listen to other things.

Blind users may be familiar with braille coding, which uses 63 different combinations of 6 dots. Impulses corresponding to the 6 dot positions could be output sequentially, with "dits" representing gaps ("dot-down") and "dahs" representing dots ("dot-up") (or vice versa). An extra dit will be usually be needed to differentiate the last impulse i.e. 7 impulses in all. However it is worthwhile mapping the 63 braille codes to 63 corresponding shorter Morse-like codes. This can be achieved if a maximum of 5 impulses are used (plus an end-marker "dit"), as there are 62 different patterns of "dit" and "dah" impulses available if combinations containing 1 to 5 pulses are used. The 63$^{rd}$ code can be deemed to be when only the end-marker "dit" is presented. As with Morse code, the shorter codes can be allocated to more commonly-found braille cell patterns. By using such a mapping, all of the conventions and contractions of braille text can be presented as impulses, if text is being presented.

Colors and Layouts via Coded Impulses

If colors and/or layouts are being presented as coded impulses then the pulses can directly match the braille dot patterns, with, for example, "dits" representing "dot-down" braille settings, and "dahs" representing "dot-ups" (or vice versa). They can be grouped into two groups of 4 impulses (separated by pauses), with each group of four impulses allowing 16 possible combinations of impulses, and with the two pairs (8 impulses) conveying the equivalent of a coded syllable or braille cell.

However, as with standard braille, a more compact mapping to coded impulses can be used by following a similar approach as that used in Morse code, whereby shorter codes are allocated to more commonly-found letters. An example mapping for the first 11 colors is shown in FIG. 20. Shorter impulse combinations can be assigned to more commonly-occurring colors. A similar approach can be used for Layouts, via statistical analysis of the most and least common segment patterns. (See section 4.2 for details of coded impulses.)

Processing

Once the mappings for speech, braille and coded impulses have been decided, simple "look-up" tables can be used to obtain the required coded effects for any given categorical quantity. It may be helpful to store the look-up tables as commented text files, so that users can easily adjust them to their requirements.

4 Key Features 4.1 Activity-Related Processing

Sighted people's visual attention can be attuned to particular features when they are engaged in particular activities, and the way in which they perceive things can change. It is important that corresponding features are provided in the embodiments.

A key feature of the embodiments is activity-related processing. By using several activity identifiers, in the form of descriptive identifiers related to the activities engaged in by the user, the parameters that control the processing can be determined. This is a particular important feature, as it is otherwise difficult to ensure that the features in the images that are presented to the user are the ones that are relevant to their current activity, and that the output format is appropriate. This is particularly the case for the filtering of images and selection of visual features. For example if the user is engaged in a specific task such as picking apples then they may want to have for example red circular items highlighted and communicated to them. But it is also useful if other parameters can be controlled by the selected activity, for example the image source 708 FIG. 12; the color palette used 724; the mappings to use; etc. Any of the user-controllable parameters (and others) can be altered when the activity identifier changes.

(The word "parameter" is used in this context to refer to the various options, values, choices, etc. that are used to influence the system's processing. They may normally be controllable via GUIs or via control files that are read by the system, but can be determined by the selected Activity identifier. The word "Activity" will often be capitalized to emphasis that it is the activity selected via an activity identifier.)

The user should be able to rapidly change the Activity selection.

Normally one Activity will be active at any time. However it possible to provide a "multitasking" facility whereby more than one Activity is effective at a particular time, particularly for the visual feature selection—the system can be informed which Activity has priority for mutually-exclusive parameters, but for parameters which can have several choices active simultaneously, for example some Selection filter settings (see below), the system can allow more than one Activity to be active. For example the system can highlight both red circles and blue squares at the same time due to the parameters determined by two Activity identifiers.

Figure 27:
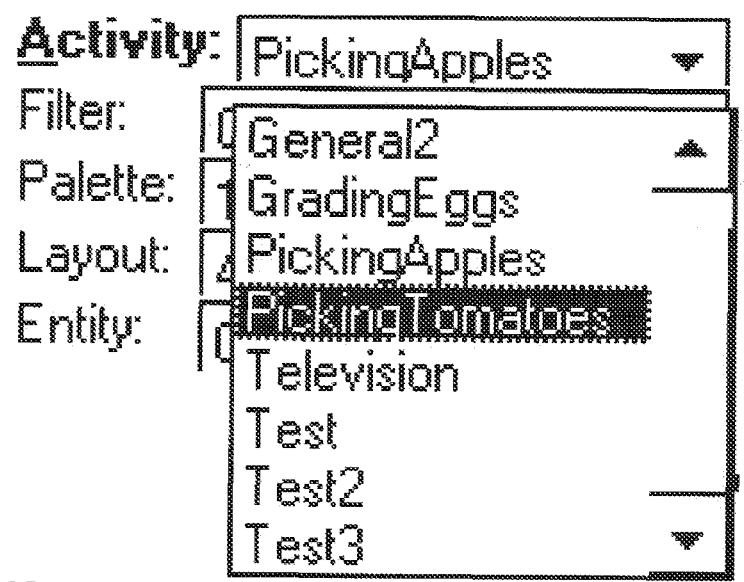
FIG. 27 shows an Activity indicator being selected from a drop-down menu.

An Activity identifier can be selected in various ways, but for the embodiment whose GUI is shown in FIG. 12, a drop-down list 726 is used (shown enlarged in FIG. 27). When the user wishes to change activity they access the list (for example via a keyboard short-cut), then select the required activity. With most drop-down lists it is possible to go straight to a selection by typing the first character of the required item.

If this is the case then it is might be beneficial to begin each Activity identifier with a relevant letter that is easily remembered. For example the Activity identifier "Picking Apples" might be selected by the 3-key sequence "Alt-A-P", with the "Alt-A" selecting the Activity drop-down list control, and the "P" selecting the required Activity identifier.

Once an Activity identifier has been selected, the parameters that control the processing are determined. For example this may be achieved by the system accessing a file whose name is related to the Activity, which contains a list of the controls that are to be updated, and the values they are to be updated to (other controls being left unchanged).

A useful facility is to be able to group particular sets of parameters together so that they can easily combined and adapted to produce a set of parameters appropriate for a particular Activity. In the example GUI shown in FIG. 12, four such parameter group sets are available, namely Filter 723 (determining the optical filter settings—see section 4.3); Palette 724 (controlling number of colors etc.); Layout 725 (setting the Layout configuration); and Entity 727 (determining how entities are identified and which features are to be highlighted).

For the example embodiment, the "Filter" parameter set 723 determines the filter settings for the basic optical filtering of the image, for example for cropping and stretching it; adjusting the brightness, contrast, hue and saturation; and any other standard optical filtering that is found to be useful for the activity in question. See Step C of section 3.2 for more details.

The "Entity" parameter set 727 comprises parameter settings for two filters, namely the "Grouping" filter, which determines how areas of similar properties are grouped together to form Areas of common properties, and the "Selection" filter, which determines which entities are to be presented, via a set of parameters. These filters are described in section 4.3 below.

Other parameters which might usefully be determined by the Activity identifier include whether shapes 728 and corners 730 are to be presented; the "Playtime" 748 (the Effects may need to be output at different rates for different Activities); whether to mute the source; etc. There can also be a file related to the Activity for miscellaneous parameter settings, as described above. Other similar configurations can be devised.

The user should be able to rapidly change the Activity, as described above. For example, if they are watching a game of "Snooker" they could have Activities set up for seeking each of the ball colors, and switch between them when looking for different colored balls.

A "General"-type Activity identifier should be provided, which is the default Activity identifier and can be selected by users when they are not engaged in any particular activity. However this can have an appropriate "Entity" parameter set, including for example prioritizing entities with high difference of color shade from average shade of image (i.e. distinctiveness of color), in a similar manner to the way sighted people's attention can be captured by the sudden appearance of an item of distinctive color (and size).

Certain standard Activity-related parameter sets should be provided, and it should be made straightforward for the user to adjust these, and to assemble additional sets.

4.2 Coded Impulses

As previously stated, tactile displays such as braille displays and "Optacon"™-type displays are expensive, and require the use of a separate hand in order to read them. For modest amounts of information, a low cost alternative method of conveying categorical information can be provided by inducing coded impulses on a standard force-feedback device, having the benefit of not adding to the hardware costs of an embodiment that in any case provides a force-feedback device. Such tactile effects do not interfere with the user's hearing. The technique resembles Morse code in that two distinguishable types of impulse are used, differing in length 733 FIG. 12, or force level 818 FIG. 14, or both. Such communications can be received haptically on many possible parts of the body and do not generally interfere with the user's hearing, although impulses on certain devices may be perceived in an audiotactile manner, as the device will generally exhibit a tapping noise as it presents the tactile impulses. Morse code presents information coded via groups of short and long signals, generally referred to as "dots" and "dashes". In this description the term "dit" will be used to refer to the short impulse, and "dah" to the long impulse, as is often used in descriptions of Morse code.

In theory more than two impulse types can used, but using just two types was found to be straightforward and clearly understandable.

Experiments showed that while variably-length Morse code-style coding is effective, evenly-spaced impulses of two force levels can be easier to interpret. Alternatively both methods can be combined, so that the impulses differ in both length and force.

Impulses can be induced by the system by using, for example, Microsoft's DirectInput software. The "Constant Force" effect can produce forces of controlled direction, force level, time and profile. In theory "Custom Force", or "Periodic Force" effects could alternatively be used, but "Constant Force" is found to be the most flexible.

If even force impulses are used that correspond in duration to the duration of Morse codes, a problem in comprehension can result wherein a single impulse is perceived as two impulses: one when the constant force starts, and one when it stops.

This problem can be overcome by presenting the forces as short impulses that are perceived by the user as instantaneous taps or knocks. "Tapping" codes have been used before for communication, for example by prisoners of war. The forces start suddenly and fall away smoothly so that the end of the force is not perceived distinctively. "Dit" and "dah" impulses are distinguished by the difference in force and/or interval between impulses.

732 FIG. 12 and 818 FIG. 14 show the sections of the GUIs of one preferred embodiment for controlling the parameters for the impulses.

Force-feedback tapping effects can be produced using DirectInput by triggering a "Constant Force", using an Envelope, and fading the force to zero level over a certain fade time. This will produce a triangular force profile that rises suddenly and drops away smoothly to zero level.

If the interval between impulses is used to distinguish the two types of impulse, it is necessary to have an extra impulse for any coding, when compared to conventional Morse code. This is because the impulse in itself does not convey whether it is a "dit" or "dah", only the time period between the impulse and the next impulse, and the last impulse does not have a next impulse. The problem is best illustrated by an example—if a person taps out the Morse codes for the letters "S" (dit-dit-dit) and "U" (dit-dit-dah) they both sound or feel identical (although the tapper will sometimes compensate by tapping harder for the "dah" impulse). The receiving person will tend to perceive the last impulse as being the same length as the preceding impulse, but in any case there is no indication whether the last impulse is actually a short dit or a long dah.

Consequently, the embodiment allows an additional impulse to be optionally added to codes 734 FIG. 12, so that the code can be recognized from the impulse intervals alone (varying forces can also help to differentiate dit and dah impulses).

The impulses can change in direction (i.e. rotate) 736 on change of impulse, impulse type (i.e. dit or dah), code or "word" (group of codes) 738. This can be the same direction or alternating direction. Such changes can help to distinguish separate components and remove the need for an end-of-code mark 734.

The check-box labeled "Farnsworth" 740 allows the user to specify that they want the style of timing that is known as "Farnsworth" timing for Morse code to be used, i.e. each code takes the same amount of time.

For embodiments comprising several force-feedback devices, the impulses can be presented on any one (or several) of the devices. In one embodiment the Joystick Configuration GUI FIG. 14 can be used to specify the preferred arrangement. If the impulses are presented on the same device as the tactile tracers then the impulses can be angled with respect to the direction of the tracer path at any moment 742 FIG. 12. This may help to keep the impulse effects differentiated from the tracer effect.

The same facility can present impulses at a certain angle to the path of the tracer even if the tracer is not itself being presented. Doing this will give a rough impression of the path of the tracer as the impulse direction changes with time, at the same time as coded information is being presented, but without the user's hand being moved. Such impulses can be felt on other parts of the user's body, and could be implemented on other devices, for example mobile telephones.

Audio Coded Impulses

Impulses can also be presented as audio effects, by using simple short tone-like sounds, in the same way as for conventional Morse code, though the two impulse types (i.e. corresponding to "dits" and "dahs") can be of varying volume and/or frequency and/or duration. Such audio impulses need not have an "end marker", as the two types will be more easily distinguishable. The coded impulses can be output separately or at the same time as the other audio effects.

Alternatively the audio impulses can take the form of variations to the volume of existing audio effects: if "Combotex" effects are not being presented, then the volume can be varied so as to produce fluctuations which can be interpreted as coded impulses. The level and length of the fluctuations can be user-controlled.

Both the tactile and audio coded impulses are mapped to the features being presented in a similar manner to that used to map braille i.e. by using a "look-up" table or similar.

4.3 Optical Processing—Acquiring Features, Lines and Corners

There are several types of optical processing that can occur in the software: Basic, Color Shade and Layout, Texture, Area and Selection filters, and Lineal Feature and Corner extraction. Additional processing can be performed by external image processing software that is available, and the latest available software should be assessed. The selected Activity indicator should be able to determine the parameters for these processes when appropriate.

Basic Processing

Brightness, contrast, and saturation control; cropping and stretching; and selecting the area of a viewzone; are described in Steps C and D of section 3.2.

Color Shade and Layout Processing

Layout mappings are described in section 3.4. A viewzone can be processed so that the color shades are reduced to a number of shades that can easily be conveyed to the user via categorical effects such as categorical colors and Layouts. To simplify understanding of the effects, the system generally allows the pattern of just two specific properties to be conveyed via the Layout effects. "Averaging" sounds also normally convey no more than two specific properties for any particular area (though finer light and color information can be given by the small changes in volume that are used for "Combotex" effects—see section 5.1). In order to allow several color shades to be available, yet reduce the number of properties conveyed in any Panel of a Layout to two, the following method can be used:

a) Average the color content in each segment within each panel of the viewzone. This can be done by sampling a square of spaced pixels—the number can be specified by the user 744 FIG. 12—and obtaining an average RGB value for each segment. However it may be better to use sample-areas with diameters different to those of the current segment diameters: if too fine sample-areas are used, the elements of mottled areas (e.g. colored red and yellow) may determine the categories chosen, rather than the combined effect (e.g. orange) that should be perceived at a given zoom level/resolution. Using too large sample-areas will result in prominent properties being averaged-out and missed. Some experimentation may be required to determine the most effective sample-area size to use for the current Activity identifier (relative to the viewzone and/or Layout segment size).

b) Test all possible pairs of categorical colors for the current color palette, and find out which pair gives the least error when applied to every segment in a panel. For example if the panels are in a 4-segment by 4-segment configuration, and a "2 colors from a palette of 15 colors" format is used, then there will be 16 segments and 105 possible color combinations. Each of the 105 combinations is tested against the RGB values for each of the 16 segments, and the errors produced for each combination are totaled up. Errors can be defined for example as the distance in three-dimensional RGB space that the compared colors are separated by. The system should hold a table giving which of the available 15 shades should be assigned for every combination of the three RGB light levels (this information can be held as a "3-dimensional" look-up table). For each shade the system should hold values giving the amount of "error" to be assumed for when any of the other 14 shades is selected as the shade to be conveyed (for example a low error value will be held for if "Orange" is the selected shade and the tested area is classified as "Yellow", while a high error value will be held if the tested area and the selected shade are complimentary colors). To summarize, when processing an area, the system should test all available shades or combination of shades and for each one calculate the total amount of "error" that would be present in the area if they were selected. The shade or combination of shades that gives the least overall error is then chosen and communicated to the user. If the lowest overall error exceeds a certain amount then the "Polychrome" property should be conveyed.

Similar tables should be used for the other palettes.

(It is convenient to allocate shades to each of the 125 RGB color combinations produced if 5 evenly-spaced color levels are assigned to each of the red, green and blue components used in the RGB color system. Each of the 125 RGB shades so assigned can be further split if it is necessary to more finely define particular shades, by dividing each R, G, and B component into thirds, so that each of the 125 RGB shades hold 3×3×3=27 sub-shades, producing 3375 different RGB shades that can be assigned to the defined Shade Ranges. The system can then work in 15-level RGB (i.e. a maximum of 3375 RGB shades).)

A refinement of this method is to allow non-linear error calculations, for example by raising the RGB "distance" between the tested color and the comparison color by a particular power, for example by squaring it. The power that the RGB distance is raised to should be controllable, so that different powers can be tested and the most appropriate power for the Activity in question can be used. Increasing the power will tend to increase the negative impact of more different colors.

Another approach is to "reward" correct colors i.e. produce a number that is higher the "closer" it is to the comparison color (this can also be raised to a variable power as just described).

If a panel is to be presented as the layout of two color shades then each segment in the panel is set to the closer of the two selected color shades; and the consequent pattern of segments can be conveyed to the user via the Layout categorical effects described in section 3.4.

Texture Processing

If categorical textures are to be presented then the "texture" of certain areas can be determined to some degree by the system, using existing image processing methods, for example by using statistical and pattern-matching methods; and for pre-processed images can be identified by a designer. The system allows textures to be conveyed directly as properties (according to Column 7 of the table in FIG. 18). Texture can be thought of as a "pseudo-color" as it can be perceived in a similar manner to certain colors or color-combinations. In practice many objects and areas are often primarily of one color and level, and can be classified into one of the texture categories shown in Column 7 of FIG. 18.

"Combotex" processing allows non-categorical textures to be optionally added to audio and tactile effects. It is described in section 5.1.

Area and Selection Filter Processing (Entity Processing)

Once Layout and texture effects have been calculated, the original viewzone area can be further processed in an attempt to locate significant entities. Area and Selection filters 816 FIG. 13 are used for this purpose, and the parameters for them can be determined by the Activity identifier.

Area Filtering

"Area Filtering" specifies how the system should process the images that have had the Basic filtering applied to them, to highlight areas of adjacent groups of pixels that have similar features (e.g. by identifying areas of common color shade). The Area filter uses standard optical processing techniques to isolate areas of common properties within the image, for example by using a "moving average" "window" to remove the effects of small changes (i.e. a "low pass filter"), and then setting pixels to a reduced range of RGB levels in order to group similar color shades. The size of the window and the number of RGB levels (or other color grouping) should be user-controllable 816 FIG. 13, and the best combination may vary according to Activity. Resultant areas of single color shades can be eroded and built up in order to eliminate very small areas. 772 FIG. 21 shows an example of a viewzone processed in this way.

Applying these and other standard optical processing methods (that are extensively described elsewhere) will produce areas of common color shades (or other properties), which can be used as a basis for the Selection filtering.

Similar filtering can be used to produce common areas of other characteristics, for example of common texture or distance (if distance measuring is available). (Suitable methods for automatically detecting textures are documented elsewhere.)

The parameter settings (for example the size of the Moving Average window) for producing areas of common properties should be user-controllable 816 FIG. 13 and may vary according to Activity.

Selection Filtering

"Selection Filtering" decides which (if any) of the colored areas isolated by the Area filter should be presented to the user. Its parameters include specifying the priority that should be given to each of several features, for example:

Color shade;
Size (area and/or maximum & minimum dimensions);
Closeness to an ideal shape;
Closeness to an ideal orientation;
Difference of color shade from average shade of image (i.e. distinctiveness of color);
Separateness from edge of image;
etc.

Allowance must be made for the size and position of the viewzone when the Selection filter is applied.

Each feature should be assigned an importance, which can include "essential" i.e. areas failing to fall into a certain band of values for a feature can be excluded from consideration.

Each area is compared to the provided list of ideal features, and an overall score assigned. A certain score level can be specified, so that only those items meeting the specified score are considered for presentation.

Finally, the qualifying areas are sorted into order of score, and the system presents as many of the qualifying entities as it can in the time available for the current configuration, according to their score. Normally they will replace the standard Layouts in the panel in which they occur in a similar manner to that described in section 5.7, and illustrated in FIG. 22.

For un-identified entities (i.e. where a shaped area has been identified, but its exact nature is unknown), the audiotactile tracer can convey the shape and corners of the area/entity as described below, and the Property and Layout CVs can convey the distribution of properties within the entity, or alternatively can convey the distribution of properties within the panel as normal.

As an option, the system can be set to always analyze the whole image for entities, rather than the current viewzone, and only present qualifying entities when they are found. This will generally be used for very precise/focused activities e.g. "looking for a red item" (and when the whole image is being inspected). If the required item is identified, then the system can move and resize the viewzone to encompass it, and then present the viewzone content in the normal manner (the pitch and stereo positioning of the sound, and the position of the tactile pointer will indicate the location of the entity within the image). The effect of this option will be to allow the user to have the image generally conveyed to them in the normal manner, but then for the system to switch to conveying the sought-for item when it has been identified. Once identified, the system can alternate between conveying details of the found item, and conveying general image information.

When identified items are found in successive images and their characteristics are sufficiently similar, then as an option they can be considered the same item, and the system can be programmed to smoothly move the viewzone and tactile pointer between their locations in successive images. This will allow moving objects in a relatively fixed scene to be smoothly "tracked" without the pointer (e.g. force-feedback joystick) moving jerkily between successive locations.

The exact approach and configuration of the filters will depend on the Activity and requirements of the user.

The Area and/or Selection filters can also be effectively set to "none" so that no entity identification is attempted and only Layouts (or pre-processed Entities) are presented.

The embodiments can use any appropriate available techniques that allow detection and recognition of features and objects. These processes are sometimes called "machine vision", "computer vision", or "artificial vision" and use such techniques as digital image processing; texture identification and classification (for example via Fourier analysis); edge detection; contour following; template matching; and feature grouping. OCR (Optical Character Recognition) technology can be used to identify text and simple standard shapes. These methods are well documented elsewhere, and the constructor must decide what degree of image processing functionality is to be provided by their embodiment.

Lineal Feature and Corner Extraction

Lineal Feature and Corner extraction can be done either within the Area filter or in the Selection filter. It can use standard optical processing methods to identify lineal features such as lines (of whatever shape; curves; zigzags; etc.), edges/perimeters of shapes, lines of symmetry, "medial-lines" etc. It can then model the shapes as a series of circular arcs, which can then be presented by the tracer creation routine (see section 3.2). For example the program can detect when the rate of change of the direction of the perimeter changes by more than a certain amount, whereupon a new circular arc is modeled. The parameters need to be set to balance the need to accurately model the shape, yet not to produce an excessive number of arcs. The Hough transformation algorithm can also be used to identify curves, circular arcs etc.

If the rate of change of direction of a line exceeds a certain amount then the corresponding section of the perimeter should be deemed a Corner, and presented as such (in the manner described below). Other standard optical processing methods exist for identifying corners.

The edges/perimeter of a shape can be obtained by using one of the standard algorithms for edge detection, for example the Canny algorithm. (770 FIG. 21 shows an example result of using this algorithm). This will produce more accurate edges for entities than are obtainable using the moving average approach 772. The two methods can be combined 774 so that the moving average is used for entity selection, then the more accurate edges located nearby can be used if available; or just one method can be used.

A corner can also be defined as a point for which there are two dominant and different edge directions in a local neighborhood. There are several corner-detection algorithms, for example the Harris & Stephens algorithm.

The current best edge and corner detection algorithms should be assessed and used if appropriate.

Alternatively a sighted person can mark images with the locations of lines and corners as described in section 4.5.

4.4 Communicating Lineal Features and Corners

Experiments show that emphasized corners are particularly significant when conveying shapes via audiotactile methods.

If someone traces out a particular shape, for example a triangle or a square, in the air or on the palm of someone else's hand, they will often do so by stopping momentarily at the location of any corners in the shape. The pauses at the end of each line emphasize the presence of sharp bends or corners within the shape, and these are particularly important in comprehending the shape. If the person traced the shape at an absolutely even speed, the shape would be more difficult to comprehend, and "closed" shapes would tend towards appearing more like amorphous "blobs".

A similar effect occurs for shapes presented as tracers in both the tactile modality and the audio modality. When people see items, corners produce a considerable effect in giving the impression of the shape, and it is important that this is reproduced in the audio and tactile modalities. To represent corners, distinct indicator effects (called "indicium effects") are output while the shape tracer is being presented, the indicium effects being presented at the moment when the tracer is passing the location of the corner. The simplest such indicium effect is to momentarily stop the movement of the tracer, or jolts can be applied to the force-feedback device. Alternatively a short characteristic vibration or similar effect can be used. Audio indicium effects can include momentary pauses in the tracer movement; brief changes in volume; short, sharp noises; distinctive noises; etc.

Stopping a moving tactile effect momentarily (for example by stopping a moving joystick momentarily) is found to be effective, though other tactile effects such as short impulses can alternatively be used. Stopping a moving audio tracer is only partially effective at conveying a corner, and a change in volume (or other audio effect, for example a change in frequency) will generally be additionally required. The indicium effects can be presented on other devices and in different modalities to the tracer. For example audio indicium effects can represent corners in tactile tracers, and vice versa.

It is particularly important that corners are highlighted when they are essential features of an entity but are not sharp angles, for example in an octagon.

The system can limit the number of corner indicium effects that it outputs in any period of time, and attempt to rank the ones that it detects, so that the most important corners are highlighted. The ranking can be done on the basis of the giving a higher ranking to cases where the line components that meet to form the corner are smooth (straight or evenly curved), as such corners are more significant than those found in an irregular line.

Pre-processed images can have corners marked on them in a similar manner to the other data that is stored for pre-processed images. For "live" images, the software that identifies the edge of objects could follow standard methods for identifying corners, for example by detecting when the direction of the perimeter changes at greater than a certain rate, as described in section 4.3. Such corners can also optionally be included in the effects that are conveyed when the highlighted entities are conveyed.

4.5 Predetermined Features

Pre-processed images allow the best methods for conveying an image to be pre-selected. A sighted designer, with the help of appropriate software, can define features and areas of the image (for example by selecting and modifying areas indicated by edge-detection software, which is readily available). For each feature and area the designer can specify the most appropriate method(s) of conveying the visual information. If necessary, more than one method can convey an area, either simultaneously or in sequence.

Then a sighted designer could navigate the image in a way that they feel best conveys the image, and software can record the viewzone, pointer-column position, zoom level etc. as time progresses. The recording will be referred to as a "conducted sequence".

If the image is pre-processed (rather than raw video data) then the system should use the entity information that is provided with the image rather than attempt to perform feature or object recognition. If a preferred conducted sequence has been provided then the system should act on this, moving the pointer-column and replaying the audio and tactile effects in the order recorded by the designer. An option should be provided to allow the user to override the pre-processed entities and conducted sequence (or just override the conducted sequence, so that the output is controlled by the user, who can select which parts of the image to inspect).

The data describing conducted sequences and details of the entities can be provided to the embodiment separately as a file of data; or be added to existing images (whether single images or motion-picture sequences) using "steganographic" methods wherein entity and conducted sequence information is embedded in the image itself, as data disguised in the least significant bits of the pixels of certain parts of the image. This approach is a standard technique called "steganography" and is documented elsewhere. It has the advantage that the images can also be viewed normally using standard equipment and software.

Images and motion-picture sequences prepared in this way can be transmitted through media currently available, for example via DVDs, or the Internet. The data could be communicated via one or more of the data channels that are often available with modem video media, enabling pre-processed sequences to be combined with otherwise standard video sequences.

5 Other Features 5.1 Communicating Texture

As well as conveying the categorical colors, textures and/or distances via categorical effects, it is also useful for the system to convey the fine detail and "surface texture" due to fine changes in brightness, color and distance, and combinations of these. (In vision, the texture effects due to changes in distance are mainly due to consequential light and shadow effects rather than perceived actual changes in distance.)

In the audio modality, such fine detail is conveyed by small, rapid variations in the volume of the speech-like sounds that are otherwise conveying the general properties. These volume variations can be applied to both Averaging and Layout (and Direct-description) sounds.

(Volume is also optionally used to convey larger general areas of "change" (see section 5.5 below). Volume is generally only useful as a comparison quantity or "change" indicator of some type, as most people are not good at judging absolute sound volume, and the effect of a change in volume fades quite quickly. It is generally clear from the context what a change in volume is conveying.)

The fine changes in brightness, color and distance can be combined to produce a varying volume effect consisting of rapid minor changes in the amplitude of an otherwise even sound. This effect may be perceived as a "flutter", which conveys an impression of the detail of an area "on top" of the general properties conveyed by the categorical speech sounds. The effect will be referred to as "Combotex" as it combines the effects due to the fine changes in brightness, color and distance, to give a composite "surface texture" effect. It conveys the fine detail in an area in a more intuitive manner than categorical speech sounds.

The user does not normally try to follow the precise detail conveyed by the "Combotex" effects but gets an impression of the general level of fine change occurring in an area. Categorical speech-like sounds can convey the most prominent overall properties, and are interpreted in a linguistic/phonetic manner; while "Combotex" volume variations can convey the combined fine detail and "surface texture", and are interpreted more intuitively.

The "Combotex" volume effects can be kept at a relatively low level so that they do not unduly disrupt the underlying categorical speech-like sounds: harmonic effects from the changes in the volume of the sound can produce their own phonemic and sub-phonemic speech-like sounds which, if allowed to become prominent, can have a confusing effect.

The amount of intensity (e.g. volume) change due to "Combotex" effects, and, if applicable, the rate of sampling, can be user-controlled 746 FIG. 12.

The "Combotex" processing is performed on the original monophonic sound before it is binaurally positioned and becomes the stereophonic output sound.

Tactile effects, equivalent to the volume "flutter" imposed on the sound to convey the "Combotex", can be conveyed on a force-feedback device. These tactile amplitude-change effects allow deafblind users to obtain a similar impression of the "surface texture" of the area being conveyed as that given by the volume variations in the sound. However if coded impulses are being presented on the same device, then the user may prefer not to exhibit "Combotex" effects on it, in order to avoid confusion.

5.2 Timing Effect Output

The "Playtime" (see 748 FIG. 12) is a user-controlled period of time that defines the timing of output and acts as a "conductor" to allow simultaneous effect output to be synchronized. It is typically between one and six seconds, and, among other things, gives the time allowed for conveying the contents of the viewzone. This in turn affects the resolution of the conveyed information.

The Playtime should be easy for the user to quickly set and change, so that they can slow down output when the conveyed image content becomes complex, and speed it up again later. This allows the user to feel in control, and they can set the general output speed to a rate that suits them. An effective way of controlling the Playtime is via the analogue control that is normally located on the base of joysticks.

In the tactile modality, as an option a small jolt can be applied to the pointer-column 15 FIG. 9A at the start of each Playtime timing, or fraction or multiple of a Playtime timing, so that deafblind users can feel the Playtime and know, for example, when to next read the braille display 10, which is typically updated several times per Playtime.

The Playtime directly or indirectly controls the frame rate of moving images, the resolution of images and the "stepping" rate of automatically-moved viewzones.

5.3 "Viewzones", Zooming and Moving

Viewzones

The user can specify areas of differing resolution which can be selected to allow the inspection of a reduced area of the image, and allow the most significant areas to be conveyed at a higher resolution. The specified field of view can be moved within the full image by the user. Such movable zones will be referred to as "viewzones". Viewzones can simulate a macula, a fovea and areas of focal attention, as well as convey low-resolution representations of the whole image.

Within the overall image, one or more viewzones can be defined and several viewzones can be active at any moment. Viewzones are normally rectangular areas and can be moved by means of a pointer. They can expand and contract, and the user can restrict the area conveyed and increase the resolution of the information. However when viewzones are expanded to contain a larger area, then the resolution of the conveyed area within the viewzone will reduce.

For any viewzone, approximately square areas known as a "segments" hold summaries of the pixel properties present within the segment area: the system software should be able to consolidate the content of any squarely-arranged group of adjacent pixels into such segments. By default, viewzones are configured as four squarely-arranged 4-segment by 4-segment panels i.e. 8-segments by 8-segments. However other segment and panel configurations are available for viewzones, and some of these are shown in FIG. 6.

Most of the time the "Square" configuration will be used. However in most cases similar functionality can be provided, with minor adjustments, for the other configurations.

The viewzone shapes are shown as Layout segment arrangements. However most of them can also be used for viewzones conveying exclusively Averaging effects.

The configuration, sizing and movement of viewzones should be fully user-controllable.

Zoom Levels

The system offers segments/viewzone size consolidations based on the width of the viewzone compared to the longest edge of the image—these "zoom levels" are numbered from zero upwards, and represents the number to which 2 needs to be raised in order to get the number of viewzone widths within the image width. For "zoom level 0" the viewzone covers the whole image.

The user can alter the "zoom level" of the viewzone by using button or key sequences or by using a "yaw" action on some types of joystick.

There can be the facility to adjust the zoom level slightly inwards or outwards so that the viewzone frames a subject better.

The system can be programmed to return to the nearest standard zoom level after a certain period of time with no user input.

Moving the Viewzone

There are several possible approaches to positioning and moving a viewzone:

a) The movement can be via a pointer, such as the joystick.

If a powered pointer such as a force-feedback joystick is used, then it pulls the pointer-column towards the center of the nearest panel position at whatever zoom level is active, so that the pointer-column "jumps" between panel positions as it is moved by the user. The "notchy" stepping action helps the user to link the sounds and tactile effects to the location in the image indicated by the pointer.

b) The movement can be specified as automatic: the system can be instructed to convey successive outputs of a viewzone area while moving it in steps, on each change of Playtime conveying an area abutting (or overlapping) the previously-conveyed area, so that the viewzone systematically "steps" around the area of its parent viewzone (which may be the whole image), conveying adjacent areas with successive scans.

c) One viewzone (or more) can be defined as being change-controlled. The area of maximum change can be conveyed to a powered pointer, and when sudden change is detected in one part of the image the viewzone will be moved and become centered on the area of change, with the zoom level set to encompass the change.

Adjusting the Viewzone Position

Once a viewzone is positioned, the user can temporarily modify its position slightly by "adjusting" the viewzone by one or more segment positions. This can be done to allow the viewzone to better "frame" an entity (which may be bridging several standard viewzone positions).

The viewzone adjustment capability can be useful for prepared conducted sequences, so that the items of interest can be accurately framed.

"Parent" and "Child" Viewzones

Each viewzone can have a separate "parent viewzone", within which it moves, defined by the user. All movement of the "child" viewzone occurs within the area covered by the "parent" viewzone, and any instructions to move the "child" viewzone are usually interpreted as being requests to change the viewzone's position with respect to its parent viewzone. When the parent viewzone moves then the child viewzone usually moves with it, so that the position of the child viewzone with respect to the parent viewzone does not change. Alternatively the child viewzone can remain stationary until the edge of the parent reaches it, whereupon it follows its parent; or the movement of the child viewzone can "drag" the parent viewzone along with it when it reaches the edge of the parent viewzone.

"Pseudo-Macula" and "Pseudo-Fovea"

One effective configuration is to define a "pseudo-macula" and a "pseudo-fovea", as "parent" and "child" viewzones, that are conveyed along with the overall scene.

The pseudo-macula/pseudo-fovea arrangement takes into account the following:

a) Human vision has an overall visual field of view that is approximately 180 degrees wide, 120 degrees up/down (70 degrees down, 50 degrees up), with a narrower field of binocular vision.

b) There is a region of high resolution (macula lutae) that is at the "center of gaze". It is approximately elliptical in shape, and covers a field of view about 12 degrees wide and 4 degrees high.

c) Within the macula there is a circular region of very high resolution (fovea centralis) that occupies about 1 degree of the field of view.

Figure 23:
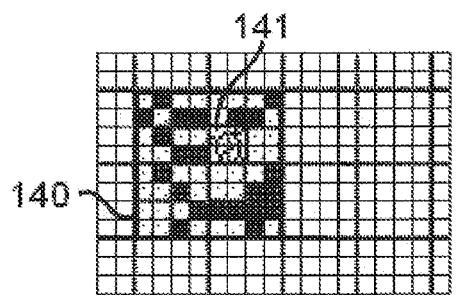
FIG. 23 illustrates a pseudo-macula and pseudo-fovea arrangement that uses rectangular viewzones.

Effects that are analogous to aspects of these points can be produced by using configurations with rectangular and square panels FIG. 23, wherein the full scene has within it movable viewzones comprising a viewzone of medium-resolution (the "pseudo-macula") 140 and a smaller viewzone of high resolution (the "pseudo-fovea") 141. The pseudo-macula could be positioned via a joystick, either fully under the control of the user or directed to the area of greatest change (with the user able to override such positioning).

Rounded Pseudo-Macula and Pseudo-Fovea

Figure 24:
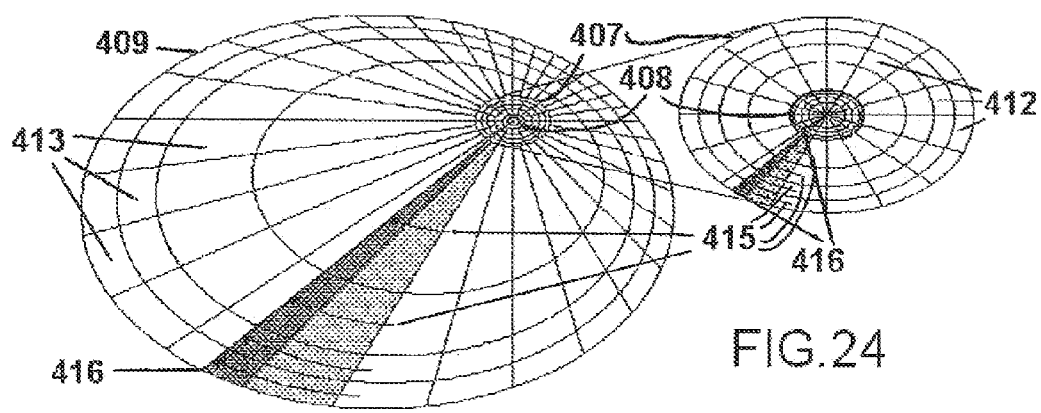
FIG. 24 illustrates a pseudo-macula and pseudo-fovea arrangement that uses round viewzones.

FIG. 24 shows the "Eyeball" configuration, wherein a circular or elliptical pseudo-macula viewzone 407 and a circular or elliptical pseudo-fovea viewzone 408 can be used, within a larger circular or elliptical viewzone 409 that conveys the peripheral areas in Averaging mode. All three viewzones use a special "Pie-slice"-like viewzone and segment configuration.

Four simultaneous tracers 415 convey the fine detail and "surface texture" of each viewzone 416, and the speech-like effects convey the categorical properties and segment arrangements in each panel (i.e. quarter-viewzone). For both macula and fovea, 64 equal-area segments 412/413 are arranged in a "Pie-slice" configuration. Braille equivalents of the macula and fovea can be conveyed.

The outer viewzone 409 conveys a low-resolution representation of the remainder of the full image.

An appropriate sizing of the viewzones would be for the outer viewzone to convey a field of view of about 64 degrees of arc, the macula viewzone to convey about 8 degrees of arc and the fovea viewzone to convey about 2 degrees of arc.

Moving and Stabilizing the Pseudo-Macula (and Other Viewzones)

When sighted people look around a scene, they often either move just their eyeballs; or move their heads to change the entire view. Either way the scene is perceived as a series of static views (known as "fixations"). Often the center of gaze is held on a particular object despite eyeball and head movement. The method by which the eye and brain perceive the scene as stable despite head and eye movement is complex, but it is useful if some of this mode of function can be reproduced by the system—general "panning" around a scene may be difficult to interpret. The stability of live images will be improved if automatic camera and image steadying devices (not shown) and a wide-angle lens are used, or if the camera is chest- or shoulder-mounted, with the macula location controlled by the position of the user's head. This could be implemented by using head-tracking apparatus for example by using solid-state gyroscopes (not shown). A "freeze-frame" toggle option can be provided, whereby the image being conveyed is "frozen", being repeatedly transmitted until freeze-frame mode is toggled off. Toggling on "freeze-frame" mode 731 FIG. 12 will permit a stable image to be explored before a new image is obtained. To some extent this effect is present anyway, as each Playtime takes a significant amount of time.

The many types of computer pointers that are available, including many types of joysticks, trackballs, head pointers and "mice" (not shown), could be used (with a suitable interface) to control a viewzone. New pointing devices are often developed, and the current models should be evaluated—for example a "data glove" (not shown) could be used to indicate particular areas.

There are also several pseudo-pointer techniques, for example assigning codes to different zones within the image, and instructing the viewzone to move to that location; and switch operations that can simulate pointer movement.

Alternatively the movement of the user's head and/or eyes could be tracked (not shown) to decide the current center of gaze. The world apparently remains steady when sighted people look at it while moving about and moving their eyes (i.e. it does not apparently "pan round" in the way that a motion-picture sequence seems to when a movie camera is moved). This effect can be simulated by keeping a viewzone fixed on the same entity when the video camera 27 FIG. 3 moves: if the blind user 26 is able to control their eye movements then eye-tracking can be used to control the position of the pseudo-macula (there are several standard eye-tracking techniques such as using magnetic contact lenses, then detecting their position using the "Hall effect"; or using optical methods). However such eye-movement control may not be possible for many blind users: alternative ways of keeping the macula steady include software object tracking and the use of solid-state gyroscopes to detect head movement (not shown). The technology known as "virtual reality" has developed several head-tracking and eye-tracking techniques. The relative direction of gaze of one of the user's eyes compared to the direction of the video camera 27 can be determined by calculating both in relation to an agreed direction, for example the location of an ultrasonic transmitter located on the chest or shoulder of the user (not shown). If the camera is head-mounted (not shown) then it may be easier to calculate the relative direction of the user's gaze with respect to the video camera's 27 direction of view.

5.4 Speech Synthesis

Speech-like sounds can be produced via standard speech-synthesis software, or can be sampled from actual speech and stored in digital form. Both approaches will be referred to in this description. The recommended approach is to use sampled actual speech for the fundamental speech-like sounds that are used to convey properties etc., and synthesized speech for Direct-description sounds (see section 3.4), text and menu prompting.

Speech synthesis is a well-documented subject, and is not covered in detail in this description. Advanced speech synthesizers can use one of several established methods to produce natural-sounding speech and to allow control of many of the parameters of speech, such as prosodic features (timing, stress, intonation etc.) and voice characteristics (breathiness, pitch, sex etc.).

Experiments showed that about 200 distinguishable consonant-combinations could be devised by using an advanced speech synthesizer, but much fewer could be devised if a simple microprocessor-based synthesizer was used. For vowels, there is less difference, with a maximum of about 18 single-phoneme vowels being distinguishable. However many more distinguishable sounds are available if sampled voices are used.

Sampled Speech

When hearing normal speech, most people can "fill in" for sounds that are not clearly heard, but this ability will not function when the coded sounds are heard, so very clear and realistic speech is important. Sampled speech is generally more realistic than synthesized speech.

It is recommended that several voices are available, and for each voice all of the basic speech components that are used to make up the categorical speech-like sounds are recorded, sampled and stored in digital form.

The voices which are used should be distinctive so that they are easily distinguishable, for example by using the voices of people of differing age and sex, or who speak with mild accents (but the vowel sounds must not be significantly distorted from the standard sounds). The voices of well-known personalities can be used. Different sets of voices can be produced for users in different parts of the world, as people tend to be able to better distinguish speech spoken in accents with which they are familiar (and different phoneme sets may be used for different parts of the world).

Figure 25:
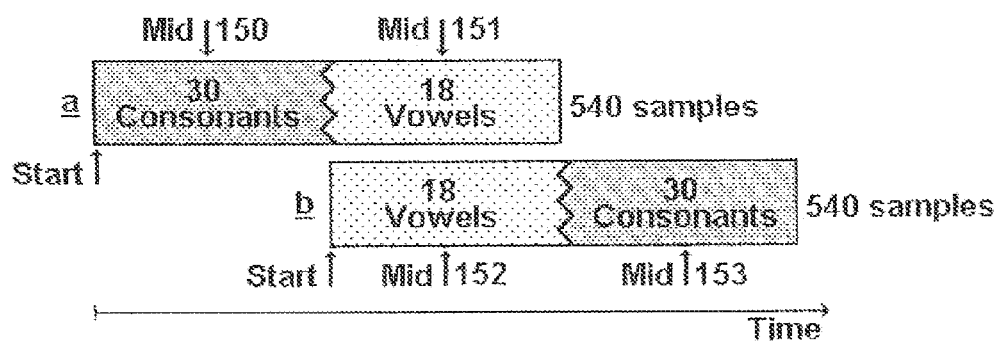
FIG. 25 shows how voice samples can be combined to construct the standard categorical sounds.

It is not sufficient to simply store samples of each consonant (C) and vowel (V) sound for each voice—joining these together will produce very disjointed speech. With reference to FIG. 25, the following components should be stored:

a) For each of the consonant (C) sounds, CV-syllable samples beginning with the C followed by each of the vowel (V) sounds. The vowel sound should be completed as a word-end.

b) For each of the vowel (V) sounds, CV-syllable samples beginning with the V followed by each of the consonant (C) sounds. The consonant sound should be completed as a word-end.

The consonant and vowel mid-points 150, 151, 152 & 153 within sample types a) and b) should also be stored. These samples (for each voice), along with the phoneme mid-points shown in FIG. 25, can be used to construct any of the permitted combinations of the standard coded categorical sounds described herein.

If the coded sounds consist entirely of CV-format sounds (e.g. if no CVC-format sounds are used) then only the first set of combinations need be stored. Experiments showed that two such samples can be concatenated without producing distracting discontinuities (for example the sounds of the name "Lucy" can be produced by concatenating the sound samples for the syllables "LLUW" and "SSIY").

If audiotactile objects are to be conveyed using sampled sounds, then additional samples may need to be stored.

The storage requirements will depend on the exact design, but, for example, each sample can be about 0.25 seconds long, recorded at a sampling rate of 22 KHz, with 16 bits (2 bytes) per sample, taking about 11K bytes per sample. Standard compression/decompression techniques (which are extensively documented elsewhere) can be used.

The samples should be recorded with the speaker maintaining an even rate and particular pitch, which should be near the middle of the frequency range used. The selected sample waveforms can then be trimmed and adjusted in length using standard software so that they all take the same time. The resultant samples are stored in a database of waveforms that can be rapidly accessed when specific samples are needed.

The frequency will be altered to the required level by removing or repeating sample points at regular intervals. Larger groups of repeating or near-repeating sequences are added or removed in order to produce correct timing (see Step G of section 3.2).

5.5 Communicating Change and Movement

The human eye is very sensitive to change and movement. Sighted people normally find it easy to detect change and move their attention to an area of change. Highlighting change to the user is very useful for live images if the image is mainly stationary. Highlighting "change" should be optional, and user-controlled. Either an increase in volume, or special higher-frequency tone-sounds (or both) can be used to highlight areas where change is detected (due to movement, for example).

The system can either analyze the overall change in an area, and use that to control the volume of the existing audio effects; or analyze the change in "change-sections", which are small-sized areas whose size is found to be effective for detecting change for a particular application. The size can be user-controlled. If set too small, "change-sections" will detect too much change between successive measurements.

The approach to detecting change can be that the system should calculate the differences in the change-sections' image content between the present and a previous point in time. Calculating the change for all change-sections allows a 2-dimensional low-resolution "change map" of the change-areas within a viewzone to be produced FIG. 26.

If the total amount of change detected in an image increases above a particular level, then the image is considered to be unstable and no change analysis will be conveyed by the system. This may be done to suppress the effect of the large amount of change that may suddenly be detected when a video camera is moved, or when the image conveyed by a motion-picture sequence is completely changed.

As a refinement, the overall movement of the image (for example if a camera is panned round) can be allowed for and only the change that is not accounted for by the movement should be conveyed. This will avoid the problem whereby large amounts of "change" are suddenly generated (and consequently the change output generally suppressed) when the image moves.

Volume-Conveyed Change

The volume-increase approach gives a general indication of the areas of change. The volume rises as the amount of change in a change-area increases, so drawing the user's attention to the change-area. Items or effects moving around an otherwise stationary viewzone will cause the volume to increase in the effected change-areas.

As volume change is used for "Combotex" effects (see section 5.1 above) the general change-conveying volume changes should use a relatively large change-area i.e. be set to be low-resolution and only convey the approximate area of change. The effect of this is to have the sound amplitude changing relatively rapidly (but by small amounts) to convey the fine detail of a scene (due to "Combotex" effects), but the maximum overall volume level changing slowly to indicate the amount of change of visual information within the change-areas.

Tone-Sounds

A more specific approach to conveying change can be used, wherein sine waves or other regular waveforms (for example sawtooth or square waves), of higher frequency than the standard speech-like sounds, are output to convey the areas of change. They will be referred to as "tone-sounds".

The tone-sounds are conveyed along with the conventional audio effects, and the tone-sounds generally convey the change within the whole image.

When tone-sounds are used they should be assigned to each "change-section".

The sounds are pitched and binaurally-positioned to reflect the position of the section being conveyed, the volume of the tone-sounds for any change-section being roughly proportional to the change detected within that section.

Figure 26:
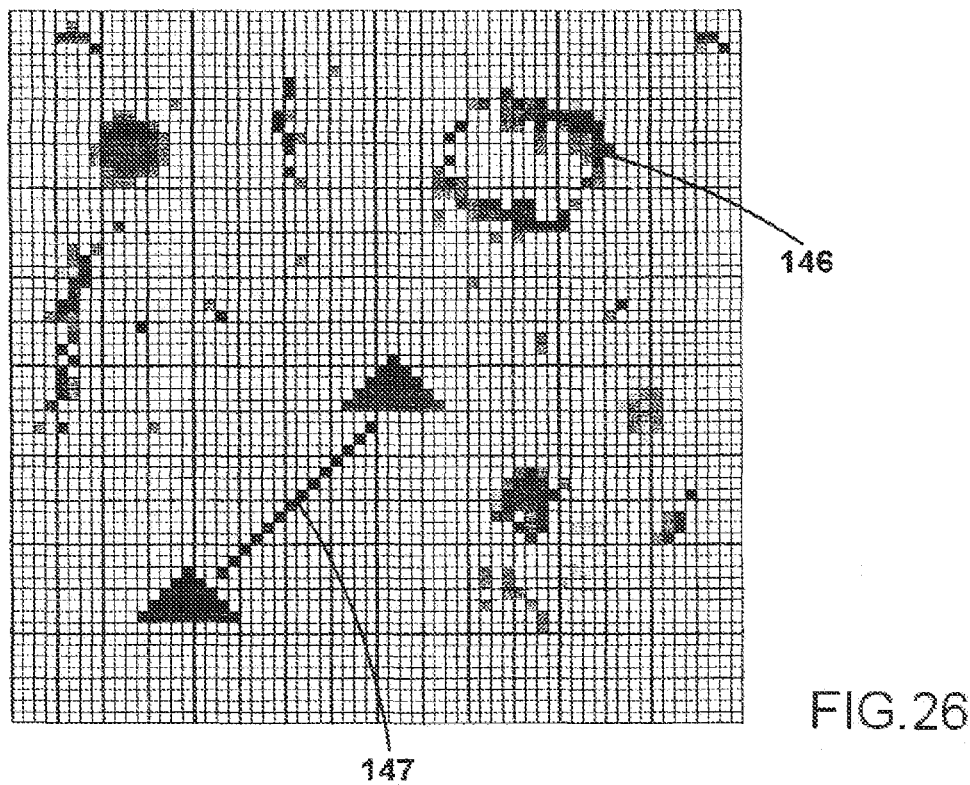
FIG. 26 shows a "change map" of "change-sections".

The system should apply a high level of "contrast" to the "change map" of change levels, so that only a few clear changes are conveyed at any moment FIG. 26.

The tone-sounds for each "change-section" are usually output simultaneously, the effect being of a high-frequency "curtain" of a relatively low number of tone-sounds, with tone-sounds for particular change-sections fading and new ones appearing as new changes are detected. The time-period over which change is detected does not have to match the Playtime and can be user-controllable, so that new change-conveying tone-sounds can appear at any point in time.

When movement occurs within an otherwise stationary viewzone, the detected area of change will appear to move with the entity, the "change-sections" producing a moving tone-sound effect that traces the path of the entity, giving a similar effect to that produced by shape-tracers. When a large even area moves within the image, the edges of the area will tend to generate the most change, creating an outline of the area in tone-sounds 146 that will move with the entity.

Tactile Effects

The main way in which tactile equivalents of the detailed change effects are conveyed is via the palm-pad 13 FIG. 9C, if available, which can convey a low-resolution version of the "change map" of the whole image when "tone-sounds" are being used to convey change.

When volume change is being used to convey general levels of change, the intensities of any tactile effects conveyed on the pointer-column 2 (and tactile palm-pad 13 if available) can reflect the corresponding volume levels.

Special Movement Effects

For pre-processed sequences (see section 4.5), the change-conveying tone-sounds can be simplified. Certain special conventions and effects can be used, for example:

a) A single moving tone-sound 147 FIG. 26 (or palm-pad effect) can follow the path of a moving object. An audiotactile tracer can initially convey the shape of the object, and then the moving tone-sounds can give the path that the object follows 147, with the shape and properties of the object being re-conveyed at regular intervals.

b) After change is detected and conveyed, an audiotactile tracer can convey the shape and properties of the object that has just moved.

c) The proprioceptive cues that are conveyed by moving a joystick to areas of change can be increased by ensuring that the joystick moves with the main moving object in the image, the details of the entity being conveyed as it moves. This may tend to happen to some extent anyway, but for pre-processed scenes the effect can be directly controlled by the designer.

d) To convey general image panning (up/down, left/right or diagonal), short, purposeful movements of the joystick in the required direction can be followed by a gentle glide back to its standard location.

Such special movement effects could be incorporated into "live" images if and when feature and movement recognition becomes more advanced.

Change Control of Viewzones

When sudden change is detected in one part of the image a viewzone-positioning force-feedback joystick can be moved by the system and become centered on the area of change, with the zoom level set to encompass the area of change (if the image changes completely then the viewzone should "zoom out" to encompass the whole image). The movement of the user's hand and arm will give proprioceptive cues about the location of the area of change.

Sudden change that is detected in one part of the image can temporarily override the systematic output of other visual information, so that the user is given details of the area of change as well as being alerted to the change occurring.

The movement of a viewzone to an area of change should only occur if a significant amount of change occurs in one area compared to the general level of change (so that it is not triggered if the whole image changes or the general level of change is very high).

As an option, the system can "give up" trying to move a shared powered pointer to the location of change if the user resists its movement for more than a defined period of time. This condition can, as an option, cause the change control to be automatically turned off, so that the user will have to request it again when they require change control to restart.

5.6 Presenting Entities

It is useful for the embodiments to attempt to identify "entities", separate "figures" from the background, or perform the other processes that occur naturally when people see things. If only Averaging and Layout sounds are conveyed, the user has to attempt to identify the nature of the items contained in the image. This will often be possible from context, and to some extent the purpose of the system is to convey shapes, corners, visual texture and color rather than to "tell" the user what is present in an image. However in certain circumstances it may be helpful for separate "entities" to be included in a conveyed image.

"Audiotactile Entities" can convey identified objects, unidentified objects, areas with common characteristics, or other features that are to be highlighted within the overall image. They generally consist of combinations of shape-tracers and can use special speech-like sounds that convey extra information about an entity. In the tactile modality, braille settings equivalent to the special speech-like sounds are presented on the braille display 10 FIG. 9C and combinations of shape-tracers can be displayed on the tactile palm-pad 13 (if available).

Three main types of Audiotactile Entities are used:

a) Audiotactile Graphics, which highlight identified shapes, corners and features within a scene.

b) Audiotactile Text, which conveys short pieces of text, either text visible in the image or, for pre-processed scenes, other explanatory text. Text can be identified by OCR (Optical Character Recognition) processes.

c) Audiotactile Objects, which convey identified or semi-identified objects.

These three Audiotactile Entity types can be joined together as Audiotactile Structures, which link up related objects and features.

(The adjective "Audiotactile" is sometimes omitted from these terms if it is clear from the context that it is Audiotactile Entities that are being referred to.)

Audiotactile Entities enable entities to be added to an image, to supplement and sometimes replace the existing effects. The Entities can, for example, replace standard panels and abut adjacent standard panels, or be located in an otherwise Averaging Method viewzone. The entities can be identified and added by a designer preparing an image for conveying (see section 4.5 above), or by software that identifies features within an image. They can then be processed by the system as part of the image-preparation process, and stored as records. They are then conveyed if and when they are located within the area encompassed by an appropriately-sized viewzone. The system also uses an "object library" which provides unchanging information about Audiotactile Objects.

Entities can occur at any zoom level, and normally take priority in the parts of the viewzone(s) that they occupy. The rules for the binaural positioning and pitching of the Audiotactile Entities follow those used by the areas in which they are located.

It may be helpful to think of there being a continuum of effect types, ranging from standard Layout effects systematically conveying an area, then the same but with identified line shape and corner features added via tracers and corner effects, then separate but unidentified entities, through to fully identified objects.

At the present stage of technology, audiotactile entities are mainly useful for prepared material and for highlighting features, shapes, corners, and unidentified entities found in the scene. However the same conventions could be used if effective object-identification software becomes available.

Object Tracking

Whether an entity is identified by part of the image-processing software within the system, or obtained from an external source (for example a pre-produced program of material etc.), the system needs to keep track of the existence and nature of the Audiotactile Entity. This can be done by using a rapidly-updateable file of data, database or similar in a standard format.

Layout Effects Conveyed via Shape-Tracers

Shapes and features within an otherwise conventional Layout Method-conveyed viewzone can be highlighted by using audiotactile shape-tracers. The shape-tracers can convey the same coded speech-like sounds as are used to convey the properties and layouts of panels, as well as highlight certain shapes and features associated with panels. Standard Layout panels can only convey a crude impression of shape, and have fixed borders. With the rectangular panel configurations previously described, the vertical and horizontal (and to some extent sloping) features are quite well conveyed, but strong curved or irregular features, and corners, present in a scene are not highlighted. In seeing, although horizontal and vertical lines are strong features of many scenes, other perceptual groupings are also often present, and audiotactile shape-tracers allow them to be highlighted.

Audiotactile shape-tracer effects can be added to conventional Layout panels when unidentified features and shapes are detected within a scene, by conveying distorted panels that can be conveyed within an otherwise conventional group of viewzone Layout panels. The shapes highlighted by the audiotactile tracers can either be within a single panel, and therefore conveyed when the categorical effects applicable to that panel are output, or can spread over the area conveyed by several panels FIG. 22. If the shape spreads over several panels that are spoken consecutively then the words used to describe those panels can be transmitted as a single tracer that conveys the required shape or feature. The order in which the panels are spoken should remain unchanged, but the tracers presenting it should form the shape being conveyed.

The volume of a shape tracer can be altered so that it varies to represent the size or width of the entity at any point (this is described further below).

By using this approach the fixed structure of Layout panels can be overcome and features other than horizontal, vertical and sloping lines can be highlighted, while maintaining the panel format in order to convey the relative position of features and to convey the areas where no specific features have been identified.

Figure 22:
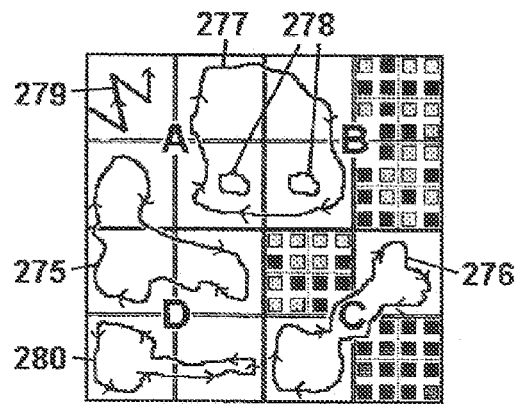
FIG. 22 illustrates several examples of the way in which "Audiotactile Tracers" can convey the size and shape of entities within an image.
Figure 28:
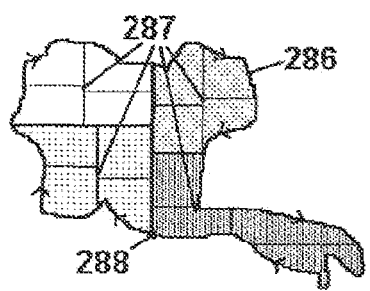
FIG. 28 illustrates the way in which the "segments" and "sub-panels" of an irregularly shaped object are shaped to convey equal areas.

The following conventions can be used:

a) If the tracer conveys a line which has its beginning and end at different locations 279 FIG. 22, or conveys a continuous unbroken line in a counter-clockwise direction 280, then it should be regarded as highlighting a feature within a non-distorted panel (or group of panels).

b) If the tracer conveys a continuous unbroken line in a clockwise direction 275 then the tracer is conveying a non-standard outline for the panel(s) and the user should mentally distort the contents of the panel(s) to fit the shape, as illustrated in the example FIG. 28. The segments within an irregular area 286, conveyed as four sub-panels 287 are consolidated into segments with an approximately equal area conveyed by each segment. The precise approach will depend on the panel configuration that is being used. The system should perform the appropriate consolidation of the pixels and from this, calculate the speech-like effects to be conveyed. The shape described by the audiotactile tracer should have a beginning and end point 288 such that each speech-like effect is spoken while the tracer conveys that section of the area boundary that approximately encompasses the sub-panel segments being conveyed by the speech-like effect.

When Entities bridge layout boundaries, as shown in FIG. 22, the following conventions can be used:

a) If the tracer-conveyed audiotactile object extends over several adjacent panel positions that would normally be spoken consecutively, then either i) the rate of speaking can be slowed so that it takes the time period assigned by the Playtime to the number of panels over which it extends ("method 1"); or ii) the object can be conveyed several times, repeated for each panel position over which it extends ("method 2").

b) If the object extends outside the viewzone, then within the viewzone the whole of the object (including any parts extending outside the viewzone) should be conveyed at the appropriate point, with the pitch and left-right binaural positioning being used to convey the shape and size of the object, and the speech either taking the time that would normally be used to convey the panels within the viewzone over which it extends ("method 1"); or being repeated for each panel position ("method 2").

c) If the object extends over more than one panel in a viewzone but the panels over which it extends are not normally spoken consecutively, then the whole of the object is conveyed each time a panel that contains part of the object is conveyed. In such circumstances the object will be conveyed more than once during the conveying of the viewzone, and at each occurrence the speech will take the time period assigned to the panel-position being conveyed, so that the viewzone panel timing is not affected.

These conventions can be demonstrated for example with reference to the objects visually illustrated in FIG. 22, which shows the four viewzone/panel-group positions marked A, B, C and D, containing both audiotactile objects 275, 276, 277 & 278 and conventional layout panels. The object 275 extends over panel-groups A and D. When viewzone/panel-group A is being conveyed, the whole tracer representing the object 275 will be spoken with appropriately varying pitch and binaural positioning, the effects taking approximately a quarter of the time taken to convey the whole panel-group marked A. However when viewzone/panel-group D is being conveyed, if method 1 is being used then the tracer representing the object 275 will take approximately twice as long to be conveyed i.e. half of the taken to convey the whole panel-group D. However if method 2 is being used then the tracer will be repeated twice when viewzone D is conveyed. Object 276 covers non-continuously panel positions in viewzone C, so can only be conveyed via method 2, i.e. the object is conveyed twice when the viewzone is conveyed.

Method 1 has more time in which to convey the shape, while method 2 ensures that the careful timing of the viewzone is not disrupted.

Often particular components of an entity are larger than, and encapsulate, smaller components. For example in FIG. 22 the object 277 contains two smaller components 278. If the smaller entities 278 are spoken as tracers, they may seem to occupy a smaller area than entity 277 and be part of it. For simple multi-component objects this effect is sufficient for the user to comprehend the structure of the object. However the smaller components may be "lost" if they are too small to qualify to be conveyed at the viewzone zoom level, and they will not always be conveyed at a point near to their "parent". To overcome such effects, several objects can be combined and linked if necessary, to produce "Audiotactile Structures"—both to link two or more physical entities (for example "horse"+"rider") or to combine abstract signifiers with physical entities (for example "fast"+"car"). These are described further below.

Composite Audiotactile Graphics

Composite Audiotactile Graphics highlight shapes and features within a viewzone, emphasizing the shape, layout and (in certain cases) texture of the feature or area rather than directly telling the user information about it. They can consist of several shape-tracers whose speech-like sounds, as with conventional tracers, can contain coded property information. Several tracers that comprise a Graphic are often output simultaneously, though these should all convey the same coded speech-like sounds, otherwise they will be difficult to comprehend.

Figure 29:
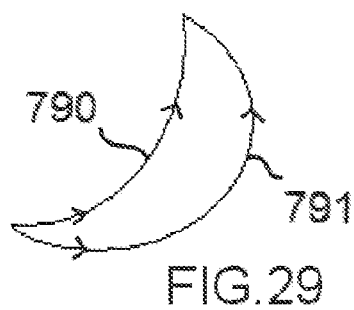
FIG. 29 shows how some shapes may be better presented by using two synchronized tracers.

For example the graphic FIG. 29 may be better presented by using two simultaneous and synchronized audio tracers 790 & 791, rather than presenting the perimeter of the shape. The two tracers will present the same categorical effects.

Audiotactile graphics will often be used as part of pre-processed material, where a designer who is deciding how to convey an image can select the areas to be conveyed as audiotactile graphics, and for each graphic decide the most effective method. Areas identified by feature- and object-identifying software can also be conveyed as graphics. There may be several graphics within a single viewzone, and for each graphic the method can be independently selected to best convey the appearance of the feature that it is representing.

In the tactile modality, a force-feedback device can present the path of the main lines within the Graphic, or, if available, the tactile palm-pad 13 FIG. 9C can present it.

Spine-Tracer Audiotactile Graphics

The technique for presenting the shape and corners of an object have previously been described, with the tracer presenting the edge/perimeter of the Entity, and corner effects highlighting the presence of corners.

Figure 30:
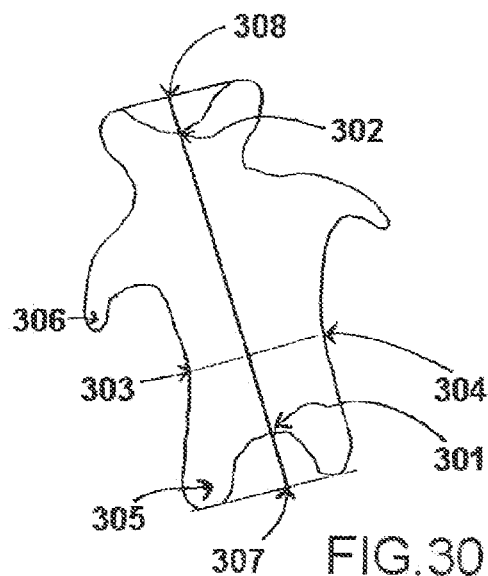
FIG. 30 shows how a symmetrical entity can be presented.

If the entity being conveyed by the audiotactile graphic is symmetrical or near-symmetrical (see FIG. 30) then a coded speech-like tracer 307 to 308 that runs along the axis of alignment can emphasize the direction of alignment. It will be referred to as the "spine"-tracer.

The spine-tracer can travel along the axis of symmetry and be altered in intensity (e.g. volume) to reflect the width of the entity at any point along the axis of symmetry (301 to 302), so that the orientation and approximate shape of the entity is conveyed.

An advantage of this method is that coded effects can be used to convey the properties of the entity, and the whole graphic can be conveyed in a short period of time. However it is not very precise, as people are generally not good at judging relative changes in volume, and the components of speech can mask the alterations in volume due to change in width. The method works best with smooth-edged entities so that changes in volume are relatively slow and do not distort the speech signal to such a degree that it cannot be understood. Appropriate rules need to be devised to cover situations such as where parts of the edge of the entity exist in areas outside those covered by lines perpendicular to the tracer (for example area 305) or where the edges double back on themselves (for example area 306). These particular situations could be handled by extending the spine-tracer backwards and forwards (for example line 307 to 308) so that all edges are included, and by using the convention that the distances of the nearest sections of border perpendicular to the tracer are conveyed. The width at any point along the spine-tracer can be defined as the total distance apart of the first sections of border encountered in both directions when a line is drawn perpendicular to the path of the spine-tracer (for example line 303 to 304).

As with simple graphics e.g. FIG. 29, one or more tracers can additionally convey the outside edge of the entity. These will be necessary if the volume of the spine-tracer is not altered to convey width: the spine-tracer can be of constant volume, and the shape can be conveyed by the path of the outlining tracers.

Figure 31:
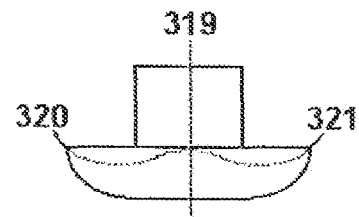
FIG. 31 illustrates how there may be more than one "key line" for an entity.

There is a more general version of the straight-spine graphic where a non-symmetrical entity which possesses a clear a clear "direction" or "flow path" can be conveyed. This will be referred to as the "medial-line": the line that follows the "spine" of an elongated entity. The "curved-spine" or "curved-medial-line" graphic method relies on a "flow path" being identified in the entity. There is some scope for the system to decide such paths, for example by using the optical processing techniques known as "medial axis transform" and "smoothed local symmetry" analysis and similar techniques. However there are often subjective considerations involved in deciding what path best conveys an entity: several flow paths may be valid, and a designer may wish to decide which path is most appropriate. For example if FIG. 31 represents a stationary object such as a hat, or a cup and saucer, then the line along the axis of symmetry 318 to 319 could reasonably be selected as the path for the spine-tracer to follow. However if FIG. 31 represents a cargo-laden boat traveling from left to right, then the curved center line 320 to 321 may better convey the natural "flow" of the entity.

Spined Audiotactile Graphics with Multiple Tracers

A disadvantage of the basic "spined graphic" approach is that only a single "width" is conveyed at any point—the detail of the shape of the entity is not conveyed, nor is the fine "surface detail" of the entity. The direction of the border sections conveyed by the "width" is not always clear.

One way to include detail and to give an impression of the texture of the entity is for the system to combine a coded speech-like curved-spine-tracer with a certain number of simultaneously-conveyed tracers that travel in approximately the same direction as the spine-tracer, but vary in width so that the shape of the entity is conveyed quickly, and more of the detail and texture is also conveyed. This multiple-tracer method works best when the general direction of movement of the tracers is fairly horizontal, as the spread of frequencies used helps to convey the width of the entity.

The coded speech sounds should reflect the average content of the area swept out by all of the tracers. The individual tracer's varying volumes should be set to reflect the "Combotex" content of the area being conveyed by each tracer at any time.

For graphics orientated with tracers moving in an approximately vertical direction, the width of the entity is not well conveyed by the varying-width multi-tracer method, as the binaural spread of sounds becomes the major indicator of width, and this is generally harder to interpret than the spread of frequencies that occurs with horizontally-traveling tracers. As there are a particular number of tracers active at all times, certain parts of the entity will be overemphasized (e.g. where a constriction occurs). To overcome these problems, equal-width non-spine-tracers can travel quasi-parallel to the spine-tracer and be output simultaneously, and each tracer can convey the same width within the graphic. The number of tracers conveyed at any moment will vary according to the width of the graphic. The effect will be of a group of equal-width, quasi-parallel tracers traveling in line with the spine-tracer, with the outer-edge tracers being activated and de-activated according to the width of the graphic at any point.

5.7 Presenting Objects and Structures

Audiotactile Objects are entities that have been identified such that they can be described as specific entities rather than being described in terms of their properties, shapes and features. They are signified by the presence of a complex consonant in audio mode, and by corresponding tactile effects (braille and/or coded impulses).

Standard audiotactile objects could include common everyday items such as landscape features, flora and fauna, household utensils, weather types (e.g. fog, rain, snow), modes of transport, buildings, domestic features (e.g. stairs, baths, kitchen fittings), small household devices (e.g. telephones, table lamps), furniture, clothes, parts of the body, particular facial expressions (e.g. happy, sad), standard shapes that are difficult to convey using tracers or standard panels, items commonly conveyed by signs and symbols (e.g. trade marks), famous historic people etc. The key feature of audiotactile objects is that they represent recognized entities. At present they will mainly be used within pre-processed images, but in the future there is some scope for automatic recognition of certain objects.

Audiotactile objects are conveyed as audiotactile shape-tracers comprising coded speech-like sounds in a "CV-CVC" format, i.e. a property-conveying CV pair, followed after a short pause by a CVC "triplet" that gives details of the object, with 253 object-conveying "Basic Entity Types" being available. For each Basic Entity Type up to 256 sub-classifications can be defined, giving a theoretical maximum of over 60,000 different objects conveyable by this method. The size and shape of the object can be conveyed by the shape-tracer.

Details of objects can be held in an "Object Library" table or database. The records in it include details of how the objects are presented; standard shapes for the objects; direct-descriptions of the objects; etc.

If audiotactile objects are located within a Layout-method viewzone then they can replace existing Layout panels. The objects generally each occupy only one panel position, though sometimes objects can extend over several panel positions.

The CVC "triplet" that follows the initial Property CV pair conveys the particulars of the object. The initial C, the V, and final C have the following meaning:

a) The initial C of the CVC triplet is a complex consonant combination that is not one of the standard coded consonants. Its non-standard nature immediately signals to the user that an object is being conveyed. Up to about 200 different consonant combinations can be devised, including ones that do not normally occur in English but are still easily recognizable (for example "SKL", "SHL" or "FW"). These are used to convey the "Basic Entity Types", and the more easily comprehended consonant combinations should be assigned to the more commonly conveyed object types. The "Basic Entity Types" (sometimes referred to as just "Entity Types") are the broadest classification of entities used by the system, and items belonging to each Entity Type can be further classified into "Entity Class" and "Sub-Class".

b) The middle V and final C of the CVC triplet are standard V and C sounds. They are used to classify (V) and sub-classify (C) the object referred to by initial complex consonant combination. By confining the final V and C to the standard property-conveying sounds, where appropriate similar assignments can be used for qualifying the object as are used for the standard properties.

The rules for binaural positioning and pitching of the audiotactile objects should follow those used by the area of the viewzone in which an object is located. In Layout mode, they can be spoken at the point when the background panel "occupied" by the object would have been spoken.

Braille audiotactile object patterns need to be learned and can be conceptually similar to ideograms the braille pattern assigned to a Basic Entity Type may be easier to learn if the braille pattern resembles or has some association with the entity being represented.

Conveying the Shape of Audiotactile Objects

If the size, shape and corners of an audiotactile object are available then the coded object description can be conveyed to the user as an audiotactile shape-tracer and corner effects whenever the object is being spoken: in Layout mode an object can "break out" of the formal viewzone/panel-group's formal panel structure. The object's shape and corners can be produced either as part of prepared material or via feature- or object-recognition software.

Complex audiotactile graphics (as described in section 5.6) can be used to convey the precise features and layout of the object, or a simple outline shape-tracer can be conveyed, so that the user can concentrate on the coded speech-like sounds that describe the object.

As an option it may be better to convey the distinctive "classic" shapes and corners of objects (rather than the outline that happens to be formed by the object at its current distance and orientation). Such standard outline shapes and corners of objects can be stored in the "Object Library", providing a default tracer shape and corners that can be conveyed for recognized objects, allowing "shape constancy" to be simulated. "Size constancy" and "shape constancy" are the perceptual effects whereby object sizes and shapes are often perceived in a constant way once they are recognized, despite changing in size and orientation within an image: the size and shape of the tracer can be left constant while the object moves within the scene (such facilities are currently more applicable to pre-processed sequences containing audiotactile objects than to "live" images).

Direct-Description for Text or Other Entities

There are circumstances when audiotactile objects are better conveyed by a word or short phrase in Direct-description mode, for example if the user is a beginner or has difficulty learning the Basic Entity Type codes. Additionally, there are many cases in films, presentations etc. when particular words or numbers are present: in normal vision, people literate in the characters concerned cannot help perceiving them as intelligible words, numbers and other symbols, rather than as general shapes. In order to simulate this effect, Direct-description mode audiotactile entities can be used where in normal vision the viewer would see text. As with standard audiotactile objects, the text present in a scene could be identified via special software (for example optical character recognition (OCR) software), or could be produced as part of a pre-processed image. Direct-description sounds can also be used to convey recognized objects for which no standard code exists.

For Direct-description entities, synthesized speech is generally used: though sampled speech could be used, holding samples for all possible entities would require much storage space, and synthesizer-generated Direct-description sounds will generally have a different quality to actual speech so that pieces of text will be more easily distinguishable.

For pre-processed material, when a viewzone is conveyed by the Layout method, adjacent panels in the viewzone/panel-group can refer to the same piece of text, and large Directly-described entities can occupy several panels. The system can continue to output the single piece of text when adjacent panels are conveyed.

Structures: Links Between Entities

Identified entities in a scene are often related to one another, either in a hierarchical ("parent"-"child") manner (e.g. wheels fitted to a bus) or via a more general linkage (e.g. horse and cart). The standard methods of conveying entities do not satisfactorily convey the structure of multi-component entities: for the example multi-component entity 277 illustrated in FIG. 22, the full structure of the entity is only highlighted if the viewzone happens to be located over the square of panels bridging the panel-groups marked "A" and "B". There may be the need to convey entities that are considerably more complex than this, for example with prepared material, where a complex structure may need to be conveyed. To convey such structures, the components of a complex entity may be linked together, sometimes with several "child" sub-components linked to a single "parent" component.

Figure 32:
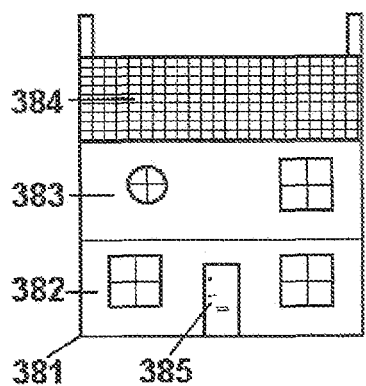
FIGS. 32 and 33 illustrate the way in which the sub-components of an object can be organized so that no more than three sub-components are grouped within any encapsulating component.
Figure 33:
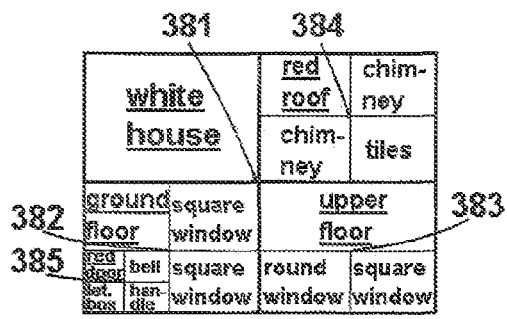

The number of sub-components that can be linked to a "parent" entity is limited to a maximum of three (or four for non-hierarchical arrangements). This limit allows the user to be aware of all the linked components at the same time and has the advantage that the standard four-panel viewzone arrangement can be used, with (for hierarchical arrangements) one or more panel positions assigned to conveying the outline or encapsulating component and up to three panels conveying sub-components. Such a structure is visually illustrated in the example shown in FIG. 32 (a house), whose structure is diagrammatically illustrated in FIG. 33 (FIG. 33 uses the same numbering as FIG. 32 for corresponding components). The "top" level component is a white house 381, which when conveyed is presented as consisting of three sub-components, the ground floor 382, upper floor 383 and roof 384. The white house 381 could be represented by the larger panel-group shown in FIG. 33. Each sub-component can itself "include" several smaller nested components, so that, for example, the component "ground floor" 382 "includes" three sub-components, namely two windows and a door 385. The door 385 "includes" a bell, a handle and a letterbox. If the "natural" number of sub-components within a parent component exceeds the limit then one or more artificial intermediate-level components should be used to allow the sub-components to be conveyed in smaller groups. Tracer effects can convey the size, shape and relative position of both the encapsulating component and the nested sub-components.

Such links can be held by the system, so that the user can investigate the relationship between entities in the scene.

Navigating Structures

When one or more entities appear in a viewzone (unidentified features, text or identified objects), the user can select a "Structure" mode via joystick buttons or the keyboard, whereupon one of the entities is conveyed, along with the entities to which it is linked (if several linked entities were present in the viewzone then the system "locks on" to the entity—the "Current Entity"—that was being conveyed when the Structure mode was selected).

The Current Entity is conveyed first, followed by the entities to which it is directly linked. Navigation of the Structure should be performed in a similar manner to that used for a standard image: if the user "zooms in" on a linked entity, the selected item then becomes the Current Entity, and is conveyed along with any of its own linked entities.

When navigating the structure, the pointer-column is located by the system to reflect the position of the center point of the Current Entity at any time.

Figure 34:
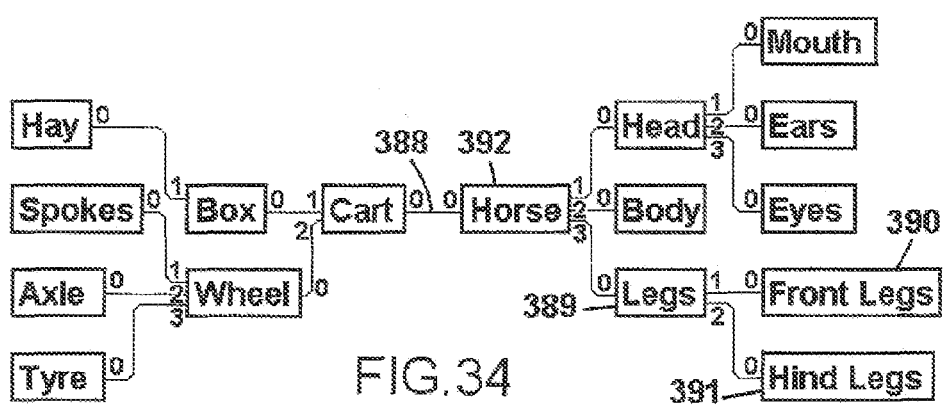
FIG. 34 shows an example of a structure that can be conveyed as an "Audiotactile Structure".

Any entity can be directly linked to up to four other entities, the links being numbered 0 to 3. For "naturally" hierarchical structures, the Current Entity is linked to its "parent" via Link 0, with its "child" entities being linked via Link 1, Link 2 and Link 3. However a hierarchical structure is not required, and "child to child" and "parent to parent" links can be made. See FIG. 34 which visually illustrates the structure of a "horse and cart", showing the link numbers between each item. Note how the "horse to cart" link is Link 0 for both entities 388.

Networks can be constructed using only Link numbers 1 to 3 so that all entities linked to the Current Entity are explicitly conveyed. Limiting the number of links to three may make the structure simpler for the user to comprehend. "Dummy" intermediate entities can be used to limit the number of links to any entity—for example in FIG. 34 the intermediate entity "Legs" 389 is located between "Front legs"/"Hind legs" and "Horse" so that "Front legs" 390 and "Hind legs" 391 can be linked to "Horse" 392 without "Horse" exceeding the maximum number of links.

"Chains" of items can be formed by using a maximum of two links for each item, and "closed loops" can form within structures.

Although the method is primarily intended to convey the perceptual groupings of the components of entities within a scene, Audiotactile Structures can also be applied to non-visible entities. Linked items can be "abstract" entities which are only meaningful within a linked structure and do not represent visible items. They can be used to convey additional properties of items, proper names etc. Any entity that has a Basic Entity Type code can be present in a linked structure—including unidentified objects; features and composite graphics; and text. "Text" entities can be used to link to any textual information: extra properties, notes or abstract information concerning a visible item.

At present, structures of linked entities would be used for prepared material, as "object recognition" is an immature technology. In the future there may be some scope for linking automatically-identified entities.

5.8 Other Features

The invention is not intended to be restricted to the embodiments described herein and may include the following features:— a) If 8 by 8 segment Layouts are presented, the system could alternate between presenting the upper half and lower half, for example presenting the top half (4 by 8 segments) during the first half-Playtime, followed by the lower half during the second half-Playtime, both half-Layouts being presented on the same single line of horizontally-arranged braille cells. Using this approach would allow an embodiment to be implemented using a single horizontal line of about 8 refreshable braille cells (the exact number depending on the options provided).

b) For pre-processed scenes, the system could vary the viewzone shape and/or panel configuration "on the fly" so that the most appropriate format is used.

c) The embodiments should provide a facility whereby the user can temporarily suspend forces and/or sounds.

d) A toggle option can be provided 737 FIG. 12 to quickly reduce, or silence, the overall level of the sounds produced by the system, so that external sounds can be heard. There should also be a facility for the external (image source) sounds to be muted when required.

e) A standard force-feedback joystick can be adapted to better present the effects described herein by detaching the main handle and re-mounting it horizontally at the end of a replacement vertical shaft (not shown). This will provide an ergonomically-shaped handle and accessible switches, but the user's hand will be orientated with the palm downwards, which may be more comfortable. (The switch connections to the main body of the force-feedback joystick may need to be extended or otherwise adapted.)

The benefits of a force-feedback joystick and a force-feedback mouse could to some extent be combined by mounting a standard three-button mouse at the top of a force-feedback joystick, optionally via a flexible 2-way joint (not shown) so that the mouse can maintain its level, but still allow the user to exert a twisting action to the joystick shaft. The mouse buttons would need to be connected to the switch connections of three of the existing joystick buttons.

f) A separate standard computer numeric keypad can be used to control the device instead of the Enhanced Joystick or joystick buttons—the number keys 7-8-9-4-6-1-2-3 can be used to indicate direction in a similar manner to a "hat"-switch, and the other keys (/, *, +, – etc.) can be assigned to perform the functions of the other joystick buttons. Using this method the viewzone can be moved, the resolution changed etc., though the user will only receive audio feedback on the viewzone location. A small refreshable braille display could be embedded at the top of the numeric keypad, which could be optionally mounted at the top of the column/handgrip of a force-feedback joystick, but be demountable, so that it can act with the force-feedback joystick in "desktop" mode, to indicate and receive location information, shape information etc.; and act as a "standalone" keypad and braille display in "portable" mode (not shown).

g) Amongst the categorical entities that can be presented can be "categorical shapes". If the filtering (or an external image processing module, or image pre-processing) identifies a standard shape, for example a square/rectangle, circle/ellipse or triangle, this shape can be communicated categorically in a similar manner to other objects (i.e. replacing the Layouts), with the information categorically conveying the type, shape, orientation etc.

h) If conveying several shapes in an image via a force-feedback device's powered pointer, the system can continuously move the pointer in a clockwise (or anti-clockwise) direction so that it does not suddenly change direction. Such an approach may require that certain parts of shapes are presented more than once.

i) The system can present special effects while the powered pointer is repositioning itself between conveying actual visual features e.g. entity shapes, for example a distinctive vibration. Alternatively it can present such an effect when it is conveying the features, and remain "silent" at other times.

j) When braille is used to convey a Layouts, the Layout components can be arranged contiguously and the property-conveying cells arranged around the outside (not shown), so that the "image" area is continuous rather than interleaved with property-conveying cells. A similar approach can be applied to the spoken sounds. If such an approach is used then a non-braille tactile display (for example the 8 by 8/64-dot tactile display produced by KGS™) could be used to present the image area.

k) The categorical sounds described herein may be used to convey information other than visual information, by using modified versions of the described methods, for example by using the coded phonetic sounds to convey other categorized information.

l) Many arrangements for Layouts similar to those described herein can be devised, for example a low-resolution Layout that has colors more precisely defined, 3-color combination Layouts etc.; a layout of a 3×3 panel (i.e. 9 segments) could be conveyed via one syllable if 32 consonant and 16 vowel sounds are used; a 3×4 segment panel could be conveyed in "CVC" format syllables if 16 consonant and 16 vowel sounds are used; etc.

m) The system could be adapted to run in "reverse mode", whereby the user speaks a version of the special coded sounds, and voice recognition software interprets the speech and frequency. If an automatic viewzone stepping movement is assumed then the user can speak, for example, Layout "CV" syllable sounds to convey to the system the categorical properties and segment layouts/entities of a panel-mosaic (the user can indicate the required location with a joystick). By using adapted viewzone, zoom level, Playtime, segment layout and entity conventions etc. as appropriate that function with the "reverse mode", the system can allow the user to "paint" and modify detailed areas of an image by using speech.

6 Glossary

Activity: What the user is currently doing e.g. finding, watching TV, also default activity "General".

Activity identifier: Entity for referring to an activity.

Apparently-moving effects: Effects which appear to move i.e. either effects which physically move, or effects which appear to move, being a continuously-presented group of effects, each individual effect in the group being presented in a slightly different location on the display, so that a group of them give the impression of a single moving effect.

Audio display: Device capable of communicating with human beings via the sense of hearing, for example a computer sound card and loudspeakers (and associated software).

Averaging: When applied to coded categorical properties etc., conveying a consolidation of the properties of areas conveyed by the effects.

Categorical: Used to refer to properties, entities, measurements etc. that are classified as belonging to a particular category.

Categorically-perceived effects: Effects that are perceived as being of one of a limited set of effects, for examples the phonemes of a language; braille cell patterns; impulse-code sequences; particular physical textures selected from a limited group of textures; etc.

"Combotex": Used to refer to non-categorical "flutter" effects which can be added to categorical effects, and which convey an impression of the "fine detail" of the area conveyed by the categorical effects.

Corner indicium effects: Short, distinct indicator effects representing the existence of a corner. The indicium effects are output at the points in time when the apparently-moving effects have reached points which correspond to the points in the paths of lineal features at which corners occur.

Enhanced Joystick: Similar to a standard force-feedback joystick but having a column of variable height (i.e. extended perpendicular to the main two-dimensional surface), and additional features such as built in braille displays; texture displays; etc.

Feature: In the context of a visual feature, the properties; arrangement of properties; shapes; corners; entities; objects; change; etc. found in visual representations. Also abstract entities such as the medial-line or line of symmetry of a shape. Features can be extracted "on the fly" or be predetermined (either via a human designer, or by software etc.).

Identified entities: Visual entities that have been identified beyond their basic properties e.g. shapes, objects etc.

Identified objects: Entities that have been identified and classified as one of a set of classes of entity.

Layout, panel, segment: An area of an image whose colors are usually described by a single pair of colors that the system calculates best represent it is referred to as a "panel". The pixels within a panel are arranged into equal-sized areas referred to as "segments", and the arrangement of the colors (selected from the pair of colors) that best represents the actual average-pixel-colors of the segments is referred to as a "Layout".

Lineal features: Line-like features such as lines (of whatever shape; curves; zigzags; etc.); edges/perimeters of shapes; lines of symmetry; "medial-lines"; etc., that can contain corners and can be presented to the user.

Medial-line: The line that follows the "spine" of an elongated entity.

Non-visual representations: Representations in other senses.

Parameter: Option, value, choice, etc. that influences the system's processing, for example: how an image is to be processed; which features are to be extracted; and how they are to be presented to users via non-visual means.

Playtime: A user-controlled period of time that gives the time allowed for conveying the contents of the viewzone, and is typically between one and six seconds.

Tactile display: Device capable of communicating with human beings via the sense of touch, for example a refreshable braille display, an "Optacon", a force-feedback joystick, etc. (and associated software).

Tracers: Apparently-moving audio and tactile effects. Can be in the form of "shape-tracers", which trace out specific shapes. Several tracers can simultaneously convey an area or the components of an entity.

Tracer path: The route that a tracer takes, for example representing the path of a lineal feature such as the perimeter of an object; lines; curves; zigzags; "medial lines"; other shapes; etc.

User: The human being using the embodiment.

Visual representation: Typically an image (whether created, recorded, "live" etc.), but also abstract shapes, theoretical shapes not rendered as images e.g. the coordinates of a shape.

Viewzones: Sections of the full image that can be selected by the user so that only those selected parts of the image are presented. The size and spatial resolution of a zone can be changed. They can be rectangular, circular, elliptical, other shapes. The user can move zones to particular areas of an image.

Advantages

From the description above, a number of advantages of some embodiments of my audiotactile vision substitution system become evident:

(a) It is activity-based, so allowing more focused extraction of image features and more appropriate presentation of audio and/or tactile effects.

(b) It can present categorical information as coded impulses.

(c) It can present shapes more effectively by emphasizing corners within the shapes.

CONCLUSIONS, RAMIFICATIONS AND SCOPE

Accordingly, the reader will see that the system addresses several of the shortcomings of previous inventions in the field. Furthermore, the system has the additional advantage that one preferred embodiment can be implemented using low-cost standard computer hardware.

Although the description above contains many specificities, these should not be construed as limiting the scope of the embodiments but as merely providing illustrations of some of the presently preferred embodiments. Numerous modifications may be made to the arrangements that have been described without departing from the true spirit and scope of the invention.

Thus the scope of the embodiments should be determined by the appended claims and their legal equivalents, rather than by the examples given.

I claim:

1. A method of communicating visual representations comprising:
   (a) obtaining at least one of said visual representations;
   (b) first acquiring at least one lineal feature related to said visual representations, said lineal features having paths;
   (c) second acquiring at least one corner related to said paths of said lineal features, said corners having locations substantially within said paths of said lineal features;
   (d) providing at least one display means selected from the group consisting of: at least one audio display means, at least one tactile display means, and combinations thereof;
   (e) first outputting at least one apparently-moving effect to at least one of said display means, wherein said apparently-moving effects trace out paths that relate to said paths of said lineal features;
   (f) second outputting at least one corner-representing indicium effect to at least one of said display means, wherein said indicium effects are distinct from said apparently-moving effects, and wherein said second outputting step occurs substantially at the same moment as the moment at which said apparently-moving effects reach locations that relate to said locations of said corners;
whereby said lineal features and their related corners can be visualized via non-visual apparently-moving tracers within which corners are highlighted via distinct indicium effects.

2. A method according to claim 1 further including the steps of:
   (a) providing a plurality of activity identifiers;
   (b) providing at least one parameter;
   (c) selecting at least one of said activity identifiers;
   (d) determining at least one of said parameters, said step of determining of said parameters being influenced by said step of selecting of activity identifiers, and said step of determining of said parameters influencing at least one step selected from the group consisting of: said obtaining, said first acquiring, said second acquiring, said first outputting, said second outputting, and combinations thereof.

3. A method according to claim 1 wherein said visual representations include visual representations selected from the group consisting of: live images, recorded images, created images, filtered images, images prepared by a person, maps, data that can be presented visually, abstract shapes, descriptions of shapes and corners, and combinations thereof.

4. A method according to claim 1 wherein said lineal features include lineal features selected from the group consisting of: perimeters of entities related to said visual representations, medial-lines of entities related to said visual representations, lines of symmetry of entities related to said visual representations, and combinations thereof.

5. A method according to claim 1 wherein said apparently-moving effects comprise effects selected from the group consisting of: apparently-moving stereophonic sounds, apparently-moving tactile effects, physically-moving objects, and combinations thereof; and wherein said indicium effects comprise effects selected from the group consisting of: distinct audio effects, distinct tactile effects, slowing or stopping the apparent movement of said apparently-moving effects, changes to the intensity of said apparently-moving effects, indicium effects which are of sensory modalities that are different to the sensory modalities of said apparently-moving effects, and combinations thereof.

6. A method according to claim 1 wherein said apparently-moving effects include categorically-perceived effects that are apparently-moving, and wherein said categorically-perceived effects include effects selected from the group consisting of: words of natural languages; phonemes of natural languages; non-phonemic categorically-perceived sounds; tactile effects presented on at least one braille-like display; encoded impulse sequences; categorically-perceived textures; categorically-perceived vibrations; and combinations thereof.

7. A method according to claim 6 wherein said categorically-perceived effects include categorically-perceived effects that relate to features selected from the group consisting of: categories of visual properties, spatial arrangements of said categories of visual properties, classified entities, and combinations thereof.

8. A method according to claim 1 wherein a plurality of said apparently-moving effects are output simultaneously.

9. A method according to claim 1 further including the step of presenting successive visual representations that occur at successive points in time, whereby change and movement in said visual representations can be visualized.

10. Apparatus enabling a person to perceive visual representations via non-visual effects comprising:
   (a) obtaining means for obtaining at least one of said visual representations;
   (b) first acquiring means for acquiring at least one lineal feature related to said visual representations, said lineal features having paths;
   (c) second acquiring means for acquiring at least one corner related to said lineal features, said corners having locations substantially within said paths of said lineal features;
   (d) processing means for processing said lineal features and said corners into the form of at least one apparently-moving effect and at least one indicium effect respectively;
   (e) at least one display means selected from the group consisting of: at least one audio display means, at least one tactile display means, and combinations thereof;
   (f) first outputting means for outputting said at least one apparently-moving effect to at least one of said display means, wherein said apparently-moving effects trace out paths that relate to said paths of said lineal features;
   (g) second outputting means for outputting said at least one corner-representing indicium effect to at least one of said display means, wherein said indicium effects are distinct from said apparently-moving effects, and wherein said indicium effects are output substantially at the same moment as the moment at which said apparently-moving effects reach locations that relate to said locations of said corners;

whereby said lineal features and their related corners can be visualized via non-visual apparently-moving tracers within which corners are highlighted via distinct indicium effects.

11. Apparatus according to claim 10 further comprising:
(a) a plurality of activity identifiers;
(b) at least one parameter;
(c) selecting means for selecting at least one of said activity identifiers;
(d) determining means for determining at least one of said parameters, said determining of said parameters being influenced by said selected activity identifiers, and said determining of said parameters influencing at least one entity selected from the group consisting of: said obtaining means, said first acquiring means, said second acquiring means, said processing means, said first outputting means, said second outputting means, and combinations thereof.

12. Apparatus according to claim 10 wherein said visual representations include visual representations selected from the group consisting of: live images, recorded images, created images, filtered images, images prepared by a person, maps, data that can be presented visually, abstract shapes, descriptions of shapes and corners, and combinations thereof.

13. Apparatus according to claim 10 wherein said lineal features include lineal features selected from the group consisting of: perimeters of entities related to said visual representations, medial-lines of entities related to said visual representations, lines of symmetry of entities related to said visual representations, and combinations thereof.

14. Apparatus according to claim 10 wherein said apparently-moving effects comprise effects selected from the group consisting of: apparently-moving stereophonic sounds, apparently-moving tactile effects, physically-moving objects, and combinations thereof; and wherein said indicium effects comprise effects selected from the group consisting of: distinct audio effects, distinct tactile effects, slowing or stopping the apparent movement of said apparently-moving effects, changes to the intensity of said apparently-moving effects, indicium effects which are of sensory modalities that are different to the sensory modalities of said apparently-moving effects, and combinations thereof.

15. Apparatus according to claim 10 wherein said apparently-moving effects include categorically-perceived effects that are apparently-moving, and wherein said categorically-perceived effects include effects selected from the group consisting of: words of natural languages; phonemes of natural languages; non-phonemic categorically-perceived sounds; tactile effects presented on at least one braille-like display; encoded impulse sequences; categorically-perceived textures; categorically-perceived vibrations; and combinations thereof.

16. Apparatus according to claim 15 wherein said categorically-perceived effects include categorically-perceived effects that relate to features selected from the group consisting of: categories of visual properties, spatial arrangements of said categories of visual properties, classified entities, and combinations thereof.

17. Apparatus according to claim 10 wherein a plurality of said apparently-moving effects are output simultaneously.

18. Apparatus according to claim 10 further comprising presenting means for presenting successive said non-visual effects that relate to said visual representations that occur at successive points in time, whereby change and movement in said visual representations can be visualized.

19. Apparatus according to claim 10 which is arrangeable on a substantially horizontal surface, whereby said apparatus can be used on a desktop or similar surface.

20. Apparatus according to claim 10 which is portable.

* * * * *